(12) United States Patent
Tatsumura et al.

(10) Patent No.: US 11,610,146 B2
(45) Date of Patent: Mar. 21, 2023

(54) SEARCH DEVICE, SEARCH METHOD, COMPUTER PROGRAM PRODUCT, SEARCH SYSTEM, AND ARBITRAGE SYSTEM

(71) Applicant: KABUSHIKI KAISHA TOSHIBA, Tokyo (JP)

(72) Inventors: Kosuke Tatsumura, Yokohama Kanagawa (JP); Hayato Goto, Kawasaki Kanagawa (JP); Masaya Yamasaki, Tokyo (JP); Ryo Hidaka, Tokyo (JP); Yoshisato Sakai, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/565,206

(22) Filed: Dec. 29, 2021

(65) Prior Publication Data

US 2022/0121976 A1    Apr. 21, 2022

Related U.S. Application Data

(63) Continuation of application No. 17/004,116, filed on Aug. 27, 2020, now Pat. No. 11,244,239.

(30) Foreign Application Priority Data

Oct. 8, 2019  (JP) .............................. JP2019-185297

(51) Int. Cl.
*G06F 9/44* (2018.01)
*G06N 7/00* (2023.01)
(Continued)

(52) U.S. Cl.
CPC ............. *G06N 7/005* (2013.01); *G01N 15/00* (2013.01); *G06F 9/5011* (2013.01); *G01N 2015/0003* (2013.01)

(58) Field of Classification Search
CPC ...................................................... G06N 7/005
(Continued)

(56) References Cited

U.S. PATENT DOCUMENTS

2001/0011241 A1   8/2001   Nemzow
2006/0059066 A1   3/2006   Glinberg et al.
(Continued)

FOREIGN PATENT DOCUMENTS

JP   5865456 B1   2/2016
JP   2018-5541 A   1/2018
(Continued)

OTHER PUBLICATIONS

Tatsumura, et al., "FPGA-Based Simulated Bifurcation Machine," (presentation) 29$^{th}$ Int'l Cont. on Field Programmable Logic and Applications, XP055716048, pp. 1-24 (2019).
(Continued)

*Primary Examiner* — Timothy A Mudrick
(74) *Attorney, Agent, or Firm* — Finnegan, Henderson, Farabow, Garrett & Dunner, LLP

(57) ABSTRACT

A search device updates positions and momentums of a plurality of virtual particles, for each unit time from an initial time to an end time. The search device, for each unit time, calculates, for each of the particles, a position at a target time of a corresponding particle, calculates, for each of a plurality of nodes, a first accumulative value by cumulatively adding positions at the target time of two or more particles corresponding to outgoing two or more directed edges, calculates, for each of the nodes, a second accumulative value by cumulatively adding positions at the target time of two or more particles corresponding to incoming two or more directed edges, and calculates, for each of the
(Continued)

particles, a momentum at the target time of a corresponding particle based on the first accumulative value and the second accumulative value.

12 Claims, 26 Drawing Sheets

(51) Int. Cl.
*G01N 15/00* (2006.01)
*G06F 9/50* (2006.01)

(58) Field of Classification Search
USPC .............................................................. 703/2
See application file for complete search history.

(56) References Cited

U.S. PATENT DOCUMENTS

| | | | |
|---|---|---|---|
| 2007/0118453 A1 | 5/2007 | Bauerschmidt | |
| 2010/0017345 A1 | 1/2010 | Hadi et al. | |
| 2013/0282636 A1* | 10/2013 | Macready | B82Y 10/00 706/46 |
| 2015/0006443 A1* | 1/2015 | Rose | G06V 10/7715 706/12 |
| 2016/0006521 A1 | 3/2016 | Yoshimura et al. | |
| 2016/0071021 A1* | 3/2016 | Raymond | G06F 15/76 712/28 |
| 2018/0005114 A1 | 1/2018 | Tomita et al. | |
| 2018/0018563 A1 | 1/2018 | Tsukamoto et al. | |
| 2019/0266212 A1 | 8/2019 | Goto et al. | |
| 2019/0027861 A1 | 9/2019 | Tatsumura et al. | |

FOREIGN PATENT DOCUMENTS

| | | |
|---|---|---|
| JP | 2018-10474 A | 1/2018 |
| JP | 2019-145010 A | 8/2019 |
| JP | 2019-159566 A | 9/2019 |

OTHER PUBLICATIONS

Goto et al., "Combinatorial optimization by simulating adiabatic bifurcations in nonlinear Hamiltonian systems," Science Advances vol. 5, No. 4, eaav2372 (Apr. 19, 2019), 8 pages.
Soon et al., "Currency Arbitrage Detection Using A Binary Integer Programming Model," Proc. IEEEE IEEM (2007), 867-870.
Rosenberg, "Finding optimal arbitrage opportunities using a quantum annealer," 1QB Information Technologies White Paper (2016), 6 pages.
Johnson et al., "Quantum annealing with manufactured spins," Nature (May 12, 2011), 473:194-198.

\* cited by examiner

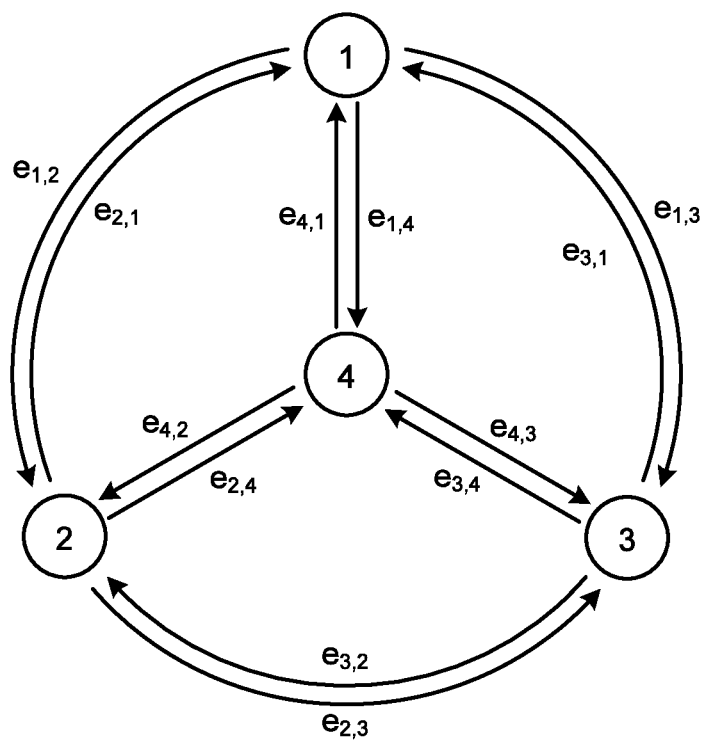

FIG.23

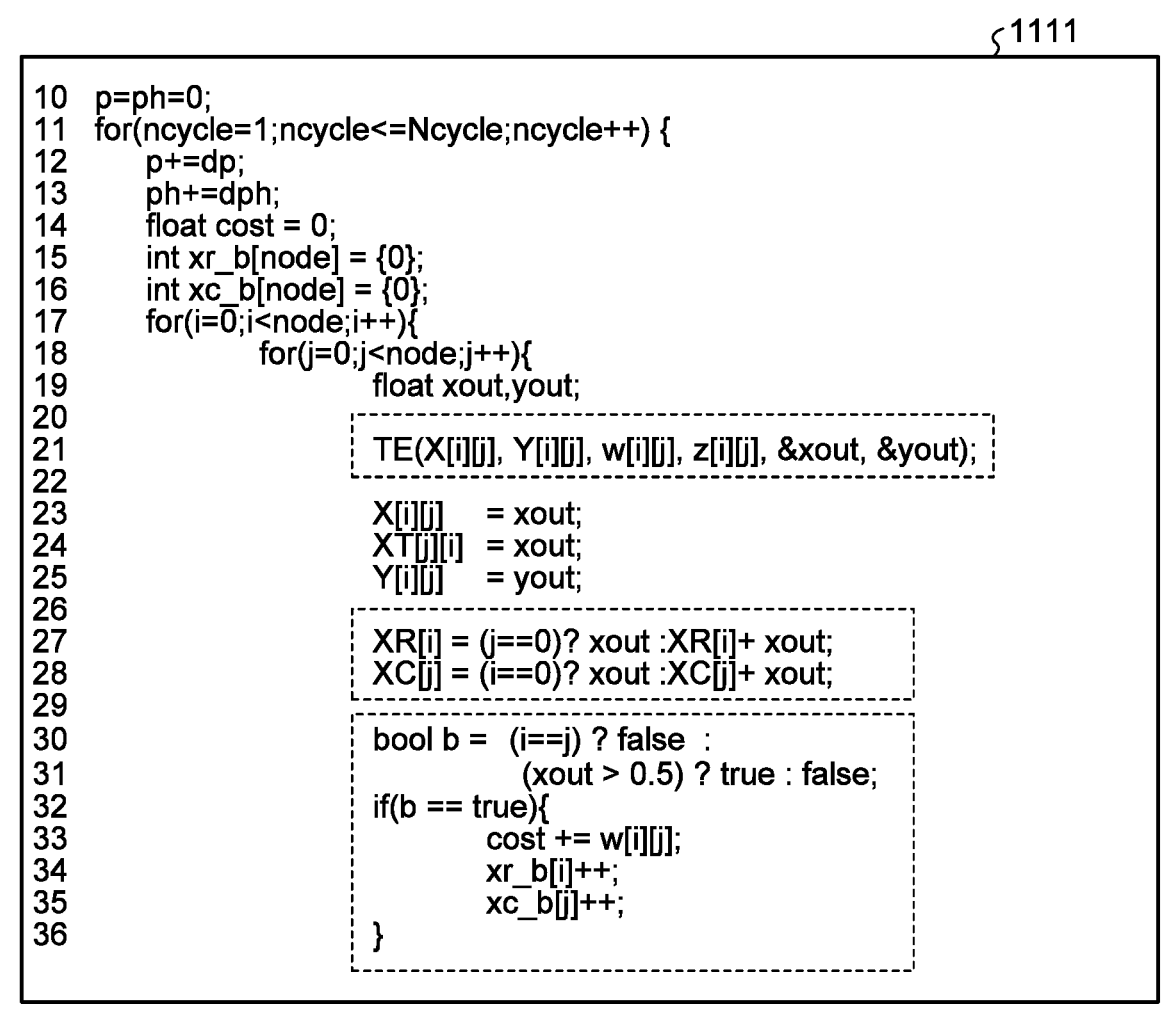

```
10   p=ph=0;
11   for(ncycle=1;ncycle<=Ncycle;ncycle++) {
12       p+=dp;
13       ph+=dph;
14       float cost = 0;
15       int xr_b[node] = {0};
16       int xc_b[node] = {0};
17       for(i=0;i<node;i++){
18             for(j=0;j<node;j++){
19                   float xout,yout;
20
21                   TE(X[i][j], Y[i][j], w[i][j], z[i][j], &xout, &yout);
22
23                   X[i][j]   = xout;
24                   XT[j][i]  = xout;
25                   Y[i][j]   = yout;
26
27                   XR[i] = (j==0)? xout :XR[i]+ xout;
28                   XC[j] = (i==0)? xout :XC[j]+ xout;
29
30                   bool b =  (i==j) ? false :
31                             (xout > 0.5) ? true : false;
32                   if(b == true){
33                         cost += w[i][j];
34                         xr_b[i]++;
35                         xc_b[j]++;
36                   }
```

FIG.24

```
                                                              1112
37        bool constraint = false;
38        for(k=0;k<node;k++){
39                if(xr_b[k]>1 || xc_b[k]>1 || xr_b[k] != xc_b[k]){
40                        constraint = true;
41                }
42        }
43        if(constraint == true){
44                cost = 0.0;
45        }
46        sol = pow(10, -absmax*cost);
47     }
48   }
49   for(i=0;i<node;i++){
50        for(j=0;j<node;j++){
51                float yout;
52
53                MX(XR[i],XC[j],XC[i],XR[j],XT[i][j],X[i][j],*yout);
54
55                Y[i][j]-= yout;
56        }
57   }
58 }
```

FIG.25

```
111  TE(xin,yin,win,zin,*xout,*yout){
112      float nx1,nx2,nx3;
113      float ny1,ny2,ny3;
114
115    ny1 = yin;
116      nx1 = xin + dt* yin;
117
118      nx2=(nx1>0.5)?1.0:0.0;
119
120      if(nx1>1.0 || nx1<0.0){
121             nx3=nx2;
122             ny1=0.0;
123      }else{
124             nx3=nx1;
125             ny2=ny1;
126      }
128
129      ny3 = ny2 - dt*(1-p)*(nx3-x0) - dt*Mc*(ph*win+(1-ph)*w0);
130      *xout=zin?0.0:nx3;
131      *yout=zin?0.0:ny3;
132  }
```

FIG.26

```
211  MX(XRi,XCj,XCi,XRj,XTij,Xij,*yout){
212      *yout =dt*Mp*(2*XRi+2*XCj-XCi-XRj+XTij-2*Xij);
213  }
```

SEARCH DEVICE, SEARCH METHOD, COMPUTER PROGRAM PRODUCT, SEARCH SYSTEM, AND ARBITRAGE SYSTEM

CROSS-REFERENCE TO RELATED APPLICATIONS

This application is a continuation of application Ser. No. 17/004,116, filed Aug. 27, 2020, which is based upon and claims the benefit of priority from Japanese Patent Application No. 2019-185297, filed on Oct. 8, 2019; the entire contents of which are incorporated herein by reference.

FIELD

Embodiments described herein relate generally to a search device, a search method, a computer program product, a search system, and an arbitrage system.

BACKGROUND

Most of problems for increasing productivity in social systems are reduced to combinatorial optimization problems. Problems of selecting a path connecting a start node and an endpoint node based on a certain evaluation function in a graph having nodes (vertices) and directed edges (links) connecting the nodes are called pathfinding problems. For example, an arbitrage problem of detecting currency or other arbitrage opportunities can be formulated as a pathfinding problem in a directed graph. In this case, the directed graph has nodes corresponding to currencies, directed edges corresponding to exchange from a currency at a start node to a currency at an end node, and weight values allocated to the directed edges corresponding to currency exchange rates.

The Ising problem is known to calculate the ground state of an Ising model. The Ising problem is a combinatorial optimization problem of minimizing a cost function (Ising energy) given by a quadratic function of a variable (Ising spin) which takes a binary value of ±1.

The Ising problem can be given by an expression using a bit (b) by converting an Ising spin (s) into a linear relational expression (s=2b−1), where b is a binary variable of 0 or 1. That is, the Ising problem is the same as the problem of minimizing a cost function given by a quadratic function using a bit (b). Such a problem is called a quadratic unconstrained binary optimization (QUBO) problem. The arbitrage problem is known to be formulated as a QUBO problem.

However, devices that solve such optimization problems fast are required. For example, such a device is required that quickly detects a cycle (a path of which start node and end node are the same) with the largest profit (exchange profit) resulting from an exchange from a directed graph formulating an arbitrage problem and detects arbitrage opportunities faster.

BRIEF DESCRIPTION OF THE DRAWINGS

FIG. 1 is a diagram illustrating a directed graph;
FIG. 2 is a diagram illustrating a matrix storing values and variables corresponding to directed edges;
FIG. 23 is a diagram illustrating first main pseudo code;
FIG. 24 is a diagram illustrating second main pseudo code;
FIG. 25 is a diagram illustrating TE pseudo code;
FIG. 26 is a diagram illustrating MX pseudo code.

DETAILED DESCRIPTION

Figure 3:
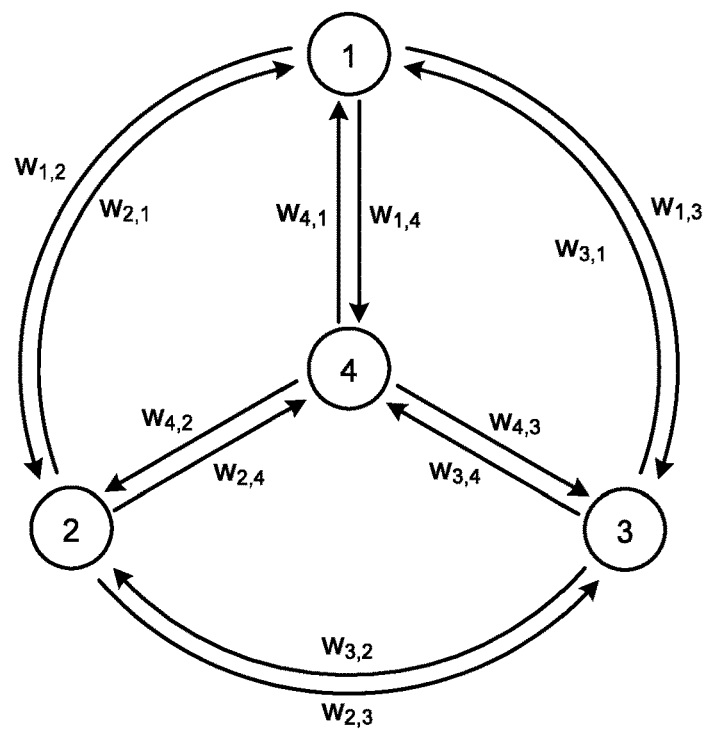
FIG. 3 is a diagram illustrating a directed graph in which weight values are allocated to directed edges.

According to an embodiment, a search device configured to search for an optimal path in a directed graph with weight values allocated to a plurality of directed edges, includes a memory and a hardware processor coupled to the memory and configured to update positions and momentums of a plurality of virtual particles, for each unit time from an initial time to an end time. The plurality of particles correspond to a plurality of bits included in a 0-1 optimization problem corresponding to a problem of searching for the optimal path. The plurality of bits correspond to the plurality of directed edges included in the directed graph, each of the bits representing whether a corresponding directed edge is selected for the optimal path. The hardware processor is configured to: for each the unit time, calculate, for each of the particles, a position at target time of a corresponding particle based on a momentum at a preceding time one unit time before the target time of the corresponding particle; calculate, for each of a plurality of nodes included in the directed graph, a first accumulative value by cumulatively adding positions at the target time of two or more particles corresponding to outgoing two or more directed edges; calculate, for each of the nodes included in the directed graph, a second accumulative value by cumulatively adding positions at the target time of two or more particles corresponding to incoming two or more directed edges; and calculate, for each of the plurality of particles, a momentum at the target time of a corresponding particle based on the first accumulative value and the second accumulative value of an end node, the first accumulative value and the second accumulative value of a start node, and a weight value allocated to a corresponding directed edge. After updating the positions and the momentums until the end time, the hardware processor is configured to determine a value of each of the plurality of bits based on a position of a corresponding particle at the end time.

First Embodiment

An optimal path problem and a solution thereto according to a first embodiment will be described.

Preconditions

FIG. 1 is a diagram illustrating a directed graph.

A directed graph serving as a path finding target includes a plurality of nodes and a plurality of directed edges. A unique index is allocated to each individual node. The index is an integer equal to or greater than 1. When the directed graph includes N (N is an integer equal to or greater than 3) nodes, a unique integer of any one of 1 to N is allocated to each individual node. FIG. 1 illustrates an example of a directed graph where N=4.

Each of the directed edges has a direction and represents a path starting from any one (start node) of a plurality of nodes toward another node (end node) of a plurality of nodes. In the present embodiment, the start node and the end node of each directed edge are different from each other. In other words, in the present embodiment, the directed edges do not include an edge (self-loop) whose start node and end node are the same.

In the embodiments, a directed edge outgoing from the $i^{th}$ (i is an integer equal to or greater than 1, an integer equal to or smaller than N) node and incoming to the $j^{th}$ (j is an integer equal to or greater than 1 and equal to or smaller than N, a value different from i) node is denoted as $e_{i,j}$. In the embodiments, various values and variables are treated in conjunction with directed edges. Similarly, these values and variables identify corresponding directed edges by subscripts.

FIG. 2 is a diagram illustrating an N×N matrix storing values and variables corresponding to directed edges.

When N nodes are included in a directed graph, in the embodiments, their values and variables are stored in an N×N matrix. In the embodiments, in the matrix, the row number indicates the index of the start node of the corresponding directed edge, and the column number indicates the index of the end node of the corresponding directed edge. However, since the directed edges do not include a self-loop, the matrix stores a value that does not influence path finding, as an element of diagonal entries (entries with the same row number and column number). The example in FIG. 2 is a matrix where N=4.

In the matrix, the row number may represent the index of the end node of a corresponding directed edge, and the column number may represent the index of the start node of the corresponding directed edge.

FIG. 3 is a diagram illustrating a directed graph in which weight values are allocated to directed edges.

To each of a plurality of directed edges included in the directed graph, a weight value is allocated. When the directed graph includes N nodes, the weight value allocated to the directed edge outgoing from the $i^{th}$ node and incoming to the $j^{th}$ node is denoted as $w_{i,j}$.

One of the optimal path problems is the problem of detecting the shortest path for a directed graph. The solution to the problem of detecting the shortest path is a path in which the sum of weight values allocated to two or more included directed edges is smallest.

Other optimal path problems are the problem of detecting the longest path, the problem of detecting the minimum profit path, and the problem of detecting the maximum profit path. The solution to the problem of detecting the longest path is a path in which the sum of reciprocals of the weight values allocated to two or more included directed edges is smallest. The solution to the problem of detecting the minimum profit path is a path in which the sum of logarithmic values of the weight values allocated to two or more included directed edges is smallest. The solution to the problem of detecting the maximum profit path is a path in which the sum of logarithmic values of reciprocals of the weight values allocated to two or more included directed edges is smallest. That is, the longest path problem, the minimum profit path problem, and the maximum profit path problem can be solved as a shortest path problem.

For example, we examine the arbitrage problem of detecting exchange arbitrage opportunities. In this case, in a directed graph, a node corresponds to a currency, and a directed edge corresponds to an exchange from the currency at the start node to the currency at the end node. The weight value allocated to the directed edge outgoing from the $i^{th}$ node and incoming to the $j^{th}$ node is given by Equation (1) below.

$$w_{i,j} = -\log r_{i,j} \qquad (1)$$

In Equation (1), $r_{i,j}$ is the exchange rate from the currency at the start node (the $i^{th}$ node) to the currency at the immediately following node (the $j^{th}$ node).

In such a directed graph, a cycle in which the sum of weight values allocated to two or more included directed edges is smallest represents a cycle in which the total rate is largest. Therefore, the solution to the shortest path problem in such a directed graph is equivalent to a solution to the arbitrage problem of detecting exchange arbitrage opportunities.

For example, in the case of the problem of detecting the shortest distance, a node in a directed graph corresponds to a point, and the weight value allocated to a directed edge is the distance from the point at the start node to the point at the end node. In this case, the weight value is a positive value. In this case, the weight value allocated to the directed edge outgoing from the $i^{th}$ node and incoming to the $j^{th}$ node is identical to the weight value allocated to the directed edge outgoing from the $j^{th}$ node and incoming to the $i^{th}$ node. That is, such a directed graph is regarded as an undirected graph.

Therefore, the problem of detecting the shortest distance in an undirected graph can be solved as a shortest path problem in a directed graph.

Problem with Cycle

Optimal path problems include a problem with a cycle (a loop-like path) and a problem with a path connecting different two nodes. The problem with a cycle will be described first, and the problem with a path connecting different two nodes will be described next.

Figure 4:
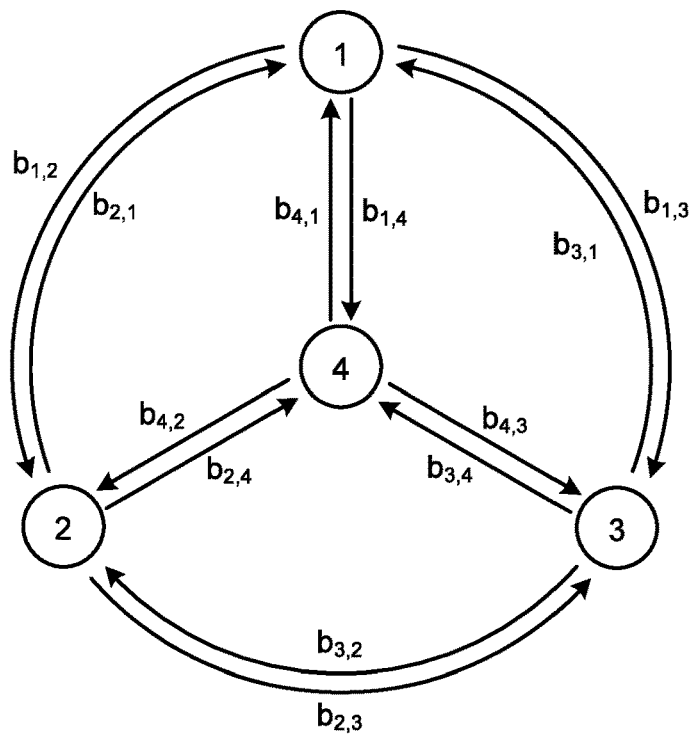
FIG. 4 is a diagram illustrating a directed graph in which bits are associated with directed edges.

FIG. 4 is a diagram illustrating a directed graph in which bits are associated with directed edges. The optimal path problem in a directed graph can be formulated as a 0-1 optimization problem.

When the optimal path problem in a directed graph is formulated as a 0-1 optimization problem, each of a plurality of directed edges is associated with a bit. That is, a plurality of bits included in the 0-1 optimization problem correspond to a plurality of directed edges included in a directed graph. In the present embodiment, a bit allocated to the directed edge outgoing from the $i^{th}$ node and incoming to the $j^{th}$ node is denoted as $b_{i,j}$.

Each of a plurality of bits included in the 0-1 optimization problem represents whether the corresponding directed edge is selected for the optimal path. In the present embodiment, when each of a plurality of bits is 1, it is indicated that the corresponding directed edge is selected for the optimal path, whereas when it is 0, it is indicated that the corresponding directed edge is not selected for the optimal path. For example, in the arbitrage problem, when each of a plurality of bits is 1, an exchange from the currency at the start node to the currency at the end node is performed, whereas when it is 0, an exchange from the currency at the start node to the currency at the end node is not performed.

When the optimal path problem in a directed graph is formulated as the 0-1 optimization problem, the value to minimize is given by Equation (2) below.

$$E = M_c \times C + M_p \times P \quad (2)$$

C is a cost function that represents the sum of weight values allocated to two or more directed edges included in the selected path, using a plurality of bits. P is a penalty function that represents a constraint satisfying the optimal path, using a plurality of bits. $M_c$ and $M_p$ are predetermined positive constants. That is, the 0-1 optimization problem is formulated into a total cost function E including a cost function C and a penalty function P.

In the present embodiment, the cost function C is written as Equation (3) below.

$$C = \sum_{i,j} w_{i,j} b_{i,j} \quad (3)$$

Equation (3) represents the sum (accumulative value) of weight values allocated to two or more directed edges included in the selected path, using a plurality of bits. Equation (3) is an equation that totally adds $w_{i,j} \times b_{i,j}$ in all combinations of i and j, excluding i=j.

In the problem with a cycle, the penalty function P represents the conditions in which the selected path forms a cycle in a directed graph, using a plurality of bits. The conditions in which a cycle is formed in a directed graph are as follows.

A first condition is that, for each of N nodes, the number of outgoing directed edges selected for the optimal path is equal to or smaller than 1.

A second condition is that, for each of N nodes, the number of incoming directed edges selected for the optimal path is equal to or smaller than 1.

A third condition is that, for each of N nodes, the number of outgoing directed edges selected for the optimal path and the number of incoming directed edges selected for the optimal path are equal.

A fourth condition is that a directed edge outgoing from the $i^{th}$ node and incoming to the $j^{th}$ node and a directed edge outgoing from the $j^{th}$ node and incoming to the $i^{th}$ node are not simultaneously selected for the optimal path.

The penalty function P that represents the conditions above using a plurality of bits is written as Equation (4) below.

$$P = \frac{1}{2}\sum_i \sum_{j \neq j'} b_{i,j} b_{i,j'} + \frac{1}{2}\sum_j \sum_{i \neq i'} b_{i,j} b_{i',j} + \frac{1}{2}\sum_i \left(\sum_j b_{i,j} - \sum_j b_{j,i}\right)^2 + \frac{1}{2}\sum_{i,j} b_{i,j} b_{j,i} \quad (4)$$

The first term on the right side in Equation (4) is an expression that adds up $b_{i,j} \times b_{i,j'}$ for all combinations of j and j' except j=j' for any given i and further adds the resulting added value for all i's. Here j' is an integer equal to or greater than 1 and equal to or smaller than N, except i. The first term on the right side in Equation (4) is an expression representing the first condition.

The second term on the right side in Equation (4) is an expression that adds up $b_{i,j} \times b_{i',j}$ for all combinations of i and i' except i=i' for any given j and further adds the resulting added value for all j's. Here i' is an integer equal to or greater than 1 and equal to or smaller than N, except j. The second term on the right side in Equation (4) is an expression representing the second condition.

The expression in the parentheses in the third term on the right side in Equation (4) calculates the square of the subtracted value obtained by subtracting the added value of $b_{j,i}$ for all j's from the added value of $b_{i,j}$ for all j's, for any given i. The third term on the right side in Equation (4) is an expression that adds up the value calculated in the parentheses, for all i's. The third term on the right side in Equation (4) is an expression representing the third condition.

The fourth term on the right side in Equation (4) is an expression that adds $b_{i,j} \times b_{j,i}$ for all combinations of i and j. The fourth term on the right side in Equation (4) is an expression representing the fourth condition.

In all the terms of the penalty function P, 1/2 is a coefficient such that the minimum amount of shift from 0 in each term is 1. The penalty function P may be any other expression that represents the constraints satisfying the optimal path for a cycle, using a plurality of bits. For example, the penalty function P may include an expression using $b_{i,j}^2 = \times b_{i,j}$.

Numerical Analysis of Problem with Cycle

A search method according to the present embodiment numerically solves the values of a plurality of bits included in the 0-1 optimization problem as described above with the technique described in Hayato Goto, Kosuke Tatsumura, Alexander R. Dixon, "Combinatorial optimization by simulating adiabatic bifurcations in nonlinear Hamiltonian systems", Science Advances, Vol. 5, No. 4, eaav2372, 19 Apr. 2019.

When the above technique disclosed by Hayato Goto et al. is used, a plurality of bits included in the 0-1 optimization problem are associated with a plurality of virtual particles. Therefore, a plurality of particles correspond to a plurality of directed edges included in a directed graph. The entire energy (Hamiltonian) of a plurality of particles is represented by the 0-1 optimization problem. In the search method according to the present embodiment, the values of a plurality of bits are calculated by numerically solving the equations of motion of a plurality of particles by the symplectic Euler method.

For example, in the search method according to the present embodiment, the solution to the problem with a cycle is calculated by numerically solving the classical equations of motion given by Equations (5), (6), (7), and (8) by the symplectic Euler method.

$$\frac{dx_{i,j}}{dt} = y_{i,j} \tag{5}$$

$$\frac{dy_{i,j}}{dt} = -[M_C w_{i,j} + M_P(2XR_i + 2XC_j - XC_i - XR_j + x_{j,i} - 2x_{i,j})] \tag{6}$$

$$XR_i \equiv \sum_{j \neq i} x_{i,j} \tag{7}$$

$$XC_j \equiv \sum_{i \neq j} x_{i,j} \tag{8}$$

In Equations (5) to (8), t denotes time, i denotes the index of a node and is an integer equal to or greater than 1 and equal to or smaller than N, j denotes the index of a node and is an integer equal to or greater than 1 and equal to or smaller than N, except i, $w_{i,j}$ denotes the weight value allocated to a directed edge outgoing from the $i^{th}$ node and incoming to the $j^{th}$ node, $x_{i,j}$ denotes the position of a particle corresponding to the directed edge outgoing from the $i^{th}$ node and incoming to the $j^{th}$ node, $x_{j,i}$ denotes the position of a particle corresponding to the directed edge outgoing from the $j^{th}$ node and incoming to the $i^{th}$ node, and $y_{i,j}$ denotes the momentum of a particle corresponding to the directed edge outgoing from the $i^{th}$ node and incoming to the $j^{th}$ node.

In Equations (5) to (8), $XR_i$ is the first accumulative value of $x_{i,j}$ for the $i^{th}$ node. $XC_i$ is the second accumulative value of $x_{i,j}$ for the $i^{th}$ node. $XR_j$ is the first accumulative value of $x_{i,j}$ for the $j^{th}$ node. $XC_j$ is the second accumulative value of $x_{i,j}$ for the $j^{th}$ node. $M_c$ and $M_p$ are any constants.

Equation (5) is the time-derivative value of the position $x_{i,j}$ of a particle corresponding to the directed edge outgoing from the $i^{th}$ node and incoming to the $j^{th}$ node.

Equation (6) is the time-derivative value of the momentum $y_{i,j}$ of a particle corresponding to the directed edge outgoing from the $i^{th}$ node and incoming to the $j^{th}$ node. Equation (6) is proportional to the expression obtained by partially differentiating the total cost function (E in Equation (2)) of the 0-1 optimization problem with a cycle by and then replacing $b_{i,j}$ by $x_{i,j}$.

Equation (7) is the first accumulative value obtained by cumulatively adding the positions of two or more particles corresponding to outgoing two or more directed edges, for the $i^{th}$ node. Equation (8) is the second accumulative value obtained by cumulatively adding the positions of two or more particles corresponding to incoming two or more directed edges, for the $j^{th}$ node.

In the search method according to the present embodiment, the position and the momentum of each of a plurality of virtual particles are integrated with respect to time for each unit time from the initial time to the end time, using Equation (5) to Equation (8) above. In this case, the search method according to the present embodiment alternately calculates the position and the momentum, based on the symplectic Euler method. That is, the search method according to the present embodiment calculates the momentum after calculating the position or calculates the position after calculating the momentum, for each unit time.

The position of the particle is restricted to continuous values representing values between a first value (for example, 0) of the corresponding bit and a second value (for example, 1) of the corresponding bit. Note that the second value is greater than the first value.

Therefore, the search method according to the present embodiment corrects the position to the first value when the position is smaller than the first value (for example, 0), and corrects the position to the second value (for example, 1) when the position is greater than the second value, for each of a plurality of particles, for each unit time. In addition, the search method according to the present embodiment may correct the momentum to a predetermined value or to a value determined by predetermined computation when the position is smaller than the first value or greater than the second value, for each of a plurality of particles, for each unit time.

The search method according to the present embodiment then binarizes the position of each of a plurality of particles at the final time with a predetermined threshold (for example, 0.5) and outputs the binarized value as the solution of each of a plurality of bits included in the 0-1 optimization problem. A specific device that performs the processing according to such a search method will be described with reference to FIG. 5 and the subsequent figures.

The search method according to the present embodiment may calculate the solution to the problem with a cycle using Equation (9) below instead of Equation (6).

$$\frac{dy_{i,j}}{dt} = (p-1)x_{i,j} - \tag{9}$$

$$[M_C w_{i,j} + M_P(2XR_i + 2XC_j - XC_i - XR_j + x_{j,i} - 2x_{i,j})] + h_{i,j}$$

$$h_{i,j} = \{x_0 + [M_C w_{i,j} + M_P x_0(2N-3)]\}(1-p) \tag{10}$$

Here, p is 0 at the initial time, becomes 1 at the final time, and is a value monotonously increasing for each unit time. Equation (10) represents $h_{i,j}$ embedded in Equation (9), where $x_0$ is a value at the initial time of $x_{i,j}$, and N is the number of nodes included in the directed graph.

Equation (9) is an equation in which two time-dependent parameters, namely, p monotonously increasing from 0 to 1 and $h_{i,j}$ in Equation (10) dependent thereon, are added to Equation (6). These time-dependent parameters are values changing for each unit time such that the time-derivative value of the momentum at the initial time is 0, and the term $h_{i,j}$ on the right side in Equation (9), which is not dependent on the position x of a particle, is 0 at the end time.

Problem with Path Connecting Different Two Nodes

The problem with a path connecting different two nodes differs from the problem with a cycle in penalty function P.

In the problem with a path connecting different two nodes, the penalty function P expresses the conditions in which the selected path forms a path connecting two nodes in a directed graph, using a plurality of bits. The conditions in which a path connecting two nodes is formed in a directed graph are as follows.

A first condition is that, for the start node, the number of outgoing directed edges selected for the optimal path is 1 and, for the end node, the number of incoming directed edges selected for the optimal path is 1.

A second condition is that, for the start node, the number of incoming directed edges selected for the optimal path is 0 and, for the end node, the number of outgoing directed edges selected for the optimal path is 0.

A third condition is that, for each of N nodes, the number of outgoing directed edges selected for the optimal path is equal to or smaller than 1.

A fourth condition is that, for each of N nodes, the number of incoming directed edges selected for the optimal path is equal to or smaller than 1.

A fifth condition is that, for each of (N−2) nodes other than the start node and the end node, the number of outgoing directed edges selected for the optimal path and the number of incoming directed edges selected for the optimal path are equal.

A sixth condition is that the directed edge outgoing from the $i^{th}$ node and incoming to the $j^{th}$ node and the directed edge outgoing from the $j^{th}$ node and incoming to the $i^{th}$ node are not simultaneously selected for the optimal path.

The penalty function P that expresses the conditions above using a plurality of bits includes, for example, the following Expression (21-1), Expression (21-2), Expression (21-3), Expression (21-4), Expression (21-5), and Expression (21-6).

$$\sum_j b_{s,j} = \sum_i b_{i,v} = 1 \qquad (21\text{-}1)$$

$$\sum_i b_{i,s} = \sum_j b_{v,j} = 0 \qquad (21\text{-}2)$$

$$\sum_j b_{k,j} \leq 1 \qquad (21\text{-}3)$$

$$\sum_i b_{i,k} \leq 1 \qquad (21\text{-}4)$$

$$\sum_i b_{i,k} = \sum_j b_{k,j} (k \neq s \text{ and } k \neq v) \qquad (21\text{-}5)$$

$$b_{i,j} b_{j,i=0} \qquad (21\text{-}6)$$

Here, s is one specified integer equal to or greater than 1 and equal to or smaller than N, v is one specified integer equal to or greater than 1 and equal to or smaller than N, except s, and k is an integer equal to or greater than 1 and equal to or smaller than N.

Expression (21-1) represents that the value obtained by adding up $b_{s,j}$ for all j's is 1 and the value obtained by adding up $b_{i,v}$ for all i's is 1. Expression (21-1) is an equation representing the first condition.

Expression (21-2) represents that the value obtained by adding up $b_{i,s}$ for all i's is 0 and the value obtained by adding up $b_{v,j}$ for all j's is 0. Expression (21-2) is an equation representing the second condition.

Expression (21-3) represents that the value obtained by adding up $b_{k,j}$ for all j's is equal to or smaller than 1. Expression (21-3) is an equation representing the third condition.

Expression (21-4) represents that the value obtained by adding up $b_{i,k}$ for all i's is equal to or smaller than 1. Expression (21-4) is an equation representing the fourth condition.

Expression (21-5) represents that the value obtained by adding up $b_{i,k}$ for all i's, excluding s and v, and the value obtained by adding up $b_{k,j}$ for all k's, excluding s and v, are identical. Expression (21-5) is an equation representing the fifth condition.

Expression (21-6) represents that the value obtained by multiplying $b_{i,j}$ by $b_{j,i}$ is 0. Expression (21-6) is an equation representing the sixth condition.

Numerical Analysis of Problem with Path Connecting Different Two Nodes

The search method according to the present embodiment calculates the solution to the problem with a path connecting different two nodes by numerically solving the classical equations of motion given by Equation (22), Equation (23), Equation (24), Equation (25), Equation (26), and Equation (27) below by the symplectic Euler method.

$$\frac{dx_{i,j}}{dt} = y_{i,j} \qquad (22)$$

$$\frac{dy_{s,l}}{dt} = -[M_C w_{s,l} + 2M_P(XR_s - 1)] \qquad (23)$$

$$\frac{dy_{k,v}}{dt} = -[M_C w_{k,v} + 2M_P(XC_v - 1)] \qquad (24)$$

$$\frac{dy_{k,l}}{dt} = -[M_C w_{k,l} + M_P(2XR_k + 2XC_l - XC_k - XR_l + x_{l,k} - 2x_{k,l})] \qquad (25)$$

$$XR_l \equiv \sum_{j \neq i} x_{i,j} \qquad (26)$$

$$XC_j \equiv \sum_{i \neq j} x_{i,j} \qquad (27)$$

In Equation (22) to Equation (27), t is time, i denotes the index of a node and is an integer equal to or greater than 1 and equal to or smaller than N, and j denotes the index of a node and is an integer equal to or greater than 1 and equal to or smaller than N, except i.

In Equation (22) to Equation (27), s denotes the index of the path start node and is a specified one of integers equal to or greater than 1 and equal to or smaller than N, v denotes an index of the path end node and is a specified one of integers equal to or greater than 1 and equal to or smaller than N, except s, k denotes the index of a node and is an integer equal to or greater than 1 and equal to or smaller than N, except s and v, l denotes the index of a node and is an integer equal to or greater than 1 and equal to or smaller than N, except s, v, and k, $w_{s,l}$ denotes the weight value allocated to the directed edge outgoing from the path start node and incoming to the $l^{th}$ node, $w_{k,l}$ denotes the weight value allocated to the directed edge outgoing from the $k^{th}$ node and incoming to the path end node, and $w_{k,l}$ denotes the weight value allocated to the directed edge outgoing from the $k^{th}$ node and incoming to the $l^{th}$ node.

In Equation (22) to Equation (27), $x_{k,l}$ denotes the position of a particle corresponding to the directed edge outgoing from the $k^{th}$ node and incoming to the $l^{th}$ node, $x_{l,k}$ denotes the position of a particle corresponding to the directed edge outgoing from the $l^{th}$ node and incoming to the $k^{th}$ node, $y_{s,l}$ denotes the momentum of a particle corresponding to the directed edge outgoing from the path start node and incoming to the $l^{th}$ node, $y_{k,v}$ denotes the momentum of a particle corresponding to the directed edge outgoing from the $k^{th}$ node and incoming to the end node, and $y_{k,l}$ denotes the momentum of a particle corresponding to the directed edge outgoing from the $k^{th}$ node and incoming to the $l^{th}$ node.

In Equation (22) to Equation (27), $XR_s$ denotes the first accumulative value for the path start node. $XC_v$ denotes the second accumulative value for the path end node. $XR_k$ denotes the first accumulative value for the $k^{th}$ node. $XC_k$ denotes the second accumulative value for the $k^{th}$ node. $XR_l$ denotes the first accumulative value for the $l^{th}$ node. $XC_l$ denotes the second accumulative value for the $l^{th}$ node. $M_c$ and $M_p$ denote any constants.

Equation (22) denotes the time-derivative value of the position $x_{i,j}$ of a particle corresponding to the directed edge outgoing from the $i^{th}$ node and incoming to the $j^{th}$ node.

Equation (23) denotes the time-derivative value of the momentum $y_{s,l}$ of a particle corresponding to the directed edge outgoing from the path start node and incoming to the $l^{th}$ node. Equation (23) is proportional to the expression obtained by partially differentiating the total cost function (E in Equation (2)) in the 0-1 optimization problem with a path connecting different two nodes by $b_{s,l}$ and then replacing $b_{s,l}$ by $x_{s,l}$.

Equation (24) denotes the time-derivative value of the momentum $y_{k,v}$ of a particle corresponding to the directed edge outgoing from the $k^{th}$ node and incoming to the path end node. Equation (23) is proportional to the expression obtained by partially differentiating the total cost function (E in Equation (2)) in the 0-1 optimization problem with a path connecting different two nodes by $b_{k,v}$ and then replacing $b_{k,v}$ by $x_{k,v}$.

Equation (25) denotes the time-derivative value of the momentum position $y_{k,l}$ of a particle corresponding to the directed edge outgoing from the $k^{th}$ node and incoming to the $l^{th}$ node. Equation (25) is proportional to the expression obtained by partially differentiating the total cost function (E in Equation (2)) in the 0-1 optimization problem with a path connecting different two nodes by $b_{k,l}$ and then replacing $b_{k,l}$ by $x_{k,l}$.

Equation (26) denotes the first accumulative value obtained by cumulatively adding the positions of two or more particles corresponding to outgoing two or more directed edges for the $i^{th}$ node. Equation (27) denotes the second accumulative value obtained by cumulatively adding the positions of two or more particles corresponding to incoming two or more directed edges for the $j^{th}$ node.

The search method according to the present embodiment then solves the problem with a path connecting different two nodes, similarly to the optimization problem with a cycle, using Equation (22) to Equation (27) above.

However, the search method according to the present embodiment solves the problem by fixing $x_{s,v}$, $x_{v,s}$, $x_{k,s}$ and $x_{v,l}$ to a predetermined value. For example, the search method according to the present embodiment fixes $x_{s,v}$, $x_{v,s}$, $x_{k,s}$ and $x_{v,l}$ to 0.

Here, $x_{s,v}$ denotes the position of a particle corresponding to the directed edge outgoing from the path start node and incoming to the path end node, $x_{v,s}$ denotes the position of a particle corresponding to the directed edge outgoing from the path end node and incoming to the path start node, $x_{k,s}$ denotes the position of a particle corresponding to the directed edge outgoing from the $k^{th}$ node and incoming to the path start node, and $x_{v,l}$ denotes the position of a particle corresponding to the directed edge outgoing from the path end node and incoming to the $l^{th}$ node.

The search method according to the present embodiment may calculate the solution to the problem with a path connecting different two nodes, using Equation (28), Equation (29), and Equation (30) below, instead of Equation (23), Equation (24), and Equation (25).

$$\frac{dy_{s,l}}{dt} = (p-1)x_{s,l} - [M_C w_{s,l} + 2M_P(XR_s - 1)] + h_{s,l}(t) \quad (28)$$

$$\frac{dy_{k,v}}{dt} = (p-1)x_{k,v} - [M_C w_{k,v} + 2M_P(XC_v - 1)] + h_{k,v}(t) \quad (29)$$

$$\frac{dy_{k,l}}{dt} = (p-1)x_{k,l} - [M_C w_{k,l} + M_P(2XR_k + 2XC_l - XC_k - XR_l + x_{l,k} - 2x_{k,l})] + h_{k,l}(t) \quad (30)$$

Here, p is 0 at the initial time, becomes 1 at the final time, and is a value monotonously increasing for each unit time.

Equation (31) below represents $h_{s,l}$ embedded in Equation (28). Equation (32) below represents $h_{k,v}$ embedded in Equation (29). Equation (33) represents $h_{k,l}$ embedded in Equation (30). $x_0$ is a value at the initial time of $x_{i,j}$. N is the number of nodes included in the directed graph.

$$h_{s,l} = \{x_0 + M_c w_{s,l} + 2M_p[x_0(N-2)-1]\}(1-p) \quad (31)$$

$$h_{k,v} = \{x_0 + M_c w_{k,v} + 2M_p[x_0(N-2)-1]\}(1-p) \quad (32)$$

$$h_{k,l} = \{x_0 + [M_c w_{k,l} + M_p x_0(2N-3)]\}(1-p) \quad (33)$$

Equation (28) is an equation obtained by adding time-dependent parameters to Equation (23). Equation (29) is an equation obtained by adding time-dependent parameters to Equation (24). Equation (30) is an equation obtained by adding time-dependent parameters to Equation (25). The time-dependent parameters are values changing for each unit time such that the time-derivative value of the momentum at the initial time is 0, and the term h on the right side in Equations (28), (29), and (30), which is not dependent on the position x of the particle, is 0 at the end time.

Search Device 10

Figure 5:
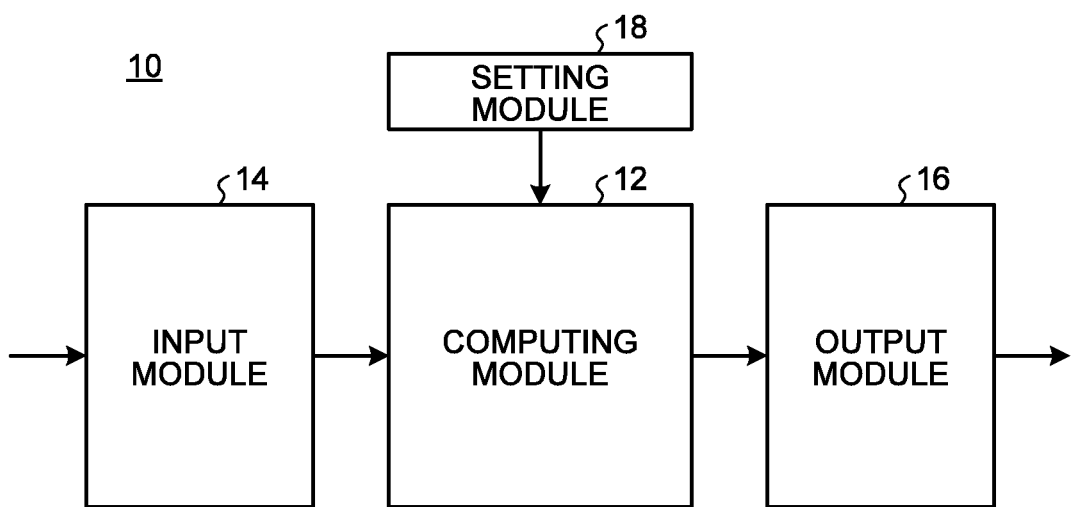
FIG. 5 is a diagram illustrating a configuration of a search device according to a first embodiment.

FIG. 5 is a diagram illustrating a configuration of a search device 10 according to the first embodiment. The search device 10 according to the first embodiment includes a computing module 12, an input module 14, an output module 16, and a setting module 18.

The computing module 12 is implemented, for example, by an information processing device. For example, the computing module 12 may be implemented by one or more processing circuits such as a central processing unit (CPU) executing a computer program. The computing module 12 may be implemented by a field programmable gate array (FPGA), a gate array, or an application specific integrated circuit (ASIC), for example.

The computing module 12 increments a parameter t denoting time from the start time (for example, 0) every unit time. The computing module 12 calculates the position and momentum of each of a plurality of virtual particles by integration with respect to time for each unit time from the initial time to the end time. The computing module 12 then calculates the solution of each of a plurality of bits included in the 0-1 optimization problem by binarizing the position of each of a plurality of particles at the end time with a preset threshold.

Prior to computing by the computing module 12, the input module 14 acquires the position and momentum of each of a plurality of particles at the start time and applies the same to the computing module 12. At the end of computing by the computing module 12, the output module 16 acquires the solution of each of a plurality of bits included in the 0-1 optimization problem from the computing module 12. The output module 16 then outputs the acquired solution. Prior to computing by the computing module 12, the setting module 18 sets parameters for the computing module 12.

Figure 6:
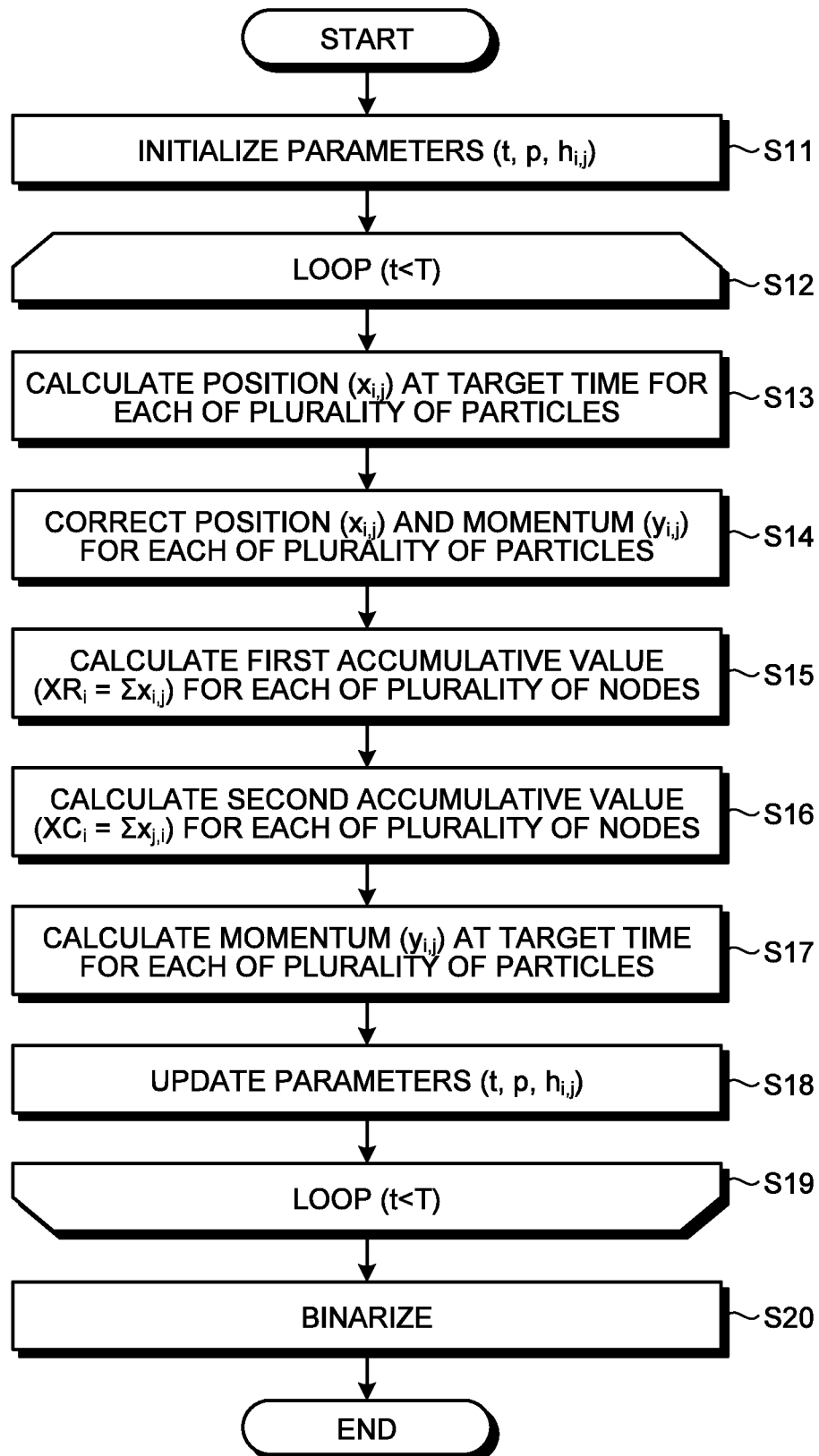
FIG. 6 is a flowchart illustrating a process flow in the search device according to the first embodiment.

FIG. 6 is a flowchart illustrating a process flow in the search device 10 according to the first embodiment. The computing module 12 of the search device 10 performs the process in accordance with the flowchart illustrated in FIG. 6.

First of all, at S11, the computing module 12 initializes the parameters. More specifically, the computing module 12 initializes t, p, and $h_{i,j}$. For example, the computing module 12 initializes t to 0 indicating the start time. The computing module 12 initializes p to 0. For example, the computing module 12 calculates the initialized $h_{i,j}$ with p=0. When p is not used at S17 described later, the computing module 12 does not initialize p. When $h_{i,j}$ is not used at S17 described later, the computing module 12 does not initialize $h_{i,j}$.

Subsequently, the computing module 12 repeats the process from S13 to S18 until t is greater than T (the loop process between S12 and S19). T denotes the end time. Thus, the computing module 12 can repeat the process from S13 to S18 for each unit time from the initial time to the end time.

At S13, for each of a plurality of particles, the computing module 12 calculates the position ($x_{i,j}$) at a target time based on the momentum ($y_{i,j}$) at the preceding time one unit time before the target time. For example, for each of a plurality of particles, the computing module 12 calculates the position ($x_{i,j}$) at a target time by adding the position ($x_{i,j}$) at the preceding time to the value obtained by multiplying the momentum ($y_{i,j}$) at the preceding time by the unit time. More specifically, the computing module 12 calculates the position ($x_{i,j}$) at a target time of the corresponding particle by Equation (41) below.

$$x_{i,j} = x_{i,j} + y_{i,j} dt \qquad (41)$$

In Equation (41), $x_{i,j}$ on the right side denotes the position at the preceding time of a particle corresponding to the directed edge outgoing from the $i^{th}$ node and incoming to the $j^{th}$ node. In Equation (41), $y_{i,j}$ on the right side denotes the momentum at the preceding time of a particle corresponding to the directed edge outgoing from the $i^{th}$ node and incoming to the $j^{th}$ node, and dt denotes the unit time.

Subsequently, at S14, for each of a plurality of particles, if the position ($x_{i,j}$) at the target time is smaller than a predetermined first value, the computing module 12 corrects the position ($x_{i,j}$) at the target time to the first value. For each of a plurality of particles, if the position ($x_{i,j}$) at the target time is greater than a predetermined second value, the computing module 12 corrects the position ($x_{i,j}$) at the target time to the second value. The second value is greater than the first value.

When the value in a bit indicating that the corresponding directed edge is not selected is 0, the first value is 0. When the value in a bit indicating that the corresponding directed edge is selected is 1, the second value is 1. For example, when the position ($x_{i,j}$) at the target time is smaller than 0, the computing module 12 sets the position ($x_{i,j}$) at the target time to 0. For example, when the position ($x_{i,j}$) at the target time is greater than 1, the computing module 12 sets the position ($x_{i,j}$) at the target time to 1. Thus, the computing module 12 can limit the position ($x_{i,j}$) of each of a plurality of particles to within the range of two values that the bit can take.

For each of a plurality of particles, when the position ($x_{i,j}$) at the target time is smaller than the first value or greater than the second value, the computing module 12 corrects the momentum ($y_{i,j}$) at the preceding time to a predetermined value or a value determined by predetermined computation. For example, for each of a plurality of particles, when the position ($x_{i,j}$) at the target time is smaller than 0 or greater than 1, the computing module 12 corrects the momentum ($y_{i,j}$) at the preceding time to a predetermined value or a value determined by predetermined computation. The predetermined value is, for example, 0. The predetermined value may be any value greater than 0 and equal to or smaller than 1. The predetermined computation may be, for example, an operation of generating random numbers equal to or greater than 0 and equal to or smaller than 1.

Subsequently, at S15, for each of a plurality of nodes included in the directed graph, the computing module 12 calculates the first accumulative value ($XR_i$) by cumulatively adding the positions ($x_{i,j}$) at the target time of two or more particles corresponding to outgoing two or more directed edges. More specifically, the computing module 12 calculates the first accumulative value ($XR_i$) corresponding to the $i^{th}$ node by Equation (42) below.

$$XR_i = \sum_{j \neq i} x_{i,j} \qquad (42)$$

Equation (42) represents a value obtained by adding up $x_{i,j}$ for all j's excluding i. The computing module 12 can easily perform computation for calculating the momentum ($y_{i,j}$) at S17 by calculating the first accumulative value ($XR_i$) for each of a plurality of nodes.

Subsequently, at S16, for each of a plurality of nodes included in the directed graph, the computing module 12 calculates the second accumulative value ($XC_j$) by cumulatively adding the positions ($x_{i,j}$) at the target time of two or more particles corresponding to incoming two or more directed edges. More specifically, the computing module 12 calculates the second accumulative value ($XC_j$) corresponding to the $j^{th}$ node by Equation (43) below.

$$XC_j = \sum_{i \neq j} x_{i,j} \qquad (43)$$

Equation (43) expresses a value obtained by adding up $x_{i,j}$ for all i's excluding j. The computing module 12 can easily perform computation for calculating the momentum ($y_{i,j}$) at S17 by calculating the second accumulative value ($XC_j$) for each of a plurality of nodes.

Subsequently, at S17, for each of a plurality of particles, the computing module 12 calculates the momentum ($y_{i,j}$) at the target time. More specifically, the computing module 12 calculates the momentum ($y_{i,j}$) at the target time, based on the first accumulative value ($XR_i$) and the second accumulative value ($XC_i$) of the end node, the first accumulative value ($XR_j$) and the second accumulative value ($XC_j$) of the start node, the weight value ($w_{i,j}$) allocated to the corresponding directed edge, the position ($x_{i,j}$) at the target time, and the position ($x_{j,i}$) at the target time of a particle corresponding to a directed edge in the opposite direction to the corresponding directed edge. For example, for each of a plurality of particles, the computing module 12 calculates the momentum ($y_{i,j}$) at the target time by adding ($y_{i,j}$) at the preceding time to the value obtained by multiplying the time-derivative value of the momentum at the preceding time by the unit time.

More specifically, the computing module 12 calculates the momentum ($y_{i,j}$) at the target time of the corresponding particle by Equation (44) below.

$$y_{i,j} = y_{i,j} - dt \left[ \frac{dy_{i,j}}{dt} \right] \quad (44)$$

In Equation (44), $y_{i,j}$ on the right side denotes the momentum at the preceding time of a particle corresponding to the directed edge outgoing from the $i^{th}$ node and incoming to the $j^{th}$ node. In Equation (44), ($y_{i,j}$/dt) on the right side denotes the time-derivative value of the momentum at the preceding time of a particle corresponding to the directed edge outgoing from the $i^{th}$ node and incoming to the $j^{th}$ node, where dt denotes the unit time.

In the case of the problem with a cycle, the time-derivative value ($y_{i,j}$/dt) of the momentum is calculated by, for example, Equation (6) or Equation (9). In the case of the problem with a path connecting different two nodes, the time-derivative value ($y_{i,j}$/dt) of the momentum is calculated by, for example, Equation (23), Equation (24), and Equation (25). In the case of the problem with a path connecting different two nodes, the time-derivative value ($y_{i,j}$/dt) of the momentum is calculated by, for example, Equation (28), Equation (29), and Equation (30).

In the case of a problem with a cycle, at S17, for each of a plurality of particles, the computing module 12 may calculate the momentum ($y_{i,j}$) at the target time in two stages of Equation (45) and Equation (46) below.

$$y_{i,j} = y_{i,j} - dt(1-p)(x_{i,j}-x_0) - dt M_c [pw_{i,j} + (1-p)h_0] \quad (45)$$

$$y_{i,j} = y_{i,j} - dt[M_p(2XR_i + 2XC_j - XC_i - XR_j + x_{j,i} - 2x_{i,j})] \quad (46)$$

In Equation (45), $h_0$ is written as Equation (47) below.

$$h_0 = -\left\{ \frac{M_p}{M_c} x_0 (2N-3) \right\} \quad (47)$$

In this case, the computing module 12 may perform computation of Equation (45) immediately after the process at S13.

Subsequently, at S18, the computing module 12 updates the parameters. More specifically, the computing module 12 initializes t, p, and $h_{i,j}$.

For example, the computing module 12 adds the unit time (dt) to t. When the start time is 0, the end time is T, and the loop is repeated $N_{step}$ times (where $N_{step}$ is an integer equal to or greater than 2), dt=T/$N_{step}$. In this case, p=p+(1/$N_{step}$). The computing module 12 does not update p when p is not used at S17. The computing module 12 does not update $h_{i,j}$ when $h_{i,j}$ is not used at S17.

Subsequently, at S19, the computing module 12 determines whether t exceeds the end time, that is, whether t is greater than T. If t does not exceed the end time, the computing module 12 returns to S13 and performs the process from S13 to S18. If t exceeds the end time, the computing module 12 proceeds to S20.

At S20, the computing module 12 binarizes the position ($x_{i,j}$) of each of a plurality of particles at the end time with a preset threshold. For example, the computing module 12 binarizes the position ($x_{i,j}$) of each of a plurality of particles at the end time with 0.5 which is the intermediate value between the first value (0) and the second value (1). The computing module 12 then outputs the value (0 or 1) obtained by binarizing the position ($x_{i,j}$) of each of a plurality of particles as the solution of each of a plurality of bits included in the 0-1 optimization problem.

As described above, the search device 10 can output solutions to the optimal path problem of finding the optimal path in a directed graph at high speed. For example, the search device 10 can output solutions to the problem with a cycle and solutions to the problem with a path connecting different two nodes at high speed.

Second Embodiment

A search device 10 according to a second embodiment is implemented in the form of a circuit on a semiconductor device such as an FPGA, a gate array, or an application specific integrated circuit. The search device 10 according to the second embodiment will be described below.

The search device 10 according to the second embodiment detects a solution to the arbitrage problem of detecting exchange arbitrage opportunities by searching a directed graph including N nodes.

Figure 7:
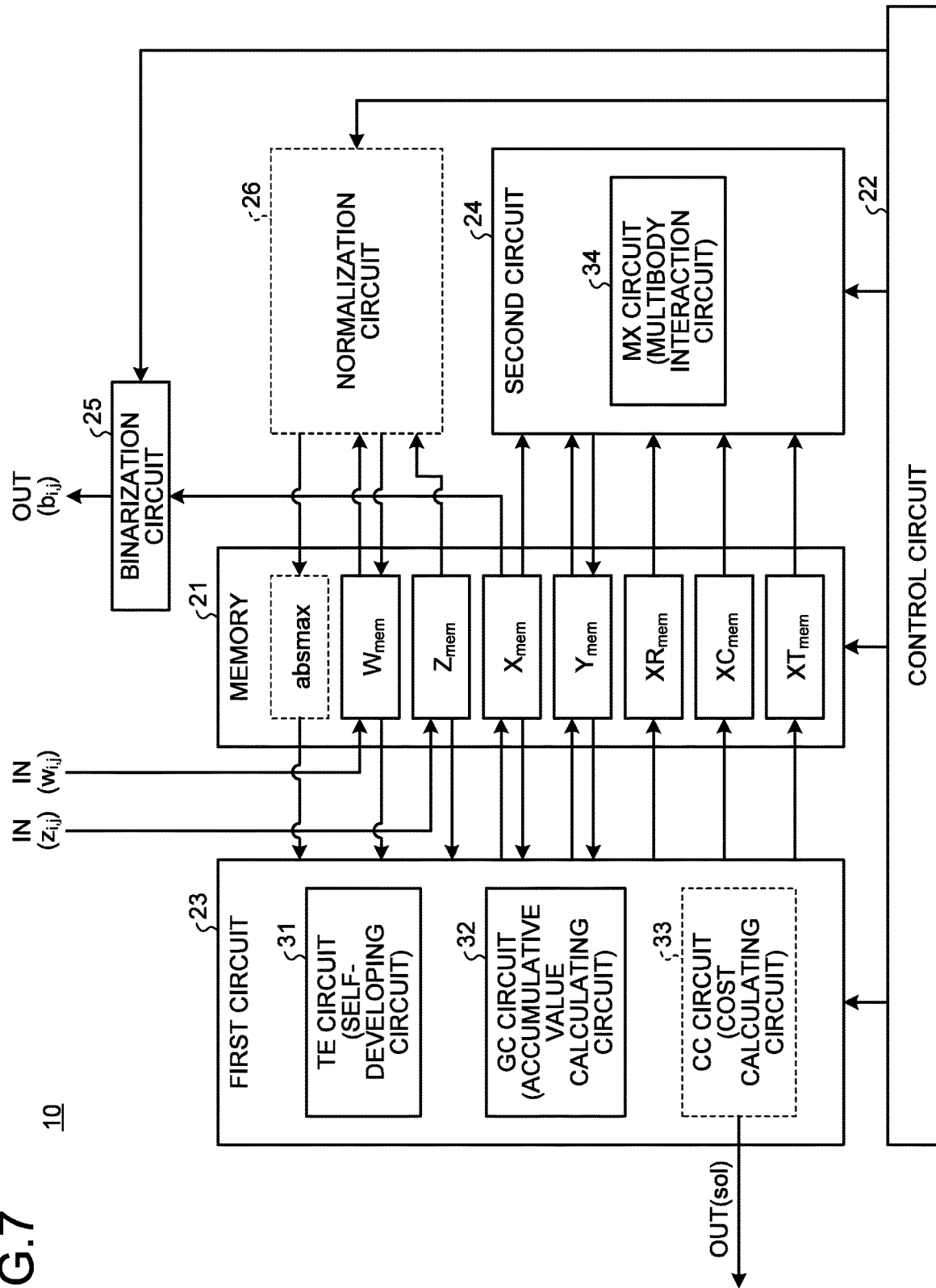
FIG. 7 is a diagram illustrating a circuit configuration of a search device according to a second embodiment.

FIG. 7 is a diagram illustrating a circuit configuration of the search device 10 according to the second embodiment. The search device 10 according to the second embodiment includes a memory 21, a control circuit 22, a first circuit 23, a second circuit 24, a binarization circuit 25, and a normalization circuit 26. The first circuit 23 includes a TE circuit 31 (self-developing circuit), a GC circuit 32 (accumulative value calculating circuit), and a CC circuit 33 (cost calculating circuit). The second circuit 24 includes an MX circuit 34 (multibody interaction circuit).

The search device 10 does not necessarily include the normalization circuit 26. The first circuit 23 does not necessarily include the CC circuit 33.

The memory 21 stores a plurality of position variables, a plurality of momentum variables, a plurality of weight values, a plurality of select-disabled flags, a plurality of first accumulative values, a plurality of second accumulative values, a plurality of inverted position variables, and a maximum absolute value.

A plurality of position variables correspond to a plurality of directed edges included in a directed graph. Each of a plurality of position variables denotes the position of a particle associated with the corresponding directed edge.

A plurality of momentum variables correspond to a plurality of directed edges. Each of a plurality of momentum variables denotes the momentum of a particle associated with the corresponding directed edge.

A plurality of weight values correspond to a plurality of directed edges. Each of a plurality of weight values is allocated to the corresponding directed edge. A plurality of weight values are written into the memory 21 from an external device, prior to computation by the first circuit 23 and the second circuit 24.

A plurality of select-disabled flags correspond to a plurality of directed edges. A plurality of select-disabled flags indicate whether the corresponding directed edge is able to be selected or unable to be selected as a path. When a plurality of select-disabled flags are, for example, 0, it is indicated that the corresponding directed edge is able to be selected as a path. When they are 1, it is indicated that the corresponding directed edge is unable to be selected as a path. Whether the directed edge is able to be selected or unable to be selected as a path is predetermined by a directed graph. A plurality of select-disabled flags are written into the memory 21 from an external device, prior to computation by the first circuit 23 and the second circuit 24.

A plurality of first accumulative values correspond to a plurality of nodes. A plurality of second accumulative values correspond to a plurality of nodes.

A plurality of inverted position variables correspond to a plurality of directed edges. A plurality of inverted position variables are individually identical with a plurality of position variables, but the correspondence between the start node and the end node is stored in the inverted form.

The maximum absolute value is the maximum value of the absolute values of a plurality of weight values before normalization.

The control circuit 22 is connected to the memory 21, the first circuit 23, the second circuit 24, the binarization circuit 25, and the normalization circuit 26. The control circuit 22 controls the computation of integrating with respect to time the position variable and the momentum variable corresponding to each of a plurality of directed edges, for each unit time from the initial time to the end time. For example, the control circuit 22 controls the unit time, controls the repetitive process, and updates parameters. The TE circuit 31 and the MX circuit 34 perform computation of integrating the position variable and the momentum variable with respect to time, for each unit time, for each of a plurality of directed edges, in accordance with control of the control circuit 22. Prior to computing, the control circuit 22 initializes a plurality of position variables and a plurality of momentum variables stored in the memory 21.

The TE circuit 31 is connected to the memory 21. The TE circuit 31 accesses the memory 21 for each unit time to perform a TE process.

More specifically, the TE circuit 31 updates the position variable at a target time of the corresponding directed edge, in accordance with the position variable and the momentum variable at the preceding time one unit time before the target time of the corresponding directed edge, for each of a plurality of directed edges, for each unit time. Thus, the TE circuit 31 can integrate the position variable with respect to time, for each unit time, for each of a plurality of directed edges.

In addition, the TE circuit 31 updates the momentum variable at the target time of the corresponding directed edge, in accordance with the momentum variable at the preceding time, the position variable at the target time of the corresponding directed edge, and the weight value allocated to the corresponding directed edge, for each of a plurality of directed edges, for each unit time. Thus, the TE circuit 31 can perform computation of the time-integral of the momentum variable up to the intermediate stage, for each of a plurality of directed edges, for each unit time.

When the position variable at the target time of the corresponding directed edge is smaller than a predetermined first value, the TE circuit 31 corrects the position variable at the target time to the first value, and when greater than a predetermined second value, the TE circuit 31 corrects the position variable at a target time to the second value, for each unit time, for each of a plurality of directed edges. The second value is greater than the first value. For example, when the position variable at the target time of the corresponding directed edge is smaller than 0, the TE circuit 31 corrects the position variable at the target time to 0, and when greater than 1, the TE circuit 31 corrects the position variable at the target value to 1, for each unit time, for each of a plurality of directed edges.

When the position variable at the target time is smaller than the first value (for example, 0) or greater than the second value (for example, 1), the TE circuit 31 corrects the momentum variable at the preceding time to a predetermined value or a value determined by predetermined computation, for each unit time, for each of a plurality of directed edges. The predetermined value is, for example, 0 or any value from 0 to 1. The value determined by predetermined computation may be, for example, a value determined by random numbers in a range from 0 to 1.

When the select-disabled flag of the corresponding directed edge indicates being unable to be selected, the TE circuit 31 replaces the position variable at the target time and the momentum variable at the target time updated up to the intermediate stage, by a predetermined value (for example, 0), for each of a plurality of directed edges.

The GC circuit 32 is connected to the memory 21. The GC circuit 32 accesses the memory 21 for each unit time to perform a GC process.

More specifically, the GC circuit 32 calculates a first accumulative value by cumulatively adding two or more position variables at the target time corresponding to outgoing two or more directed edges, for each unit time, for each of a plurality of nodes included in the directed graph. In addition, the GC circuit 32 calculates a second accumulative value by cumulatively adding two or more position variables at the target time corresponding to incoming two or more directed edges, for each unit time, for each of a plurality of nodes. The GC circuit 32 may acquire a position variable at a target time from the TE circuit 31 without through the memory 21.

The CC circuit 33 is connected to the memory 21. The CC circuit 33 accesses the memory 21 for each unit time to perform a CC process.

More specifically, the CC circuit 33 binarizes the position variable corresponding to each of a plurality of directed edges with a preset threshold, for each unit time, to determine whether each of a plurality of directed edges is selected as an optimal path at the stage of the target time. Subsequently, the CC circuit 33 determines whether two or more directed edges selected as an optimal path at the stage of the target time satisfy the constraints of optimal paths, for each unit time. Then, when the constraints are satisfied, the CC circuit 33 calculates the sum of weights obtained by synthesizing the weight values allocated to the selected two or more directed edges. For example, when the constraints are satisfied, the CC circuit 33 calculates the added value by adding the weight values allocated to the selected two or more directed edges.

The CC circuit 33 further calculates a total rate (sol) obtained when exchanges corresponding to two or more directed edges are performed, based on the sum of weight values allocated to the selected two or more directed edges. The CC circuit 33 outputs the calculated total rate (sol) to an external device.

The MX circuit 34 is connected to the memory 21. The MX circuit 34 accesses the memory 21 for each unit time to perform an MX process.

More specifically, the MX circuit 34 further updates the momentum variable at the target time of the corresponding directed edge, based on the position variable at the target time of the corresponding directed edge and the position variable at the target time of a directed edge other than the corresponding directed edge, for each of a plurality of directed edges, for each unit time. More specifically, the MX circuit 34 further updates the momentum variable at the target time of the corresponding directed edge after updating by the TE circuit 31, in accordance with the first accumulative value and the second accumulative value of the end node, the first accumulative value and the second accumulative value of the start node, the position variable at the target time of the corresponding directed edge, and the position variable at the target time corresponding to a directed edge in the opposite direction to the corresponding directed edge, for each unit time, for each of a plurality of directed edges. Thus, the MX circuit 34 can integrate with respect to time the momentum variable, integrated with respect to time up to the intermediate stage by the TE circuit 31, to the last stage, for each of a plurality of directed edges.

The binarization circuit 25 is connected to the memory 21. The binarization circuit 25 reads the position variable corresponding to each of a plurality of directed edges at the end time from the memory 21. The binarization circuit 25 binarizes the position variable corresponding to each of a plurality of directed edges at the end time with a preset threshold to calculate a solution of each of a plurality of bits included in the 0-1 optimization problem. The binarization circuit 25 then outputs the solution of each of a plurality of bits included in the 0-1 optimization problem.

The normalization circuit 26 is connected to the memory 21. When a plurality of weight values are written into the memory 21 from an external device, the normalization circuit 26 performs a normalization process for each of a plurality of weight values, prior to computing by the first circuit 23 and the second circuit 24. More specifically, the normalization circuit 26 normalizes each of a plurality of weight values based on the maximum absolute value of a plurality of weight values and writes the normalized weight values into the memory 21. The normalization circuit 26 also writes the maximum absolute value into the memory 21.

When a cycle is searched for as an optimal path, the normalization circuit 26 performs a correction process prior to the normalization process. When the sum of weights is the added value of two or more weight values allocated to two or more directed edges included in the selected path, the normalization circuit 26 adds a coefficient set for the end node and subtracts a coefficient set for the start node from the corresponding weight value, for each of a plurality of directed edges, as the correction process. A coefficient is set in advance for each of a plurality of nodes. The coefficients set for a plurality of nodes are determined such that the sum of errors of the corrected weight values from 0 is smallest.

Figure 8:
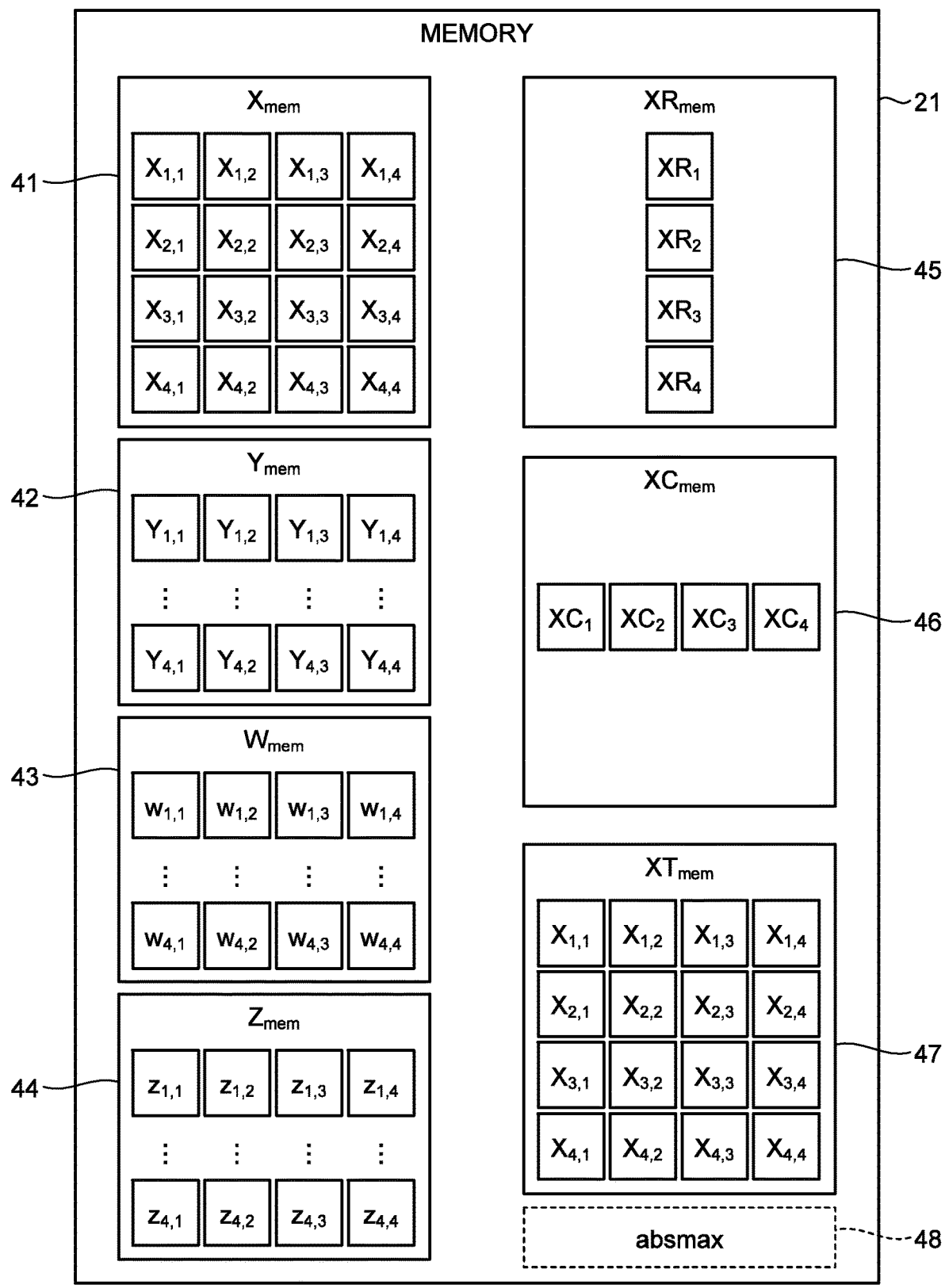
FIG. 8 is a diagram illustrating a configuration of a memory.

FIG. 8 is a diagram illustrating a configuration of the memory 21. The memory 21 includes an X memory circuit 41, a Y memory circuit 42, a W memory circuit 43, a Z memory circuit 44, an XR memory circuit 45, an XC memory circuit 46, an XT memory circuit 47, and a maximum value memory circuit 48. The X memory circuit 41, the Y memory circuit 42, the W memory circuit 43, the Z memory circuit 44, the XR memory circuit 45, the XC memory circuit 46, the XT memory circuit 47, and the maximum value memory circuit 48 each have a read port and a write port, and data is read and written independently from each other.

The X memory circuit 41 stores a position matrix ($X_{mem}$). The position matrix stores N×N position variables. In the position matrix, the row number denotes the index of the start node in a directed edge, and the column number denotes the index of the end node in a directed edge. The position matrix stores each of N×N position variables as an element with the row number and the column number of the corresponding directed edge. For example, the position matrix stores the position variable corresponding to the directed edge outgoing from the $i^{th}$ node and incoming to the $j^{th}$ node as an element at the $i^{th}$ row and $j^{th}$ column.

The directed graph does not include the directed edge of a self-loop (directed edge outgoing from the $i^{th}$ node and incoming to the $i^{th}$ node). Therefore, the position matrix stores 0, which is a value not influencing the pathfinding, as an element of diagonal entries with the same row number and column number.

The Y memory circuit 42 stores a momentum matrix ($Y_{mem}$). The momentum matrix stores N×N momentum variables. In the momentum matrix, the row number denotes the index of the start node in a directed edge, and the column number denotes the index of the end node in a directed edge. The momentum matrix stores each of N×N momentum variables as an element with the row number and the column number of the corresponding directed edge. The momentum matrix stores 0, which is a value not influencing the pathfinding, as an element of diagonal entries with the same row number and column number.

The W memory circuit 43 stores a weight value matrix ($W_{mem}$). The weight value matrix stores N×N weight values. In the weight value matrix, the row number denotes the index of the start node in a directed edge, and the column number denotes the index of the end node in a directed edge. The weight value matrix stores each of N×N weight values as an element with the row number and the column number of the corresponding directed edge. The weight value matrix stores 0, which is a value not influencing the pathfinding, as an element of diagonal entries with the same row number and column number.

The Z memory circuit 44 stores a flag matrix ($Z_{mem}$). The flag matrix stores N×N select-disabled flags. In the flag matrix, the row number denotes the index of the start node in a directed edge, and the column number denotes the index of the end node in a directed edge. The flag matrix stores each of N×N flags as an element with the row number and the column number of the corresponding directed edge. The flag matrix stores 1 to indicate being unable to be selected as a path, as an element of diagonal entries with the same row number and column number.

The XR memory circuit 45 stores a first accumulative value array ($XR_{mem}$). The first accumulative value array stores N first accumulative values. In the first accumulative value array, the array number represents the index of a node. The first accumulative value array stores each of N first accumulative values as an element with the array number of the corresponding node.

The XC memory circuit 46 stores a second accumulative value array ($XC_{mem}$). The second accumulative value array stores N second accumulative values. In the second accumulative value array, the array number represents the index of a node. The second accumulative value array stores each of N second accumulative values as an element with the array number of the corresponding node.

The XT memory circuit 47 stores an inverse position matrix ($XT_{mem}$). The inverse position matrix stores N×N position variables inversely arranged. In the inverse position matrix, the row number denotes the index of the end node in a directed edge, and the column number denotes the index of the start node in a directed edge. The inverse position matrix stores each of N×N position variables as an element with the row number and the column number of the corresponding directed edge. For example, the position matrix stores the position variable corresponding to the directed edge outgoing from the $i^{th}$ node and incoming to the $j^{th}$ node as an element at the $j^{th}$ row and $i^{th}$ column. The inverse position matrix stores 0, which is a value not influencing the pathfinding, as an element of diagonal entries with the same row number and column number.

The maximum value memory circuit 48 stores the maximum absolute value (absmax) of a plurality of weight values before normalization.

Figure 9:
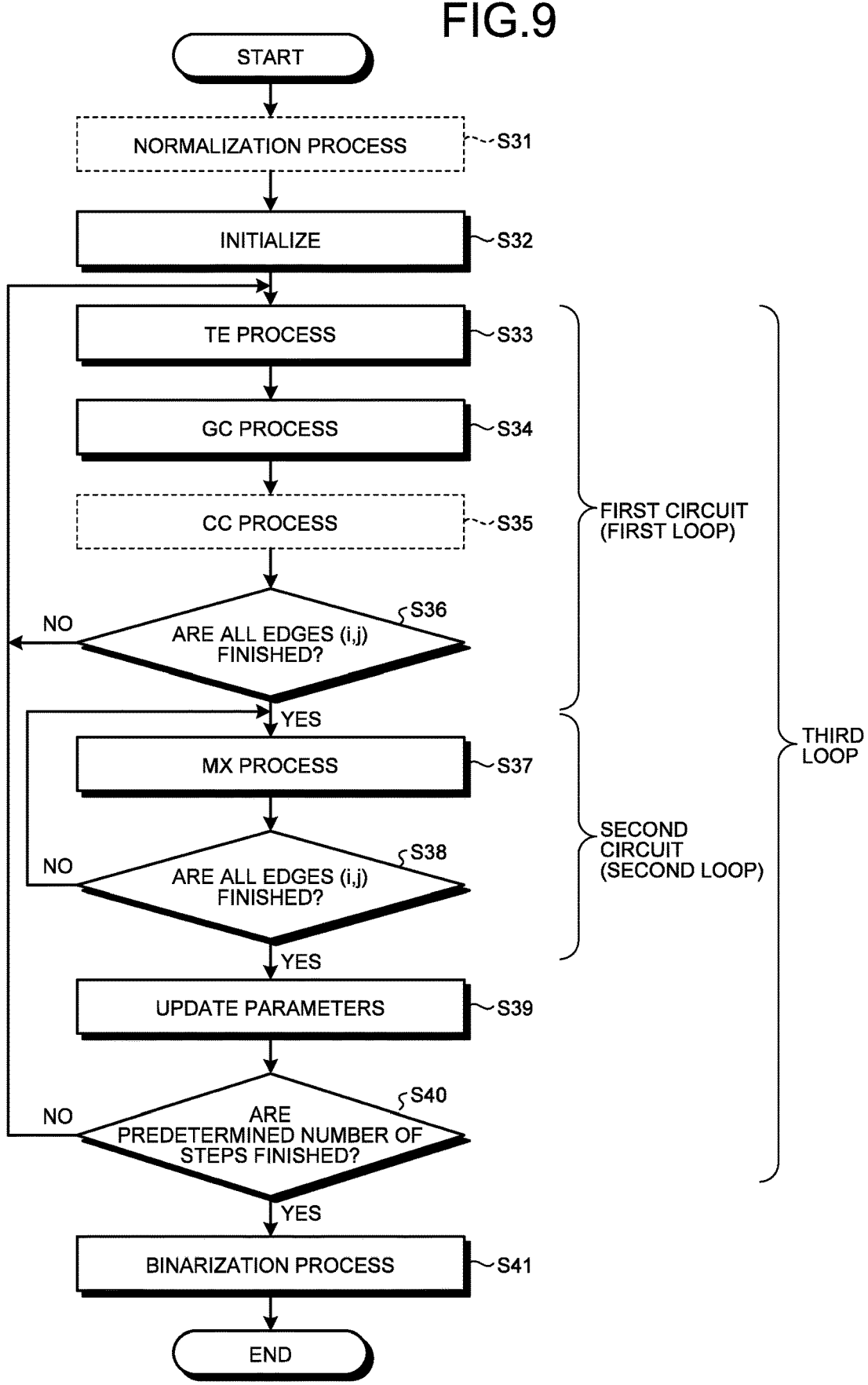
FIG. 9 is a flowchart illustrating a process flow in the search device.

FIG. 9 is a flowchart illustrating a process flow in the search device 10. The search device 10 according to the second embodiment performs the process in the flow illustrated in FIG. 9.

First of all, at S31, the normalization circuit 26 performs a normalization process and a correction process. When a plurality of weight values stored in the memory 21 have already undergone the normalization process and the correction process, the normalization circuit 26 does not perform the process at S31.

Subsequently, at S32, the control circuit 22 initializes a parameter (p), where p is 0 at the initial time. The control circuit 22 initializes a plurality of position variables stored in the X memory circuit 41 in the memory 21 to any given value. The control circuit 22 initializes a plurality of momentum variables stored in the Y memory circuit 42 in the memory 21 to any given value.

Subsequently, at S33, the TE circuit 31 performs a TE process. Subsequently, at S34, the GC circuit 32 performs a GC process. Subsequently, at S35, the CC circuit 33 performs a CC process. The TE circuit 31, the GC circuit 32, and the CC circuit 33 repeatedly perform the process at S33, S34, and S35, for each of N×N directed edges. The loop process (first loop) at S33, S34, and S35 is completed in the first circuit 23. At S36, if the process at S33 and S34 is performed N×N times (Yes at S36), the control circuit 22 proceeds to S37. The control circuit 22 can proceed to S37 even when the process at S35 is not completely finished. In this case, the process at S35 and the process at S37 are concurrently performed.

At S37, the MX circuit 34 performs an MX process. The MX circuit 34 repeatedly performs the process at S37, for each of N×N directed edges. The loop process at S37 (second loop) is completed in the second circuit 24. At S38, if the process at S37 is performed N×N times (Yes at S37), the control circuit 22 proceeds to S39.

At S39, the control circuit 22 updates the parameter (p). The control circuit 22, the first circuit 23, and the second circuit 24 repeatedly perform the process from S33 to S39 (third loop) a predetermined number of steps.

When the process from S33 to S39 (third loop) is performed once, the first circuit 23 can integrate the position variables for a unit time, with respect to time. When the process from S33 to S39 (third loop) is performed once, the first circuit 23 and the second circuit 24 can integrate the momentum variables for a unit time, with respect to time. When the process from S33 to S39 (third loop) is performed a predetermined number of steps, the first circuit 23 can integrate the position variables and the momentum variables from the initial time to the end time, with respect to time.

At S40, if the process from S33 to S39 is repeated a predetermined number of steps (Yes at S40), the control circuit 22 proceeds to S41.

At S41, the binarization circuit 25 calculates the solution of each of a plurality of bits included in the 0-1 optimization problem. The binarization circuit 25 then outputs the solution of each of a plurality of bits included in the 0-1 optimization problem. The search device 10 repeatedly performs the process from S31 to S41, for example, every certain period of time.

Figure 10:
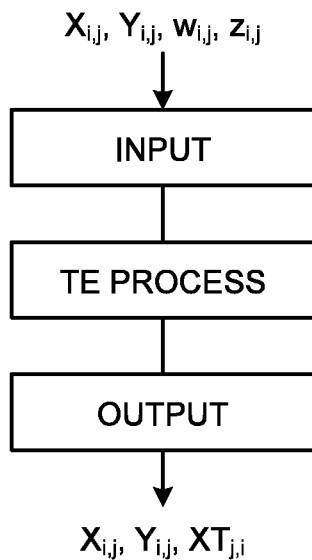
FIG. 10 is a diagram illustrating variables and values input/output to/from a TE circuit.

FIG. 10 is a diagram illustrating variables and values input/output to/from the TE circuit 31. The TE circuit 31 reads the position variable ($X_{i,j}$), the momentum variable ($Y_{i,j}$), the weight value ($w_{i,j}$), and the select-disabled flag ($z_{i,j}$) of the corresponding directed edge from the memory 21, for each of N×N directed edges. The TE circuit 31 then performs a TE process for each of N×N directed edges to generate and write the position variable ($X_{i,j}$), the inverted position variable ($XT_{j,i}$), and the momentum variable ($Y_{i,j}$) of the corresponding directed edge into the memory 21.

Figure 11:
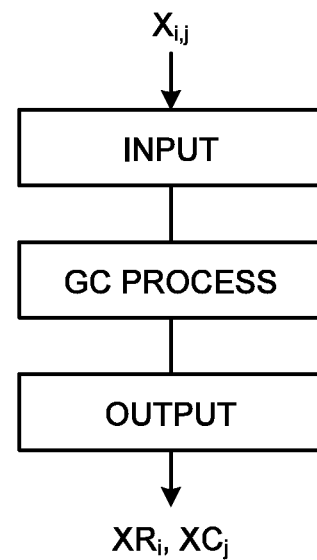
FIG. 11 is a diagram illustrating variables input/output to/from a GC circuit.

FIG. 11 is a diagram illustrating variables input/output to/from the GC circuit 32. After a TE process is performed by the TE circuit 31, the GC circuit 32 reads the position variable ($X_{i,j}$) of the corresponding directed edge from the memory 21, for each of N×N directed edges. The GC circuit 32 may acquire the position variable ($X_{i,j}$) from the TE circuit 31 without through the memory 21.

The GC circuit 32 generates and writes the first accumulative value ($XR_i$) of the corresponding node into the memory 21 every time a TE process is performed on the position variables of one row. The GC circuit 32 generates and writes the second accumulative value ($XC_j$) of the corresponding node into the memory 21 every time a TE process is performed on the position variables of one column.

Figure 12:
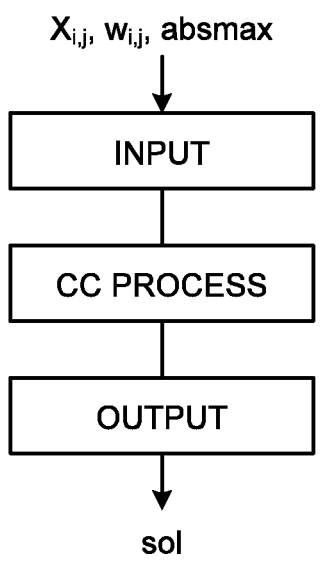
FIG. 12 is a diagram illustrating variables and values input/output to/from a CC circuit.

FIG. 12 is a diagram illustrating variables and values input/output to/from the CC circuit 33. After a TE process is performed by the TE circuit 31, the CC circuit 33 reads the position variable ($X_{i,j}$) and the weight value ($w_{i,j}$) of the corresponding directed edge from the memory 21, for each of N×N directed edges. The CC circuit 33 may acquire the position variable ($X_{i,j}$) from the TE circuit 31 without through the memory 21. The CC circuit 33 further reads the maximum absolute value (absmax) from the memory 21.

The CC circuit 33 performs a CC process for all the N×N directed edges to calculate the sum of weight values. The CC circuit 33 then calculates a total rate (sol) obtained when exchanges corresponding to two or more directed edges are performed, based on the sum of weight values allocated to the selected two or more directed edges, and outputs the calculated total rate to the outside.

Figure 13:
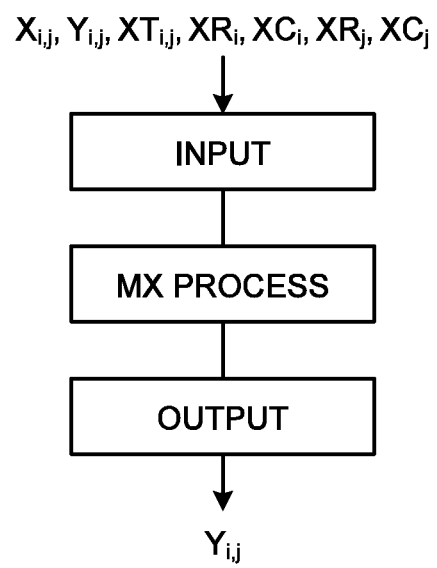
FIG. 13 is a diagram illustrating variables and values input/output to/from an MX circuit.

FIG. 13 is a diagram illustrating variables and values input/output to/from the MX circuit 34. The MX circuit 34 reads the position variable ($X_{i,j}$) of the corresponding directed edge, the momentum variable ($Y_{i,j}$), the inverted position variable ($XT_{i,j}$), the first accumulative value ($XR_i$) and the second accumulative value ($XC_i$) of the start node, and the first accumulative value ($XR_j$) and the second accumulative value ($XC_j$) of the end node from the memory 21, for each of N×N directed edges. The MX circuit 34 performs an MX process for each of N×N directed edges to update the momentum variable ($Y_{i,j}$) of the corresponding directed edge and writes the updated momentum variable into the memory 21.

Figure 14:
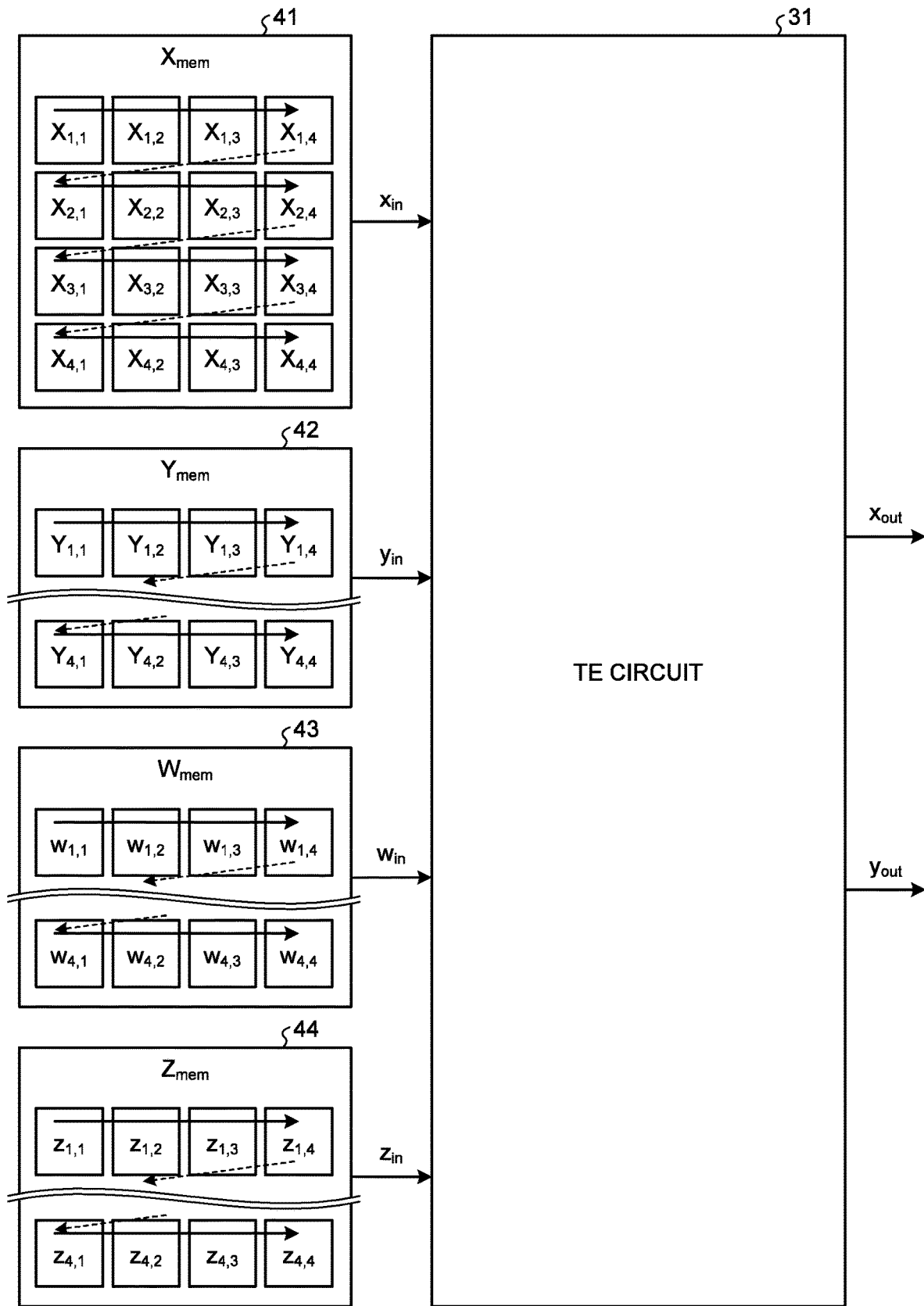
FIG. 14 is a diagram illustrating the order of variables and values read by the TE circuit.

FIG. 14 is a diagram illustrating the order of variables and values read by the TE circuit 31.

The TE circuit 31 reads the position variable ($x_{in}$) one by one from the position matrix ($X_{mem}$) stored in the X memory circuit 41, in the raster scan order in the row direction. That is, the TE circuit 31 reads the position variable ($x_{in}$) one by one, in such an order as a position variable ($X_{1,1}$) at the first row and first column, a position variable ($X_{1,2}$) at the first row and second column, . . . , a position variable ($X_{N,N-1}$) at the $N^{th}$ row and $(N-1)^{th}$ column, and a position variable ($X_{N,N}$) at the $N^{th}$ row and $N^{th}$ column. In this case, the TE circuit 31 reads a position variable ($x_{in}$) every clock cycle.

The TE circuit 31 reads the momentum variable ($y_{in}$) with the same row number and column number as the position variable, one by one, from the momentum matrix ($Y_{mem}$) stored in the Y memory circuit 42, every clock cycle. The TE circuit 31 reads the weight value ($w_{in}$) with the same row number and column number as the position variable, one by one, from the weight value matrix ($W_{mem}$) stored in the W memory circuit 43, every clock cycle. The TE circuit 31 reads the select-disabled flag ($z_{in}$) with the same row number and column number as the position variable, one by one, from the flag matrix ($Z_{mem}$) stored in the Z memory circuit 44, every clock cycle.

The TE circuit 31 then generates the updated position variable ($x_{out}$) and the updated momentum variable ($y_{out}$) with the same row number and column number, through pipeline processing, and writes them into the X memory circuit 41 and the Y memory circuit 42. That is, the TE circuit 31 writes the updated position variable ($X_{i,j}$) and momentum variable ($Y_{i,j}$) at the $i^{th}$ row and $j^{th}$ column into the X memory circuit 41 and the Y memory circuit 42, after a certain pipeline latency ($\lambda_{TE}$) has passed since the timing when a data set including the position variable ($X_{i,j}$) at the $i^{th}$ row and $j^{th}$ column is read. The TE circuit 31 also writes the updated position variable ($X_{i,j}$) with the inverted row and column into the XT memory circuit 47.

Figure 15:
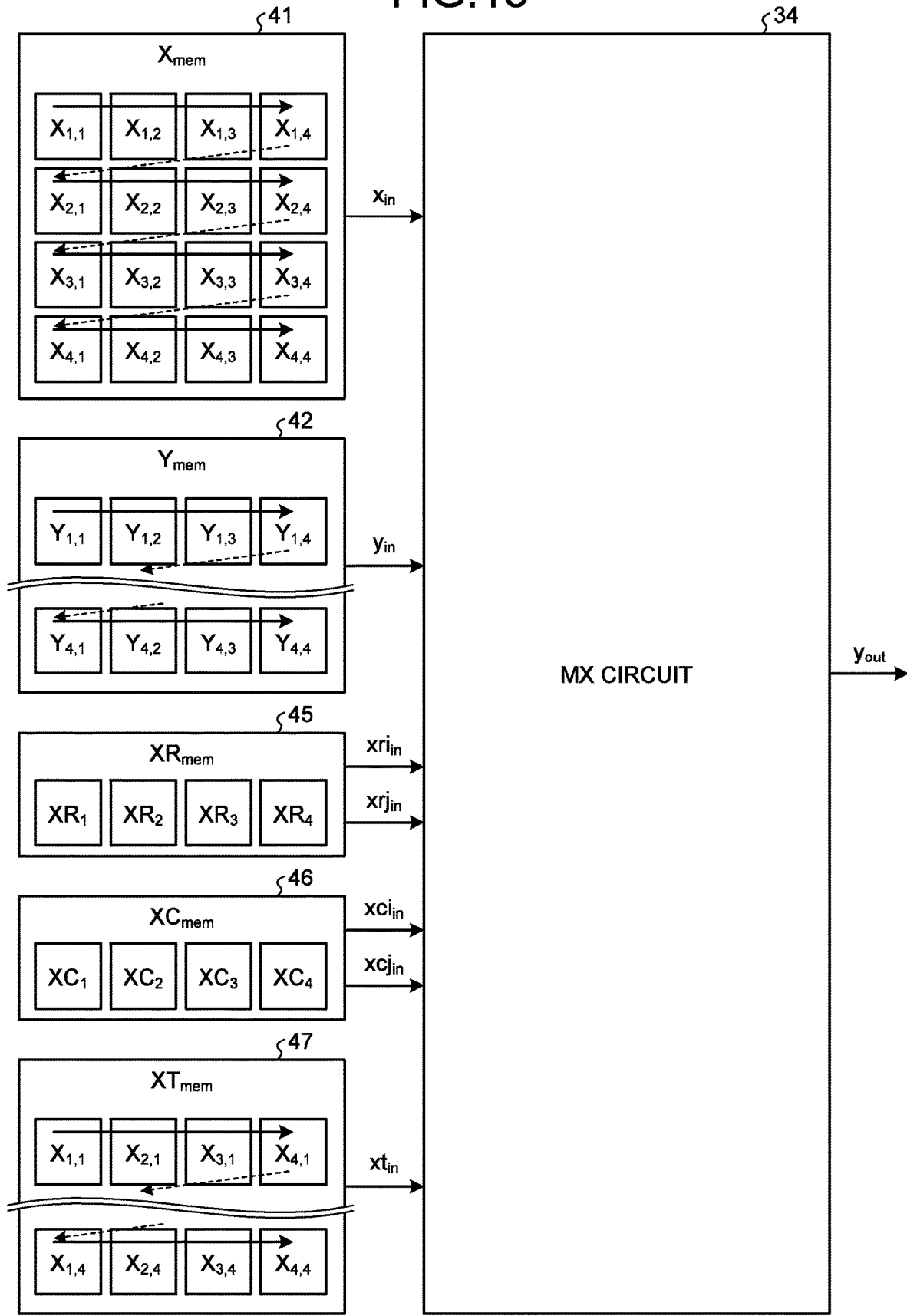
FIG. 15 is a diagram illustrating the order of variables and values read by the MX circuit.

FIG. 15 is a diagram illustrating the order of variables and values read by the MX circuit 34.

The MX circuit 34 reads the position variable ($x_{in}$) one by one from the position matrix ($X_{mem}$) stored in the X memory circuit 41, in the raster scan order in the row direction. That is, the MX circuit 34 reads the position variable ($x_{in}$) one by one, in such an order as a position variable ($X_{1,1}$) at the first row and first column, a position variable ($X_{1,2}$) at the first row and second column, . . . , a position variable ($X_{N,N-1}$) at the $N^{th}$ row and $(N-1)^{th}$ column, and a position variable ($X_{N,N}$) at the $N^{th}$ row and $N^{th}$ column. In this case, the MX circuit 34 reads a position variable ($x_{in}$) every clock cycle.

The MX circuit 34 reads the momentum variable ($y_{in}$) with the same row number and column number as the position variable from the momentum matrix ($Y_{mem}$) stored in the Y memory circuit 42, every clock cycle. The MX circuit 34 reads the inverse position variable ($xt_{in}$) with the same row number and column number as the position variable from the inverse position matrix ($XT_{mem}$) stored in the XT memory circuit 47, every clock cycle.

The MX circuit 34 reads the first accumulative value ($wri_{in}$) with the same array number as the row number of the position variable and the first accumulative value ($wrj_{in}$) with the same array number as the column number of the position variable from the first accumulative value array ($XR_{mem}$) stored in the XR memory circuit 45, every clock cycle. The MX circuit 34 reads the second accumulative value ($wci_{in}$) with the same array number as the row number of the position variable and the second accumulative value ($wcj_{in}$) with the same array number as the column number of the position variable from the second accumulative value array ($XC_{mem}$) stored in the XC memory circuit 46, every clock cycle.

The MX circuit 34 then generates the updated momentum variable ($y_{out}$) through pipeline processing and writes the generated momentum variable into the Y memory circuit 42. That is, the MX circuit 34 writes the updated momentum variable ($Y_{i,j}$) at the $i^{th}$ row and $j^{th}$ column into the Y memory circuit 42, after a certain pipeline latency ($\lambda_{MX}$) has passed since the timing when a data set including the position variable ($X_{i,j}$) at the $i^{th}$ row and $j^{th}$ column is read.

Figure 16:
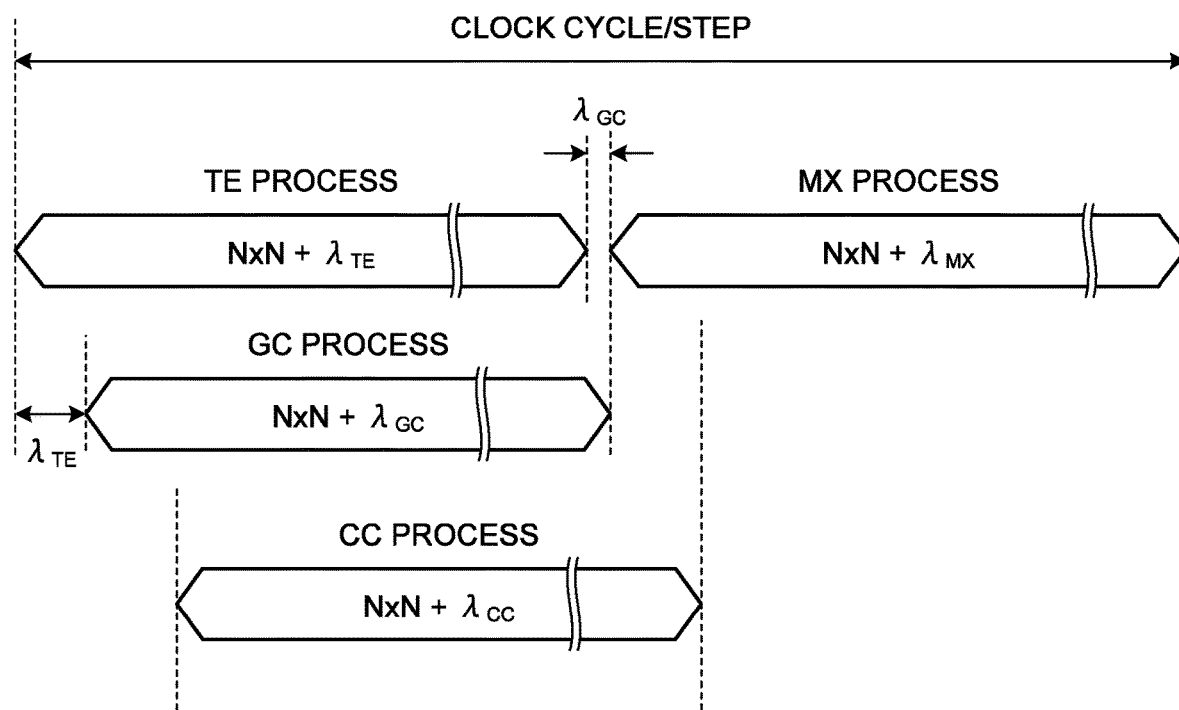
FIG. 16 is a diagram illustrating the timing of a TE process, an MX process, and a GC process.

FIG. 16 is a diagram illustrating the timing of a TE process, an MX process, and a GC process. The search device 10 repeatedly performs a TE process, an MX process, and a GC process a predetermined number of steps.

The TE circuit 31 sequentially reads the position variable and the momentum variable at the preceding time, etc. from the memory 21 for each directed edge, and sequentially calculates and writes the position variable at the target time and the momentum variable at the target time in the middle of updating into the memory 21 for each directed edge. Therefore, the period of time from the timing when the TE circuit 31 reads the top position variable (the position variable ($X_{1,1}$) at the first row and first column) until the TE circuit 31 writes the last position variable (the position variable ($X_{N,N}$) at the $N^{th}$ row and $N^{th}$ column) into the memory 21 is ($N \times N + \lambda_{TE}$) clock cycles. In this way, because of pipeline processing, the TE circuit 31 performs a TE process in ($N \times N + \lambda_{TE}$) clock cycles in one step.

The MX circuit 34 sequentially reads the position variable at the target time and the momentum variable at the target time in the middle of updating, etc. from the memory 21 for each directed edge, and sequentially calculates and writes the updated momentum variable at the target time into the memory 21 for each directed edge. Therefore, the period of time from the timing when the MX circuit 34 reads the top position variable (the position variable ($X_{1,1}$) at the first row and first column) until the MX circuit 34 writes the last momentum variable (the momentum variable ($Y_{N,N}$) at the $N^{th}$ row and $N^{th}$ column) into the memory 21 is ($N \times N + \lambda_{MX}$) clock cycles. In this way, because of pipeline processing, the MX circuit 34 performs an MX process in ($N \times N + \lambda_{MX}$) clock cycles in one step.

The GC circuit 32 sequentially acquires the position variable at the target time for each directed edge from the TE circuit 31 or the memory 21, and sequentially calculates and writes the first accumulative value and the second accumulative value into the memory 21 for each node. The GC circuit 32 similarly performs pipeline processing. The pipeline latency in the GC circuit 32 is $\lambda_{GC}$. Therefore, the GC circuit 32 performs a GC process in ($N \times N + \lambda_{GC}$) clock cycles in one step.

Here, the GC circuit 32 can perform a GC process concurrently with a TE process. However, the GC circuit 32 starts a GC process after the TE circuit 31 outputs the top position variable (the position variable ($X_{1,1}$) at the first row and first column). Therefore, the GC circuit 32 starts a GC process after $\lambda_{TE}$ has passed since a TE process is started. The GC circuit 32 terminates the GC process after $\lambda_{GC}$ has passed since the TE process ends.

The MX circuit 34 performs an MX process after a TE process and a GC process are completed. That is, the MX circuit 34 performs an MX process such that the MX process does not overlap a period in which the TE circuit 31 is performing a TE process. In other words, the TE circuit 31 performs a TE process such that the TE process does not overlap a period in which the MX circuit 34 is performing an MX process. Similarly, the MX circuit 34 performs an MX process such that the MX process does not overlap the period in which the GC circuit 32 is performing a GC process. In other words, the GC circuit 32 performs a GC process such that the GC process does not overlap a period in which the MX circuit 34 is performing an MX process. Therefore, the MX circuit 34 starts an MX process after the GC circuit 32 performs a GC process, that is, after $\lambda_{GC}$ has passed since the TE process ends.

The CC circuit 33 also performs pipeline processing. The pipeline latency in the CC circuit 33 is $\lambda_{CC}$. Therefore, the CC circuit 33 performs a CC process in ($N \times N + \lambda_{CC}$) clock cycles in one step.

The CC circuit 33 can perform a CC process concurrently with a TE process. The MX circuit 34 can perform an MX process even when a CC process is not completed. Therefore, the CC circuit 33 can perform a CC process concurrently with an MX process as long as the CC process can be completed at least before the MX process is completed.

Based on the foregoing, the process time in one step by the search device 10 is $\{2\ (N{\times}N)+\lambda_{TE}+\lambda_{GC}+\lambda_{MX}\}$ clock cycles. When the search device 10 repeats the step $N_{STEP}$ times, the entire process time by the search device 10 is $N_{STEP}{\times}\{2\ (N{\times}N)+\lambda_{TE}+\lambda_{GC}+\lambda_{MX}\}$ clock cycles. When N is sufficiently large, the entire process time by the search device 10 can be regarded as $N_{STEP}{\times}2(N{\times}N)$.

Figure 17:
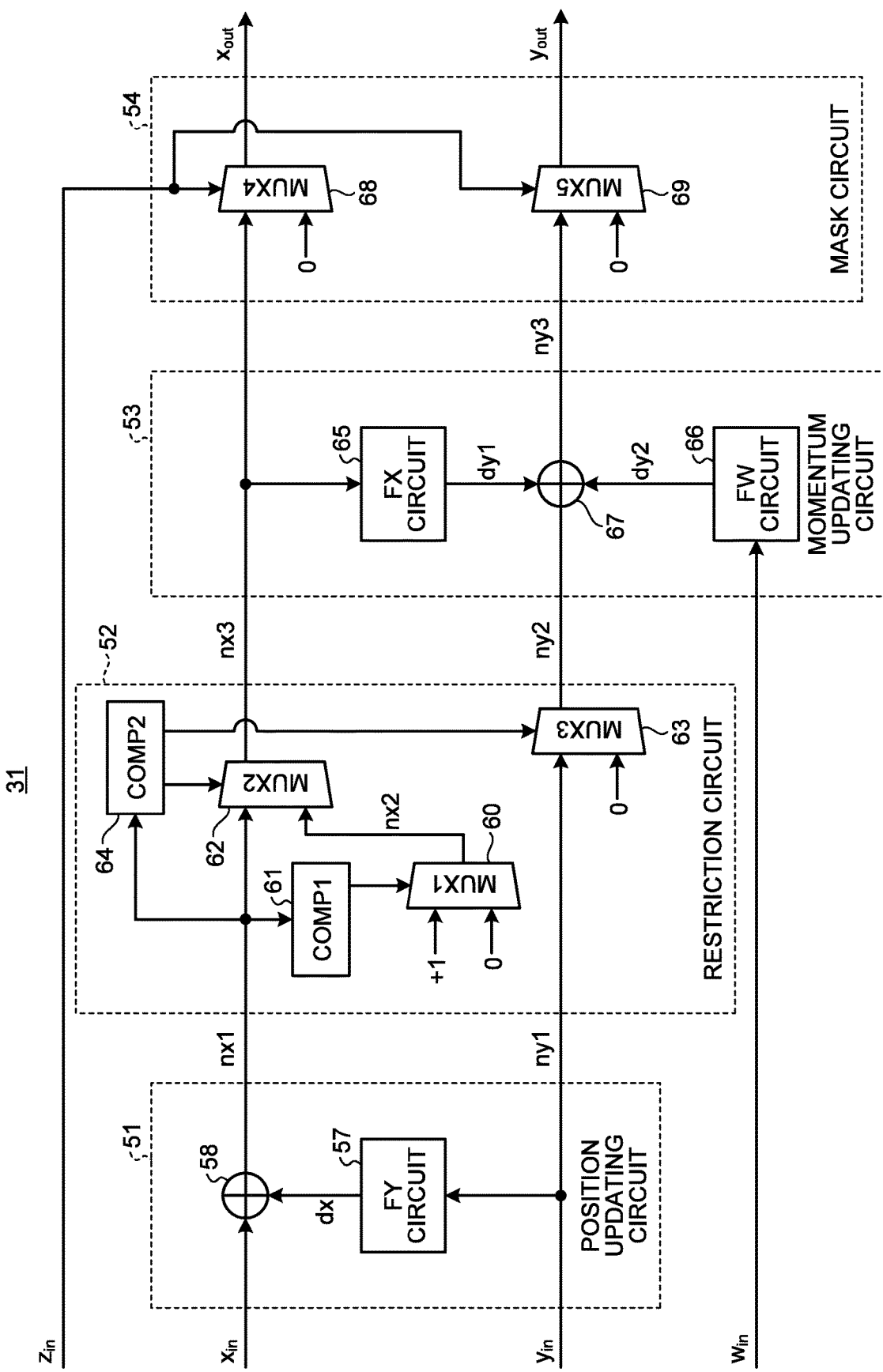
FIG. 17 is a diagram illustrating a configuration of the TE circuit.

FIG. 17 is a diagram illustrating a configuration of the TE circuit 31.

The TE circuit 31 acquires the position variable ($x_{in}$) at the preceding time calculated at the preceding step and the momentum variable ($y_{in}$) at the preceding time, every clock cycle. The TE circuit 31 acquires the weight value ($w_{in}$) and the select-disabled flag ($z_{in}$) every clock cycle.

The TE circuit 31 outputs the position variable ($x_{out}$) at the target time after a TE process, every clock cycle. The TE circuit 31 outputs the momentum variable ($y_{out}$) after a TE process, every clock cycle.

The TE circuit 31 includes a position updating circuit 51, a restriction circuit 52, a momentum updating circuit 53, and a mask circuit 54.

The position updating circuit 51 includes an FY circuit 57 and a first adder 58.

The FY circuit 57 acquires the momentum variable at the preceding time ($y_{in}$) every clock cycle. The FY circuit 57 calculates the position update amount (dx) by performing computation of Equation (61) for the momentum variable ($y_{in}$) at the preceding time, every clock cycle, where dt is a constant representing a unit time.

$$dx = FY(y_{in}) = y_{in} \times dt \qquad (61)$$

The first adder 58 acquires the position variable ($x_{in}$) at the preceding time and the position update amount (dx) output by the FY circuit 57, every clock cycle. The first adder 58 adds the position variable ($x_{in}$) at the preceding time and the position update amount (dx) as represented by Equation (62) every clock cycle to output the position variable (nx1) at the target time.

$$nx1 = x_{in} + dx \qquad (62)$$

The position updating circuit 51 outputs the position variable (nx1) at the target time every clock cycle. The position updating circuit 51 outputs the momentum variable ($y_{in}$) at the preceding time as the momentum variable (ny1) at the preceding time, every clock cycle.

Such a position updating circuit 51 can calculate the position variable at the target time of the corresponding directed edge, based on the position variable and the momentum variable at the preceding time, for each of a plurality of directed edges. Therefore, the position updating circuit 51 can integrate the position variables for a unit time, for each of a plurality of directed edges.

The restriction circuit 52 includes a first multiplexer 60, a first comparator 61, a second multiplexer 62, a third multiplexer 63, and a second comparator 64.

The first multiplexer 60 selects +1 or 0 in accordance with control of the first comparator 61 and outputs the selected one as the position variable (nx2) at the target time. The first comparator 61 determines whether the position variable (nx1) at the target time output from the position updating circuit 51 is greater than 0.5, every clock cycle. The first comparator 61 allow the first multiplexer 60 to output +1 when nx1 is greater than 0.5, and allows the first multiplexer 60 to output 0 when nx1 is equal to or smaller than 0.5.

The second multiplexer 62 selects the position variable (nx1) at the target time output from the position updating circuit 51 or the position variable (nx2) at the target time output from the first multiplexer 60 in accordance with control of the second comparator 64 and outputs the selected one as the position variable (nx3) at the target time.

The third multiplexer 63 selects the momentum variable (ny1) at the preceding time output from the position updating circuit 51 or 0 in accordance with control of the second comparator 64 and outputs the selected one as the momentum variable (ny2) at the preceding time.

The second comparator 64 determines whether the position variable (nx1) at the target time output from the position updating circuit 51 is greater than 1 or smaller than 0 or whether the position variable (nx1) at the target time output from the position updating circuit 51 is equal to or greater than 0 and equal to or smaller than 1, every clock cycle.

When nx1 is equal to or greater than 0 and equal to or smaller than 1, the second comparator 64 allows the second multiplexer 62 to select the position variable (nx1) at the target time output from the position updating circuit 51 and to output the same as the position variable (nx3) at the target time. When nx1 is equal to or greater than 0 and equal to or smaller than 1, the second comparator 64 allows the third multiplexer 63 to select the momentum variable (ny1) at the preceding time output from the position updating circuit 51 and to output the same as the momentum variable (ny2) at the preceding time.

When nx1 is greater than 1 or smaller than 0, the second comparator 64 allows the second multiplexer 62 to select the position variable (nx2) at the target time output from the first multiplexer 60 and to output the same as the position variable (nx3) at the target time. When nx1 is greater than 1 or smaller than 0, the second comparator 64 allows the third multiplexer 63 to select 0 and output the same as the momentum variable (ny2) at the preceding time.

Such a restriction circuit 52 can correct the position variable at the target time to 0 when the position variable at the target time of the corresponding directed edge is smaller than 0, and can correct the position variable at the target value to 1 when greater than 1, for each unit time, for each of a plurality of directed edges. Further, when the position variable at the target time is smaller than 0 or greater than 1, the restriction circuit 52 can correct the momentum variable at the preceding time to 0, for each of a plurality of directed edges.

The momentum updating circuit 53 includes an FX circuit 65, an FW circuit 66, and a second adder 67.

The FX circuit 65 acquires the position variable (nx3) at the target time output from the restriction circuit 52, every clock cycle. The FX circuit 65 calculates a first momentum update amount (dy1) by performing computation of Equation (63) for the position variable (nx3) at the target time, every clock cycle.

$$dy1 = FX(nx3) = -dt \times (1-p) \times (nx3 - x_0) \qquad (63)$$

Here, p is a parameter monotonously increasing for each unit time, 0 at the initial time and 1 at the end time, and $x_0$ is the position variable at the initial time.

The FW circuit 66 acquires a weight value ($w_{in}$) every clock cycle. The FW circuit 66 calculates a second momentum update amount (dy2) by performing computation of Equation (64) for the weight value ($w_{in}$), every clock cycle.

$$dy2 = FW(w_{in}) = -dt \times M_c \times [p \times w_{in} - (1-p) \times w_0] \qquad (64)$$

Here, $w_o$ is given by Equation (65).

$$w_o = -(M_p/M_c) \times x_0 \times (2 \times N - 3) \qquad (65)$$

$M_p$ and $M_c$ are predetermined constants. N is the number of nodes in the directed graph.

The second adder 67 acquires the momentum variable (ny2) at the preceding time output from the restriction circuit 52, the first momentum update amount (dy1) output from the FX circuit 65, and the second momentum update amount (dy2) output from the FW circuit 66, every clock cycle. The second adder 67 adds the position variable (ny2) at the preceding time, the first momentum update amount (dy1), and the second momentum update amount (dy2) as represented by Equation (66), every clock cycle, to output the momentum variable (ny3) at the target time.

$$ny3 = ny2 + dy1 + dy2 \qquad (66)$$

The momentum updating circuit 53 outputs the momentum variable (ny3) at the target time, every clock cycle.

Such a momentum updating circuit 53 can calculate the momentum variable at the target time of the corresponding directed edge, for each of a plurality of directed edges, based on the momentum variable at the preceding time, the position variable at the target time of the corresponding directed edge, and the weight value allocated to the corresponding directed edge. Thus, the momentum updating circuit 53 can perform computation of the integral of the momentum variable for a unit time up to the intermediate stage, for each of a plurality of directed edges.

The mask circuit 54 includes a fourth multiplexer 68 and a fifth multiplexer 69.

The fourth multiplexer 68 acquires the select-disabled flag ($z_{in}$) every clock cycle. When the select-disabled flag ($z_{in}$) is 0, the fourth multiplexer 68 outputs the position variable (nx3) at the target time output from the restriction circuit 52 as a position variable ($x_{out}$) after a TE process, every clock cycle. When the select-disabled flag ($z_{in}$) is 1, the fourth multiplexer 68 outputs 0 as a position variable ($x_{out}$) after a TE process, every clock cycle.

The fifth multiplexer 69 acquires the select-disabled flag ($z_{in}$) every clock cycle. When the select-disabled flag ($z_{in}$) is 0, the fifth multiplexer 69 outputs the momentum variable (ny3) at the target time output from the momentum updating circuit 53 as a momentum variable ($y_{out}$) after a TE process, every clock cycle. When the select-disabled flag ($z_{in}$) is 1, the fifth multiplexer 69 outputs 0 as a momentum variable ($y_{out}$) after a TE process, every clock cycle.

Such a mask circuit 54 can replace the position variable at the target value and the momentum variable at the target value with a predetermined value 0, for each of a plurality of directed edges, when the select-disabled flag of the corresponding directed edge indicates being unable to be selected.

Figure 18:
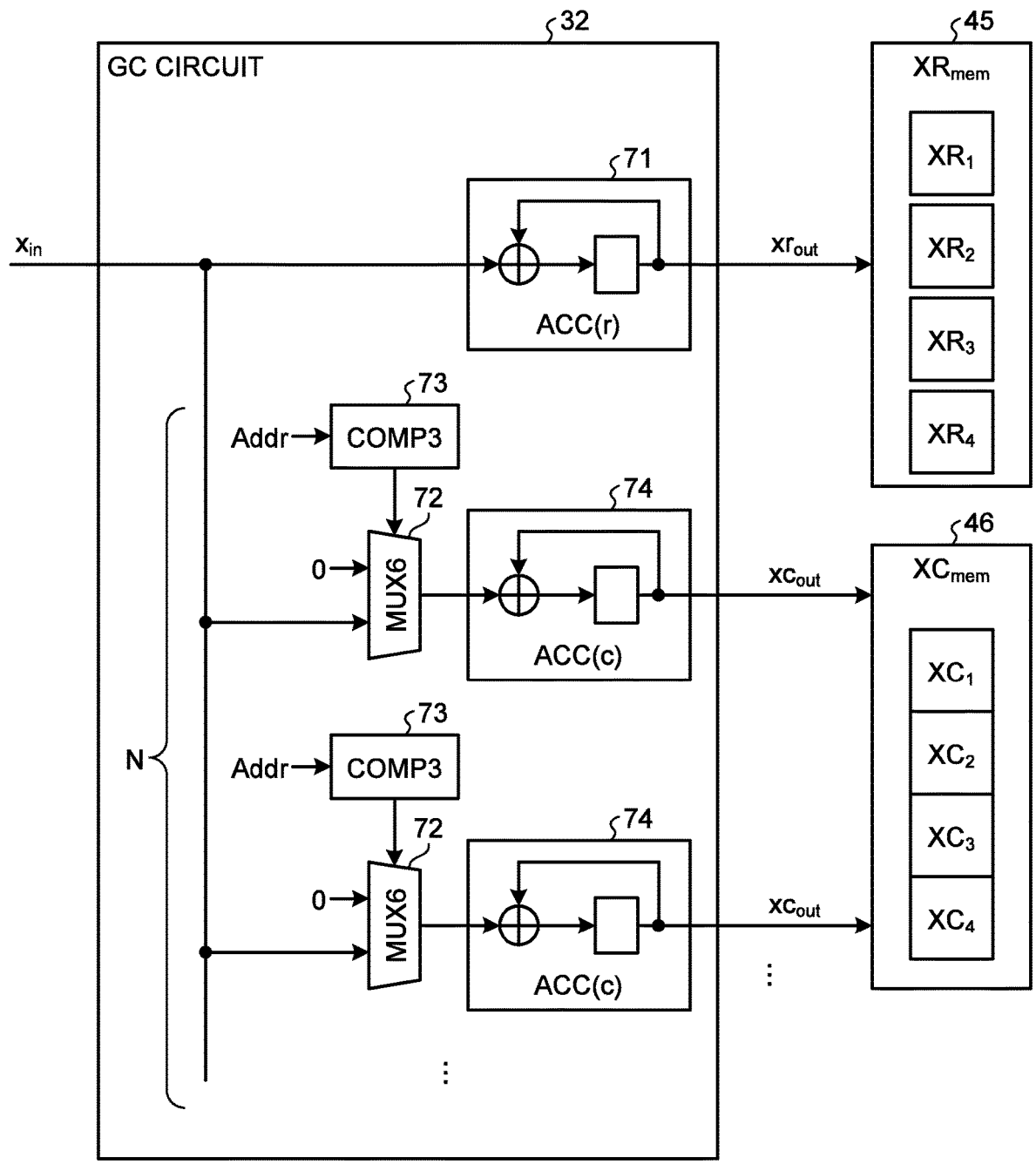
FIG. 18 is a diagram illustrating a configuration of the GC circuit.
Figure 19:
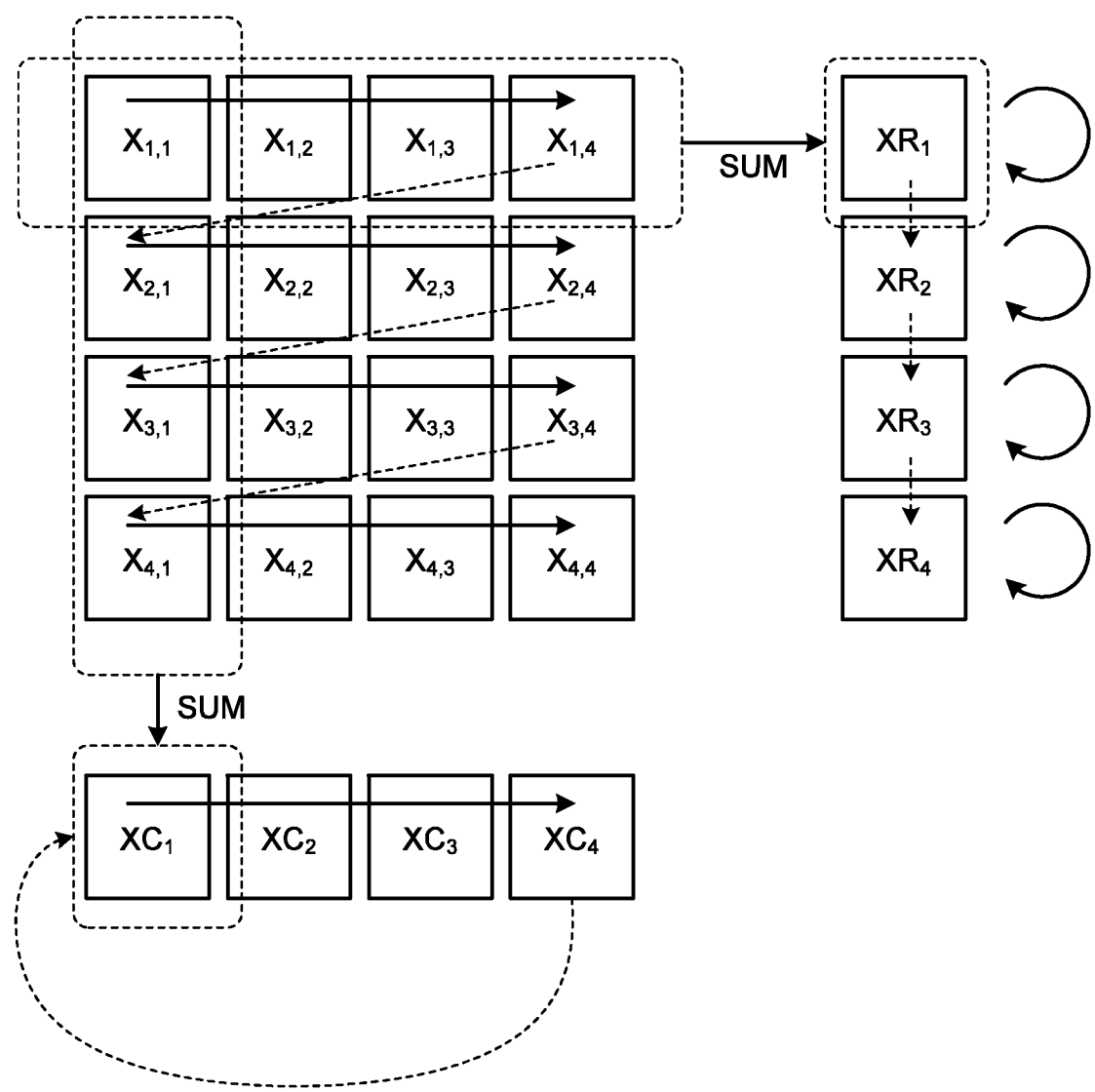
FIG. 19 is a diagram illustrating the order in which position variables are acquired by the GC circuit.

FIG. 18 is a diagram illustrating a configuration of the GC circuit 32 with the XR memory circuit 45 and the XC memory circuit 46. FIG. 19 is a diagram illustrating the order in which the position variables are acquired by the GC circuit 32 and the order in which the first accumulative values and the second accumulative values are calculated.

The GC circuit 32 acquires a position variable ($x_{in}$) at a target time every clock cycle. More specifically, as illustrated in FIG. 19, the GC circuit 32 acquires the position variable ($x_{in}$) after subjected to a TE process, in the raster scan order in the row direction, from the position variable ($X_{1,1}$) at the first row and first column to the position variable ($X_{N,N}$) at the $N^{th}$ row and $N^{th}$ column.

The GC circuit 32 includes a row-direction cumulative addition circuit 71 (ACC(r)), N sixth multiplexers 72, N third comparators 73, and N column-direction cumulative addition circuits 74 (ACC(c)).

The row-direction cumulative addition circuit 71 acquires the position variable ($x_{in}$) after a TE process, every clock cycle. The row-direction cumulative addition circuit 71 cumulatively adds the acquired position variable ($x_{in}$), every clock cycle. In this case, as illustrated in FIG. 19, the row-direction cumulative addition circuit 71 cumulatively adds the position variables in a unit of N.

The row-direction cumulative addition circuit 71 outputs the calculated cumulative added value for each row (every N clock cycles) as the first accumulative value ($xr_{out}$). Thus, the row-direction cumulative addition circuit 71 can calculate N first accumulative values ($xr_{out}$). The row-direction cumulative addition circuit 71 stores each of the calculated N first accumulative values ($Xr_{out}$), as an element with the corresponding array number, into the first accumulative value array ($XR_{mem}$) stored in the XR memory circuit 45.

N sixth multiplexers 72 are associated with N columns. Each of N sixth multiplexers 72 acquires a position variable ($x_{in}$) every clock cycle. Each of N sixth multiplexers 72 outputs the acquired position variable ($x_{in}$) or 0 in accordance with control of the corresponding third comparator 73.

N third comparators 73 are associated with N columns. Each of N third comparators 73 determines whether the column number of the acquired position variable ($x_{in}$) is the corresponding column, every clock cycle. When the column number of the acquired position variable ($x_{in}$) is the corresponding column, each of N third comparators 73 allows the corresponding sixth multiplexer 72 to output the position variable ($x_{in}$). When the column number of the acquired position variable ($x_{in}$) is not the corresponding column, each of N third comparators 73 allows the corresponding sixth multiplexer 72 to output 0.

N column-direction cumulative addition circuits 74 are associated with N columns. Each of N column-direction cumulative addition circuits 74 cumulatively outputs all the position variables (the position variables ($x_{in}$) for N×N clock cycles) output from the corresponding sixth multiplexer 72. Each of N sixth multiplexers 72 outputs a position variable other than the corresponding column as 0. Therefore, as illustrated in FIG. 19, each of N column-direction cumulative addition circuits 74 can output a cumulative added value obtained by cumulatively adding N position variables ($x_{in}$) included in the corresponding column.

Each of N column-direction cumulative addition circuits 74 outputs the calculated cumulative added value as a second accumulative value ($xc_{out}$) of the corresponding column. Each of N column-direction cumulative addition circuits 74 stores the calculated second accumulative value ($xc_{out}$), as an element with the corresponding array number, into the second accumulative value array ($XC_{mem}$) stored in the XC memory circuit 46.

Figure 20:
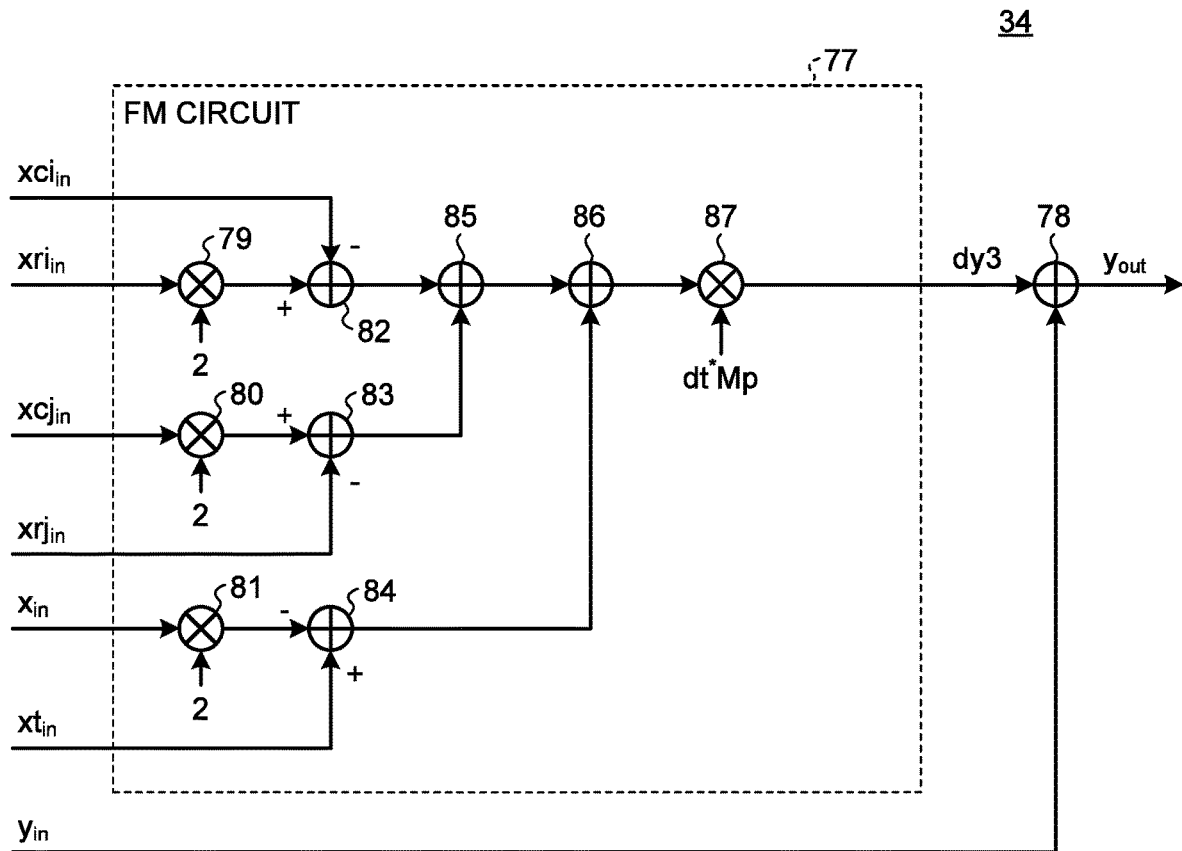
FIG. 20 is a diagram illustrating a configuration of the MX circuit.

FIG. 20 is a diagram illustrating a configuration of the MX circuit 34.

The MX circuit 34 acquires a position variable ($x_{in}$) after a TE process, an inverted position variable ($xt_{in}$) after a TE process, and a momentum variable ($y_{in}$) after a TE process, every clock cycle. The MX circuit 34 acquires a first accumulative value ($xrj_{in}$) with the same array number as the row number of the position variable ($x_{in}$) and a first accumulative value ($xrj_{in}$) with the same array number as the column number of the position variable ($x_{in}$), every clock cycle. The MX circuit 34 acquires a second accumulative value ($xci_{in}$) with the same array number as the row number of the position variable ($x_{in}$) and a second accumulative value ($xcj_{in}$) with the same array number as the column number of the position variable ($x_{in}$), every clock cycle.

The MX circuit 34 then outputs the momentum variable ($y_{out}$) at the target time after an MX process, every clock cycle.

The MX circuit 34 includes an FM circuit 77 and a third adder 78.

The FM circuit 77 includes a first multiplier 79, a second multiplier 80, a third multiplier 81, a first subtractor 82, a second subtractor 83, a third subtractor 84, a first internal adder 85, a second internal adder 86, and a fourth multiplier 87.

The first multiplier 79 multiplies the first accumulative value ($xri_{in}$) by 2. The second multiplier 80 multiplies the second accumulative value ($xcj_{in}$) by 2. The third multiplier 81 multiplies the position variable ($x_{in}$) by 2.

The first subtractor 82 subtracts the second accumulative value ($xci_{in}$) from the output value ($2 \times (xri_{in})$) of the first multiplier 79. The second subtractor 83 subtracts the first accumulative value ($xrj_{in}$) from the output value ($2 \times (xcj_{in})$) of the second multiplier 80. The third subtractor 84 subtracts the output value ($2 \times (x_{in})$) of the third multiplier 81 from the inverted position variable ($xt_{in}$).

The first internal adder 85 adds the output value of the first subtractor 82 to the output value of the second subtractor 83. The second internal adder 86 adds the output value of the first internal adder 85 to the output value of the third subtractor 84. The fourth multiplier 87 multiplies the output value of the second internal adder 86 by $dt \times M_p$.

Such an FM circuit 77 calculates a third momentum update amount (dy3) by performing computation of Equation (67) every clock cycle.

$$dy3 = dt \times M_p \times \{2 \times xri_{in} + 2 \times xcj_{in} - xci_{in} - xrj_{in} + xt_{in} - 2 \times (x_{in})\} \quad (67)$$

The third adder 78 acquires the momentum variable ($y_{in}$) after a TE process and the third momentum update amount (dy3) output by the FM circuit 77, every clock cycle. The third adder 78 adds the momentum variable ($y_{in}$) after a TE process to the third momentum update amount (dy3) every clock cycle as illustrated in Equation (68) to output the momentum variable ($y_{out}$) at the target time.

$$y_{out} = y_{in} + dy3 \quad (68)$$

Such an MX circuit 34 can further update the momentum variable at the target time of the corresponding directed edge after updating by the TE circuit 31, for each of a plurality of directed edges, in accordance with the first accumulative value and the second accumulative value of the end node, the first accumulative value and the second accumulative value of the start node, the position variable at the target time of the corresponding directed edge, and the position variable at the target time corresponding to a directed edge in the opposite direction to the corresponding directed edge. Thus, the MX circuit 34 can integrate the momentum variable, integrated with respect to time up to the intermediate stage by the TE circuit 31, for a unit time, to the last stage, for each of a plurality of directed edges.

Figure 21:
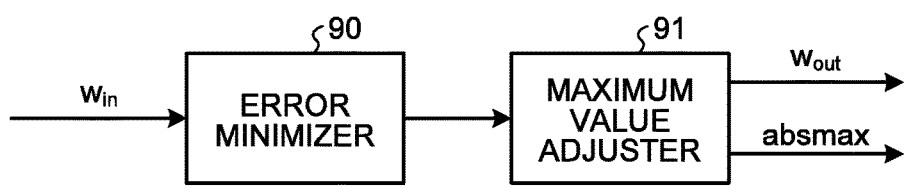
FIG. 21 is a diagram illustrating a configuration of a normalization circuit.

FIG. 21 is a diagram illustrating a configuration of the normalization circuit 26. When a plurality of weight values ($w_{in}$) are written into the memory 21 from an external device, the normalization circuit 26 acquires a plurality of weight values ($w_{in}$) written in the memory 21.

The normalization circuit 26 includes an error minimizer 90 and a maximum value adjuster 91.

Letting $r_{i,j}$ be an exchange rate allocated to a directed edge outgoing from the $i^{th}$ node and incoming to the $j^{th}$ node, the error minimizer 90 corrects each of a plurality of weight values such that the exchange rate is $r_{i,j}' = (a_i/a_j) \times r_{i,j}$, where $a_i$ is a coefficient set for the $i^{th}$ node and $a_j$ is a coefficient set for the $j^{th}$ node.

When a solution to the arbitrage problem is calculated, the search device 10 searches for a cycle as an optimal path. Therefore, when all the exchange rates allocated to the directed edges included in a cycle are multiplied, a is cancelled, and such correction does not change the sum of weights of the optimal path.

When $r_{i,j}'$ is close to 1, the search device 10 can accurately calculate the sum of weights. Therefore, $a_i$ and $a_j$ are preset such that $r_{i,j}'$ approaches 1. In the present embodiment, the weight value is written as $w_{i,j} = -\log(r_{i,j})$. In the present embodiment, therefore, it is preset such that $w'_{i,j} = -\log(a_i/a_j (r_{i,j}))$ approaches 0.

For example, $a_i$ and $a_j$ that make $w'_{i,j}$ as close as 0 can be calculated by, for example, using the least-squares method such that the sum of squares of $w'_{i,j}$ is minimized. That is, $a_i$ and $a_j$ that make $w'_{i,j}$ as close as 0 can be derived by minimizing Equation (71).

$$W = \sum_{i,j} w_{i,j}'^2 = \sum_{i,j} (w_{i,j} - \alpha_i + \alpha_j)^2 \quad (71)$$

$$\alpha_i \equiv \log a_i$$

Here $\alpha_i$ and $\alpha_j$ that minimize Equation (71) can be calculated by solving simultaneous equations in Equation (72).

$$\frac{\partial W}{\partial \alpha_i} = -2 \sum_{j \neq i} (w_{i,j} - \alpha_i + \alpha_j) + 2 \sum_{j \neq i} (w_{j,i} - \alpha_j + \alpha_i) = 0 \quad (72)$$

The error minimizer 90 has the coefficient ($a_i$) preset for each of a plurality of nodes calculated in advance. The coefficient ($a_i$) is calculated in advance, for example, by solving the simultaneous equations in Equation (72).

The maximum value adjuster 91 acquires a plurality of weight values corrected by the error minimizer 90. The maximum value adjuster 91 normalizes each of a plurality of weight values, based on the maximum absolute value (absmax) of a plurality of weight values.

More specifically, the maximum value adjuster 91 detects the maximum absolute value (absmax) from a plurality of corrected weight values. The maximum value adjuster 91 divides a plurality of corrected weight values by the maximum absolute value (absmax). Thus, the maximum value adjuster 91 can normalize a plurality of weight values such that the maximum absolute value is 1.

The normalization circuit 26 writes a plurality of weight values ($w_{out}$) normalized by the maximum value adjuster 91 into the W memory circuit 43 in the memory 21. The normalization circuit 26 also writes the maximum absolute value (absmax) detected by the maximum value adjuster 91 into the maximum value memory circuit 48 in the memory 21.

Such a normalization circuit 26 can accurately calculate the sum of weights by normalizing a plurality of weight values.

Figure 22:
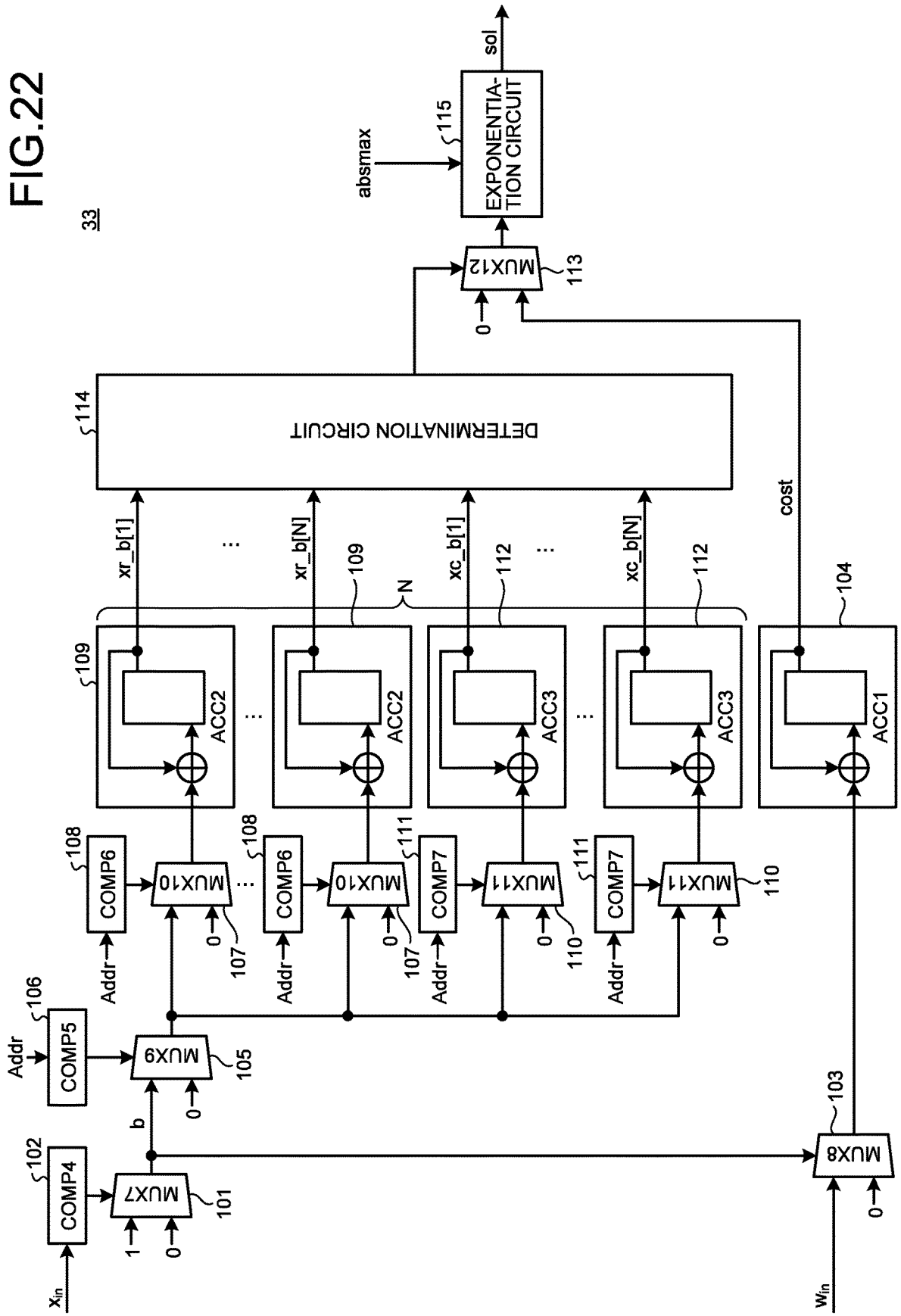
FIG. 22 is a diagram illustrating a configuration of the CC circuit.

FIG. 22 is a diagram illustrating a configuration of the CC circuit 33.

The CC circuit 33 acquires a position variable ($x_{in}$) at a target time, every clock cycle. More specifically, the CC circuit 33 reads the position variable ($x_{in}$) one by one from the position matrix ($X_{mem}$) stored in the memory 21, in the raster scan order in the row direction. The CC circuit 33 may acquire the position variable ($x_{in}$) from the TE circuit 31 without through the memory 21.

The CC circuit 33 acquires a weight value ($w_{in}$) with the same row number and column number as the position variable ($x_{in}$), every clock cycle. More specifically, the CC circuit 33 reads the weight value ($w_{in}$) one by one from the weight value matrix ($W_{mem}$) stored in the memory 21, in the raster scan order in the row direction.

The CC circuit 33 includes a seventh multiplexer 101, a fourth comparator 102, an eighth multiplexer 103, a first cumulative adder 104, a ninth multiplexer 105, a fifth comparator 106, N tenth multiplexers 107, N sixth comparators 108, N second cumulative adders 109, N eleventh multiplexers 110, N seventh comparators 111, N third cumulative adders 112, a twelfth multiplexer 113, a determination circuit 114, and an exponentiation circuit 115.

The seventh multiplexer 101 outputs 0 or 1 in accordance with control of the fourth comparator 102 every clock cycle.

The fourth comparator 102 acquires a position variable ($x_{in}$) every clock cycle. The fourth comparator 102 determines whether the acquired position variable ($x_{in}$) is greater than 0.5, every clock cycle. When the position variable ($x_{in}$) is greater than 0.5, the fourth comparator 102 allows the seventh multiplexer 101 to output 1, and when the position variable ($x_{in}$) is equal to or smaller than 0.5, the fourth comparator 102 allows the seventh multiplexer 101 to output 0. That is, the fourth comparator 102 allows the seventh multiplexer 101 to output a bit (b) obtained by binarizing the position variable ($x_{in}$) with a threshold, every clock cycle.

The eighth multiplexer 103 outputs the weight value ($w_{in}$) or 0 in accordance with the bit (b) output from the seventh multiplexer 101, every clock cycle. More specifically, the eighth multiplexer 103 outputs the weight value ($w_{in}$) when the bit (b) is 1 and outputs 0 when the bit (b) is 0, every clock cycle. That is, for each of a plurality of directed edges, when it is included in the optimal path, the eighth multiplexer 103 outputs the weight value ($w_{in}$), and when it is not included in the optimal path, the eighth multiplexer 103 outputs 0.

The first cumulative adder 104 cumulatively adds the weight values output from the eighth multiplexer 103, every clock cycle. More specifically, the first cumulative adder 104 cumulatively adds the weight values of N×N clock cycles from the first row and first column to the $N^{th}$ row and $N^{th}$ column. The eighth multiplexer 103 outputs the weight value of a directed edge not included in the optimal path as 0. Therefore, the first cumulative adder 104 can cumulatively add the weight values corresponding to all the directed edges selected as the optimal path. That is, the first cumulative adder 104 can generate the sum of weights of all the directed edges selected as the optimal path. After the process for N×N clock cycles from the first row and first column to the $N^{th}$ row and $N^{th}$ column is completed, the first cumulative adder 104 outputs the cumulative added value of weight values as the sum of weights (cost).

The ninth multiplexer 105 acquires a bit (b) output from the seventh multiplexer 101, every clock cycle. The ninth multiplexer 105 outputs a bit (b) or 0 in accordance with control of the fifth comparator 106.

The fifth comparator 106 acquires the row number and column number of a position variable ($x_{in}$) every clock cycle. The fifth comparator 106 determines whether the row number and the column number agree. When the row number and the column number agree, the fifth comparator 106 allows the ninth multiplexer 105 to output 0, and when the row number and the column number do not agree, the fifth comparator 106 allows the ninth multiplexer 105 to output a bit (b), every clock cycle. That is, since no directed edge exists when the row number and the column number agree, the fifth comparator 106 sets the bit (b) to 0.

N tenth multiplexers 107 are associated with N rows. Each of N tenth multiplexers 107 acquires a bit (b) output from the ninth multiplexer 105, every clock cycle. Each of N tenth multiplexers 107 outputs the acquired bit (b) or 0 in accordance with control of the corresponding sixth comparator 108.

N sixth comparators 108 are associated with N rows. Each of N sixth comparators 108 determines whether the row number of the acquired bit (b) is the corresponding row, every clock cycle. When the row number of the acquired bit (b) is the corresponding row, each of N sixth comparators 108 allows the corresponding tenth multiplexer 107 to output a bit (b). When the row number of the acquired bit (b) is not the corresponding row, each of N sixth comparators 108 allows the corresponding tenth multiplexer 107 to output 0.

N second cumulative adders 109 are associated with N rows. Each of N second cumulative adders 109 cumulatively adds all the bits (bits (b) for N×N clock cycles) output from the corresponding tenth multiplexer 107. Each of N tenth multiplexers 107 outputs a position variable other than the corresponding row as 0. Therefore, each of N second cumulative adders 109 cumulatively adds a bit (b) in a clock cycles in which a bit (b) included in the corresponding row is acquired. Thus, each of N second cumulative adders 109 can output a row-direction cumulative added value ($xr\_b[k]$) obtained by cumulatively adding N bits (b) included in the corresponding row. Here, k is any integer from 1 to N.

N eleventh multiplexers 110 are associated with N columns. Each of N eleventh multiplexers 110 acquires a bit (b) output from the ninth multiplexer 105, every clock cycle. Each of N eleventh multiplexers 110 outputs the acquired bit (b) or 0 in accordance with control of the corresponding seventh comparator 111.

N seventh comparators 111 are associated with N columns. Each of N seventh comparators 111 determines whether the column number of the acquired bit (b) is the corresponding column, every clock cycle. When the column number of the acquired bit (b) is the corresponding column, each of N seventh comparators 111 allows the corresponding eleventh multiplexer 110 to output a bit (b). When the column number of the acquired bit (b) is not the corresponding column, each of N seventh comparators 111 allows the corresponding eleventh multiplexer 110 to output 0.

N third cumulative adders 112 are associated with N columns. Each of N third cumulative adders 112 cumulatively adds all the bits (bits (b) for N×N clock cycles) output from the corresponding eleventh multiplexer 110. Each of N eleventh multiplexers 110 outputs a position variable other than the corresponding column as 0. Therefore, each of N third cumulative adders 112 cumulatively adds bits (b) in a clock cycle in which a bit (b) included in the corresponding column is acquired. Thus, each of N third cumulative adders 112 can output a column-direction cumulative added value ($xc\_b[k]$) obtained by cumulatively adding N bits (b) included in the corresponding column.

After the process for N×N clock cycles from the first row and first column to the $N^{th}$ row and $N^{th}$ column is completed, the twelfth multiplexer 113 outputs the sum of weights (cost) output from the first cumulative adder 104 or 0, in accordance with control by the determination circuit 114.

After the process for N×N clock cycles from the first row and first column to the $N^{th}$ row and $N^{th}$ column is completed, the determination circuit 114 determines whether the optimal path is a cycle, based on N row-direction cumulative added values (xr_b[k]) and N column-direction cumulative added values (xc_b[k]).

The determination circuit 114 determines that a cycle is not formed, for example, when Expression (81) is satisfied, and determines that a cycle is formed when Expression (81) is not satisfied.

$$if((xr\_b_{[k]}>1)\|(xc\_b_{[k]}>1)\|(xr\_b_{[k]}!=xc\_b_{[k]})) \quad (81)$$

Expression (81) is a criterion to determine which of (xr_b[k]>1) or (xc_b[k]>1) or (xr_b[k]!=xc_b[k]) is satisfied.

(xr_b[k]>1) means that a cycle is not formed when at least one of N row-direction cumulative added values (xr_b[k]) is greater than 1 (that is, two or greater).

(xc_b[k]>1) means that a cycle is not formed when at least one of N column-direction cumulative added values (xc_b[k]) is greater than 1 (that is, two or greater).

(xr_b[k]!=xc_b[k]) means that a cycle is not formed when the row-direction cumulative added value (xr_b[k]) and the column-direction cumulative added value (xc_b[k]) with the same row number and column number are not identical.

When it is determined that the optimal path is a cycle, the determination circuit 114 allows the twelfth multiplexer 113 to output the sum of weights (cost). When it is determined that the optimal path is not a cycle, the determination circuit 114 allows the twelfth multiplexer 113 to output 0.

After the process for N×N clock cycles from the first row and first column to the $N^{th}$ row and $N^{th}$ column is completed, the exponentiation circuit 115 performs computation of Equation (82) below.

$$sol=10^{-absmax*cost} \quad (82)$$

That is, the exponentiation circuit 115 performs exponentiation in which a value obtained by multiplying a product of the sum of weights (cost) and the maximum absolute value (absmax) by −1 is the power of 10. Thus, the exponentiation circuit 115 can calculate a total rate (sol) obtained when exchanges corresponding to two or more directed edges included in the optimal path are performed.

Pseudo Code

FIG. 23 is a diagram illustrating first main pseudo code 1111. FIG. 24 is a diagram illustrating second main pseudo code 1112 following the first main pseudo code 1111. The search device 10 runs the pseudo code illustrated in FIG. 23 and FIG. 24 as an example in the order of line numbers.

Line 10 is code for substituting 0 in p and ph.

Line 11 is code for repeating line 11 to line 58. Line 11 is code for performing a process of substituting 1 in ncycle in the first loop, adding 1 to ncycle every loop, and repeating if ncycle is equal to or smaller than Ncycle.

Line 12 and line 13 are a code group for performing a process of adding dp to p and adding dph to ph. Line 14 is code for substituting 0 in cost. Line 15 and line 16 are a code group for substituting 0 in the array xr_b[node] and the array xc_b[node].

Line 17 is code for repeating line 17 to line 48. Line 17 is code for performing a process of substituting 0 in i in the first loop, adding 1 to i every loop, and repeating if i is smaller than node.

Line 18 is code for repeating from line 18 to line 47. Line 18 is code for performing a process of substituting 0 in j in the first loop, adding 1 to j every loop, and repeating if j is smaller than node.

Line 19 is code for defining xout and yout.

Line 21 is code for calling and performing a TE function. The TE function is a function for performing a TE process. Line 21 is code for passing X[i][j], Y[i][j], w[i][j], and z[i][j] to the TE function and accepting xout and yout from the TE function. X[i][j] is the position variable at the $j^{th}$ row and $j^{th}$ column. Y[i][j] is the momentum variable at the $i^{th}$ row and $j^{th}$ column. w[i][j] is the weight value at the $i^{th}$ row and $j^{th}$ column. z[i][j] is the select-disabled flag at the $i^{th}$ row and $j^{th}$ column.

Line 23, line 24, and line 25 are a code group for storing xout into X[i][j], storing xout into XT[j][i], and storing yout into Y[i][j]. XT[j][i] is the inverted position variable of the $j^{th}$ row and $i^{th}$ column.

Line 27 and line 28 are a code group for performing a GC process. Line 27 is code for performing a process of adding xout to XR[i] if not i=j. Line 28 is code for performing a process of adding xout to XC[j] if not j=i. XR[i] is the first accumulative value of the $i^{th}$ node. XC[j] is the second accumulative value of the $j^{th}$ node.

Line 30 to line 46 are a code group for performing a CC process. Line 30 and line 31 are code for performing a process of substituting true in b if xout is greater than 0.5, substituting false in b if not greater than 0.5, and substituting false in b if i=j irrespective of xout.

Line 32 to line 35 are a code group for performing a process of adding w[i][j] to cost, adding 1 to xr_b[i], and adding 1 to the array xc_b[j] if b is true.

Line 37 is code for performing a process of substituting false in constraint.

Line 38 is code for repeating line 38 to line 42. Line 38 is code for substituting 0 in k in the first loop, adding 1 to k every loop, and repeating the loop if k is smaller than node.

Line 39 is code for determining which of (xr_b[k]>1) or (xc_b[k]>1) or (xr_b[k]!=xc_b[k]) is satisfied. Line 40 is code for performing a process of substituting true in constraint if code on line 39 is satisfied.

Line 43 and line 44 are code for performing a process of substituting 0 in cost if constraint is true.

Line 46 is code for performing exponentiation in which a value obtained by multiplying a product of cost and the maximum absolute value (absmax) by −1 is the power of 10, where sol denotes a total rate obtained when exchanges corresponding to two or more directed edges included in the optimal path are performed.

Line 49 is code for repeating line 49 to line 57. Line 49 is code for substituting 0 in i in the first loop, adding 1 to i every loop, and repeating the loop if i is smaller than node.

Line 50 is code for repeating line 50 to line 56. Line 50 is code for substituting 0 in j in the first loop, adding 1 to j every loop, and running the loop if j is smaller than node.

Line 51 is code for defining yout.

Line 53 is code for calling and performing an MX function. The MX function is a function of performing a process corresponding to the FM circuit 77 in the MX process. Line 53 is code for passing XR[i], XC[j], XC[i], XR[j], XT[i][j], and X[i][j] to the MX function and accepting yout from the MX function.

Line 55 is code for subtracting yout from Y[i][j].

FIG. 25 is a diagram illustrating TE pseudo code 1113. When the TE function is called on line 21, the search device 10 runs the pseudo code illustrated in FIG. 25 in numerical order.

Line 111 is code for defining that xin, yin, win, and zin are accepted and xout and yout are output. In xin, X[i][j] is substituted. In yin, Y[i][j] is substituted. In win, w[i][j] is substituted. In zin, z[i][j] is substituted.

Line 112 and line 113 are a code group for defining nx1, nx2, nx3, ny1, ny2, and ny3. Line 115 is code for performing a process of substituting yin in ny1. Line 116 is code for performing a process of calculating xin+dt×yin and substituting the calculation result in nx1.

Line 118 is code for performing a process of substituting 1 in nx2 if nx1 is greater than 0.5 and substituting 0 in nx2 if nx1 is equal to or smaller than 0.5.

Line 120 to line 122 are a code group for performing a process of substituting nx2 in nx3 and substituting 0 in ny1 if nx1 is greater than 1 or nx1 is smaller than 0. Line 123 to line 125 are a code group for performing a process of substituting nx1 in nx3 and substituting ny1 in ny2 if nx1 is equal to or greater than 0 and equal to or smaller than 1.

Line 129 is code for performing a process of calculating {ny2−dt×(1−p)×(nx3−x0)−dt×Mc×(ph×win+(1−ph)×w0)} and substituting the calculation result in ny3. Here, dt, x0, Mc, and w0 are predetermined constants.

Line 130 is code for performing a process of substituting 0 in xout if zin is true and substituting nx3 in xout if zin is false. Line 131 is code for performing a process of substituting 0 in yout if zin is true and substituting ny3 in yout if zin is false.

FIG. 26 is a diagram illustrating MX pseudo code 1114. When the MX function is called on line 53, the search device 10 runs the pseudo code illustrated in FIG. 26 in numerical order.

Line 211 is code for defining that XRi, XCj, XCi, XRj, XTij, and Xij are accepted and yout is output. In XRi, XR[i] is substituted. In XCj, XC[j] is substituted. In XCi, XC[i] is substituted. In XRj, XR[j] is substituted. In XTij, XT[i] [j] is substituted. In Xij, X[i] [j] is substituted.

Line 212 is code for calculating dt×Mp×{2×XRi+2×XCj−XCi−XRj+XTij−2×Xij} and substituting the calculation result in yout. Mp is a predetermined constant.

Parallelization

Figure 27:
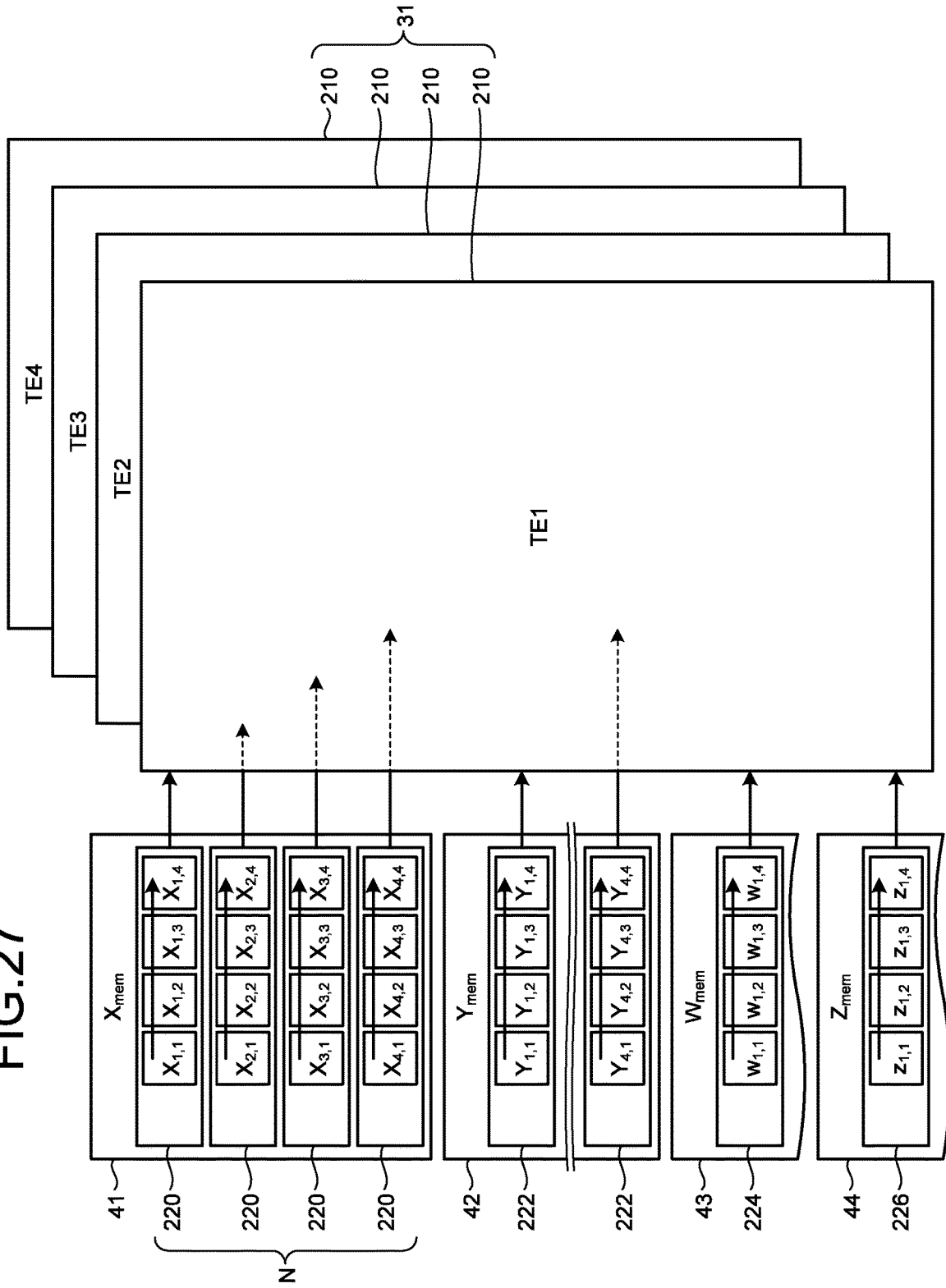
FIG. 27 is a diagram illustrating a parallelized TE circuit.

FIG. 27 is a diagram illustrating a parallelized TE circuit 31.

The TE circuit 31 may include a plurality of sub-TE circuits 210 (a plurality of sub-self-developing circuits). The TE circuit 31 may include, for example, two or more and (N×N) or less sub-TE circuits 210. A plurality of sub-TE circuits 210 have the same configuration as the TE circuit 31 and perform a TE process concurrently with each other.

Each of a plurality of sub-TE circuits 210 reads the position variable at the preceding time, the momentum variable at the preceding time, the weight value, and the select-disabled flag from the memory 21, for a directed edge different from other sub-TE circuits 210 of a plurality of directed edges. Each of a plurality of sub-TE circuits 210 performs a TE process for a directed edge different from other sub-TE circuits 210 of a plurality of directed edges and thereafter writes the position variable at the target time and the momentum variable at the target time in the middle of updating into the memory 21.

When the TE circuit 31 includes a plurality of sub-TE circuits 210, the memory 21 includes a plurality of ports corresponding to a plurality of sub-TE circuits 210 so that a plurality of sub-TE circuits 210 can concurrently read the position variable ($X_{i,j}$), the momentum variable ($Y_{i,j}$), the weight value ($w_{i,j}$), and the select-disabled flag ($z_{i,j}$).

For example, the TE circuit 31 includes N sub-TE circuits 210 corresponding to N rows in a matrix with N rows and N columns. Because of inclusion of N sub-TE circuits 210, the TE circuit 31 facilitates the process for read and write of N×N position variables, etc.

In this case, the X memory circuit 41 includes N sub-X memory circuits 220 corresponding to N rows. Each of N sub-X memory circuits 220 stores N position variables ($X_{i,j}$) of the corresponding row.

Similarly, the Y memory circuit 42 includes N sub-Y memory circuits 222 corresponding to N rows. Each of N sub-Y memory circuits 222 stores N momentum variables ($Y_{i,j}$) of the corresponding rows.

Similarly, the W memory circuit 43 includes N sub-W memory circuits 224 corresponding to N rows. Each of N sub-W memory circuits 224 stores N weight values ($w_{i,j}$) of the corresponding row.

Similarly, the Z memory circuit 44 includes N sub-Z memory circuits 226 corresponding to N rows. Each of N sub-Z memory circuits 226 stores N select-disabled flags ($z_{i,j}$) of the corresponding row.

Each of N sub-TE circuits 210 reads the position variable ($X_{i,j}$), the momentum variable ($Y_{i,j}$), the weight value ($w_{i,j}$), and the select-disabled flag ($z_{i,j}$) from the sub-X memory circuit 220, the sub-Y memory circuit 222, the sub-W memory circuit 224, and the sub-Z memory circuit 226 on the corresponding row. Thus, the TE circuit 31 can perform a TE process concurrently for N rows.

Figure 28:
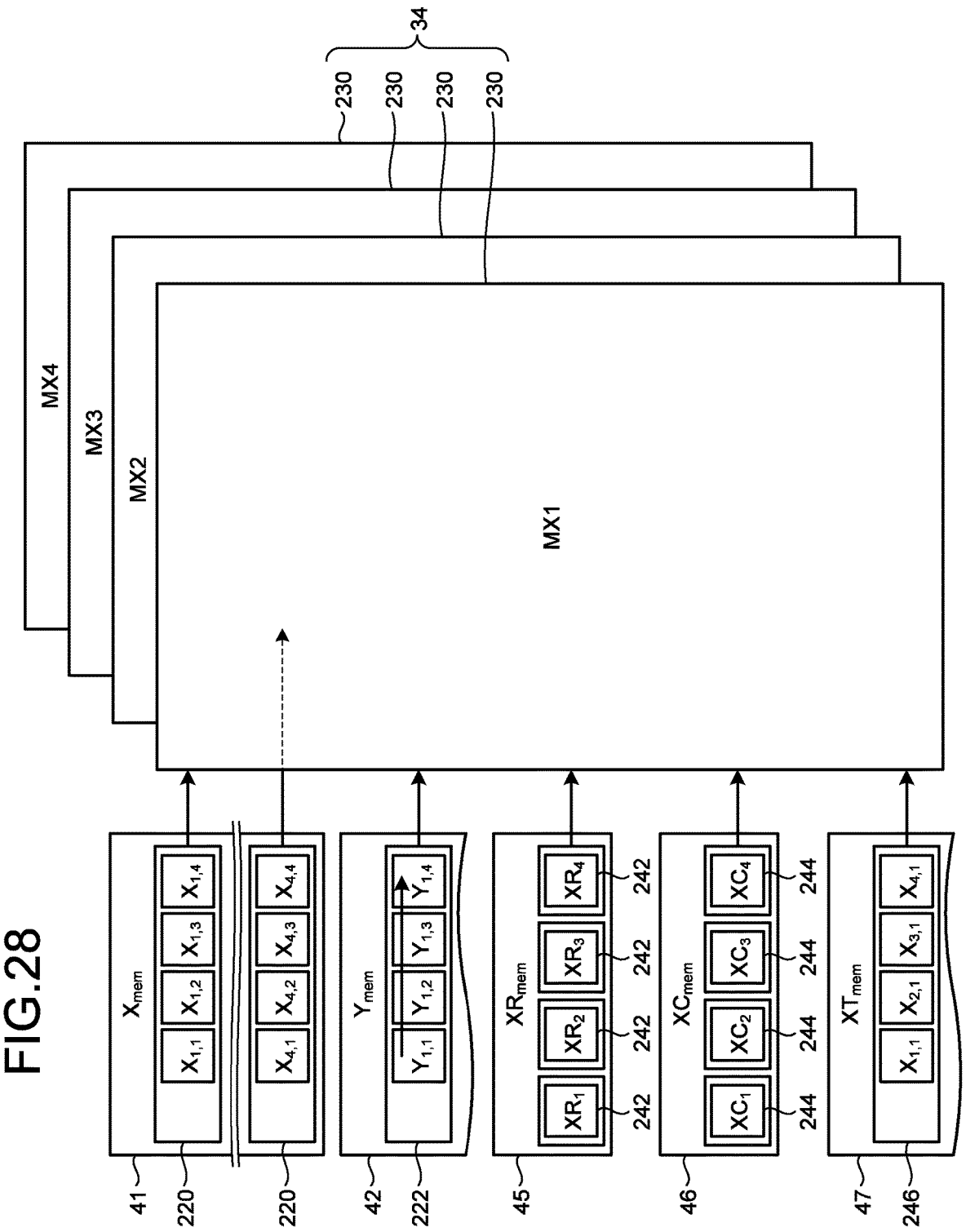
FIG. 28 is a diagram illustrating a parallelized MX circuit.

FIG. 28 is a diagram illustrating a parallelized MX circuit 34.

The MX circuit 34 may include a plurality of sub-MX circuits 230 (a plurality of sub-multibody interaction circuits). The MX circuit 34 may include, for example, two or more and (N×N) or less sub-MX circuits 230. A plurality of sub-MX circuits 230 have the same configuration as the MX circuit 34 and perform an MX process concurrently with each other.

Each of a plurality of sub-MX circuit 230 reads the position variable at the target time, the inverted position variable, and the momentum variable at the target time in the middle of updating from the memory 21, for a directed edge different from other sub-MX circuits 230 of a plurality of directed edges. Each of a plurality of sub-MX circuits 230 reads the first accumulative value and the second accumulative value of the end node and the first accumulative value and the second accumulative value of the start node from the memory 21, for a directed edge different from other sub-MX circuits 230 of a plurality of directed edges. Each of a plurality of sub-MX circuits 230 then performs an MX process for a directed edge different from other sub-MX circuits 230 of a plurality of directed edges and thereafter writes the momentum variable at the target time after updating into the memory 21.

When the MX circuit 34 includes a plurality of sub-MX circuits 230, the memory 21 includes a plurality of ports corresponding to a plurality of sub-MX circuits 230 so that a plurality of sub-MX circuits 230 can concurrently read the position variable ($X_{i,j}$), the inverted position variable ($XT_{j,i}$), the momentum variable ($Y_{i,j}$), the first accumulative value ($XR_i$) and the second accumulative value ($XC_i$) of the end node, and the first accumulative value ($XR_j$) and the second accumulative value ($XC_j$) of the start node.

For example, the MX circuit 34 includes N sub-MX circuits 230 corresponding to N rows in a matrix with N rows and N columns. Because of inclusion of N sub-MX circuits 230, the MX circuit 34 facilitates the process for read and write of N×N position variables, etc.

In this case, the X memory circuit 41 includes N sub-X memory circuits 220 corresponding to N rows. The Y memory circuit 42 includes N sub-Y memory circuits 222 corresponding to N rows.

The XR memory circuit 45 includes N sub-XR memory circuits 242 corresponding to N rows. Each of N sub-XR memory circuits 242 stores the first accumulative value ($XR_i$) of the corresponding row.

The XC memory circuit 46 includes N sub-XC memory circuits 244 corresponding to N columns. Each of N sub-XC memory circuits 244 stores the second accumulative value ($XC_j$) of the corresponding column.

The XT memory circuit 47 includes N sub-XT memory circuits 246 corresponding to N rows. Each of N sub-XT memory circuits 246 stores N inverted position variables ($XT_{j,i}$) of the corresponding row.

Each of N sub-MX circuits 230 reads the position variable ($X_{i,j}$), the momentum variable ($Y_{i,j}$), and the inverted position variable ($XT_{j,i}$) from the sub-X memory circuit 220 on the corresponding row, the sub-Y memory circuit 222, and the sub-XT memory circuit 246 on the corresponding row. Each of N sub-MX circuits 230 reads the first accumulative value ($XR_i$) and the second accumulative value ($XC_i$) of the end node and the first accumulative value ($XR_j$) and the second accumulative value ($XC_j$) of the start node, from the sub-XR memory circuit 242 and the sub-XC memory circuit 244 on the corresponding row and column. Thus, the MX circuit 34 can perform an MX process concurrently for N rows.

Figure 29:
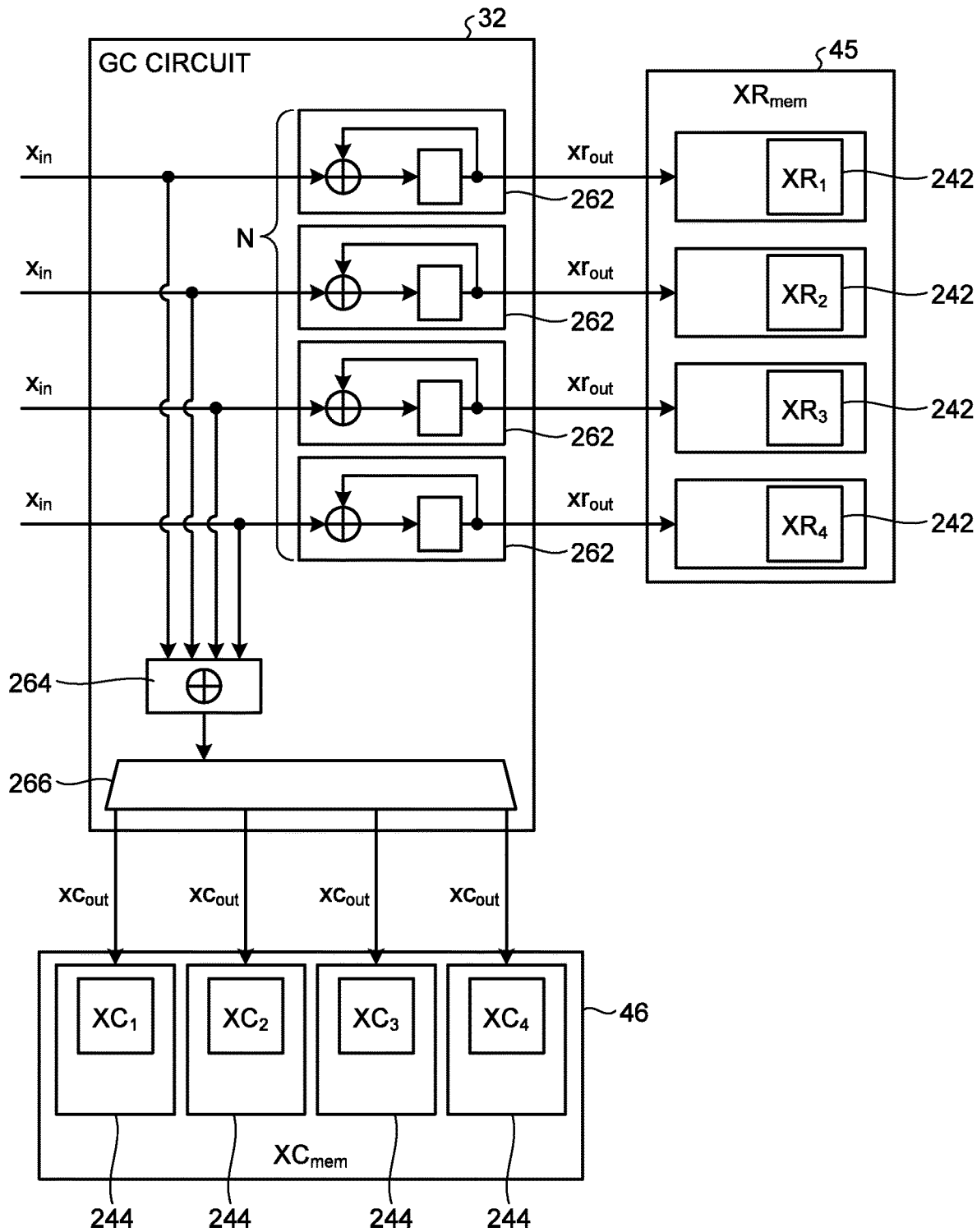
FIG. 29 is a diagram illustrating a configuration of a parallelized GC circuit.
Figure 30:
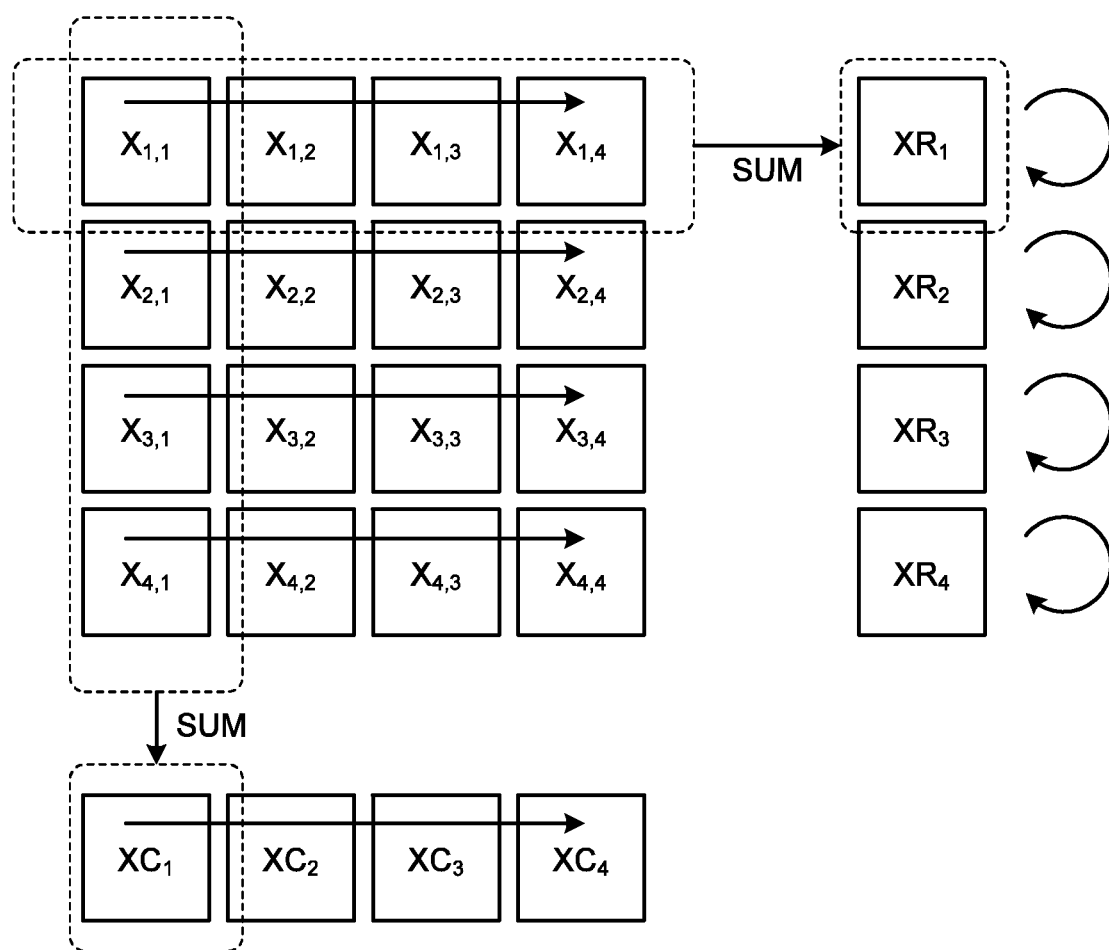
FIG. 30 is a diagram illustrating the order in which position variables are acquired by the parallelized GC circuit.

FIG. 29 is a diagram illustrating a configuration of the parallelized GC circuit 32 with the XR memory circuit 45 and the XC memory circuit 46. FIG. 30 is a diagram illustrating the order in which the position variables are acquired by the parallelized GC circuit 32, and the order in which the first accumulative value and the second accumulative value are calculated.

When a TE process is performed concurrently for N rows, the GC circuit 32 can concurrently calculate N first accumulative values ($xr_{out}$) and N second accumulative values ($xc_{out}$). In this case, the GC circuit 32 concurrently acquires N position variables ($x_{in}$) after subjected to a TE process from each of N rows in the position matrix.

The parallelized GC circuit 32 includes N row-direction cumulative adders 262, a total adder 264, and a demultiplexer 266.

N row-direction cumulative adders 262 are associated with N rows. Each of N row-direction cumulative adders 262 cumulatively adds N position variables ($x_{in}$) of the corresponding row (position variables ($x_{in}$) for N clock cycles). Therefore, as illustrated in FIG. 30, each of N row-direction cumulative addition circuits 262 can output a cumulative added value obtained by cumulatively adding N position variables ($x_{in}$) included in the corresponding row.

Each of N row-direction cumulative adders 262 outputs the calculated cumulative added value as the first accumulative value ($xr_{out}$) of the corresponding row. Each of N row-direction cumulative adders 262 writes the calculated first accumulative value ($xr_{out}$) into the corresponding sub-XR memory circuit 242 included in the XR memory circuit 45.

The total adder 264 adds up N position variables ($x_{in}$) included in N rows, every clock cycle. That is, the total adder 264 adds up N position variables ($x_{in}$) included in one column, every clock cycle. Thus, as illustrated in FIG. 30, the total adder 264 can output a cumulative added value obtained by cumulatively adding N position variables ($x_{in}$) included in the corresponding column, to each of a plurality of sub-XC memory circuits 244.

The demultiplexer 266 selects N sub-XC memory circuits 244 included in the XC memory circuit 46, one by one, every clock cycle. The demultiplexer 266 outputs the added value output from the total adder 264 as the second accumulative value ($xc_{out}$) of the corresponding column, every clock cycle. The demultiplexer 266 then writes the second accumulative value ($xc_{out}$) into the selected sub-XC memory circuit 244, every clock cycle.

Figure 31:
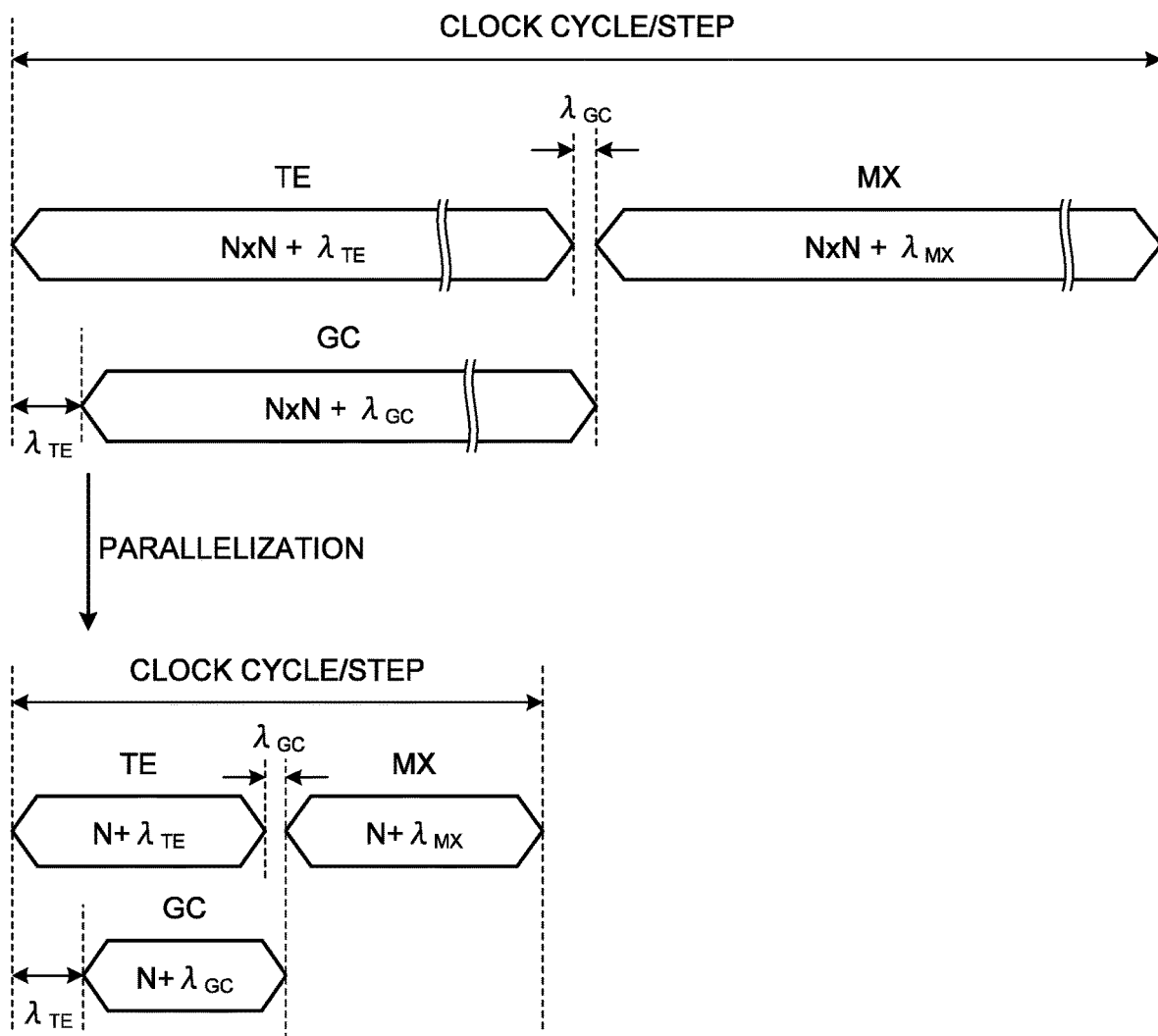
FIG. 31 is a diagram illustrating the timing of a TE process and an MX process before and after parallelization.

FIG. 31 is a diagram illustrating the timing of a TE process and an MX process before and after parallelization.

When the TE process is performed concurrently in units of N rows, the TE circuit 31 performs a process of one step in ($N+\lambda_{TE}$) clock cycles. When the MX process is performed concurrently in units of N rows, the MX circuit 34 performs a process of one step in ($N+\lambda_{MX}$) clock cycles. When the GC process is performed concurrently in units of N rows, the GC circuit 32 performs a process of one step in ($N+\lambda_{GC}$) clock cycles.

Here, the GC circuit 32 can perform the GC process concurrently with the TE process. The MX circuit 34 starts an MX process after the GC circuit 32 performs a GC process, that is, after $\lambda_{GC}$ has passed since the TE process ends.

Based on the foregoing, the process time for one step by the search device 10 parallelized in units of N rows is $\{(2 \times N)+\lambda_{TE}+\lambda_{GC}+\lambda_{MX}\}$ clock cycles. When the search device 10 repeats the step $N_{STEP}$ times, the entire process time by the search device 10 is $N_{STEP} \times \{(2 \times N)+\lambda_{TE}+\lambda_{GC}+\lambda_{MX}\}$ clock cycles.

The search device 10 may be parallelized in other degree of parallelization, rather than in units of N rows. For example, the search device 10 may divide the entire process into two or into four. The search device 10 may divide the entire process into N×N for parallel processing.

The search device 10 according to the second embodiment as described above can output a solution to an optimal path problem of finding an optimal path in a directed graph at high speed.

Third Embodiment

An arbitrage system 300 according to a third embodiment will now be described.

Figure 32:
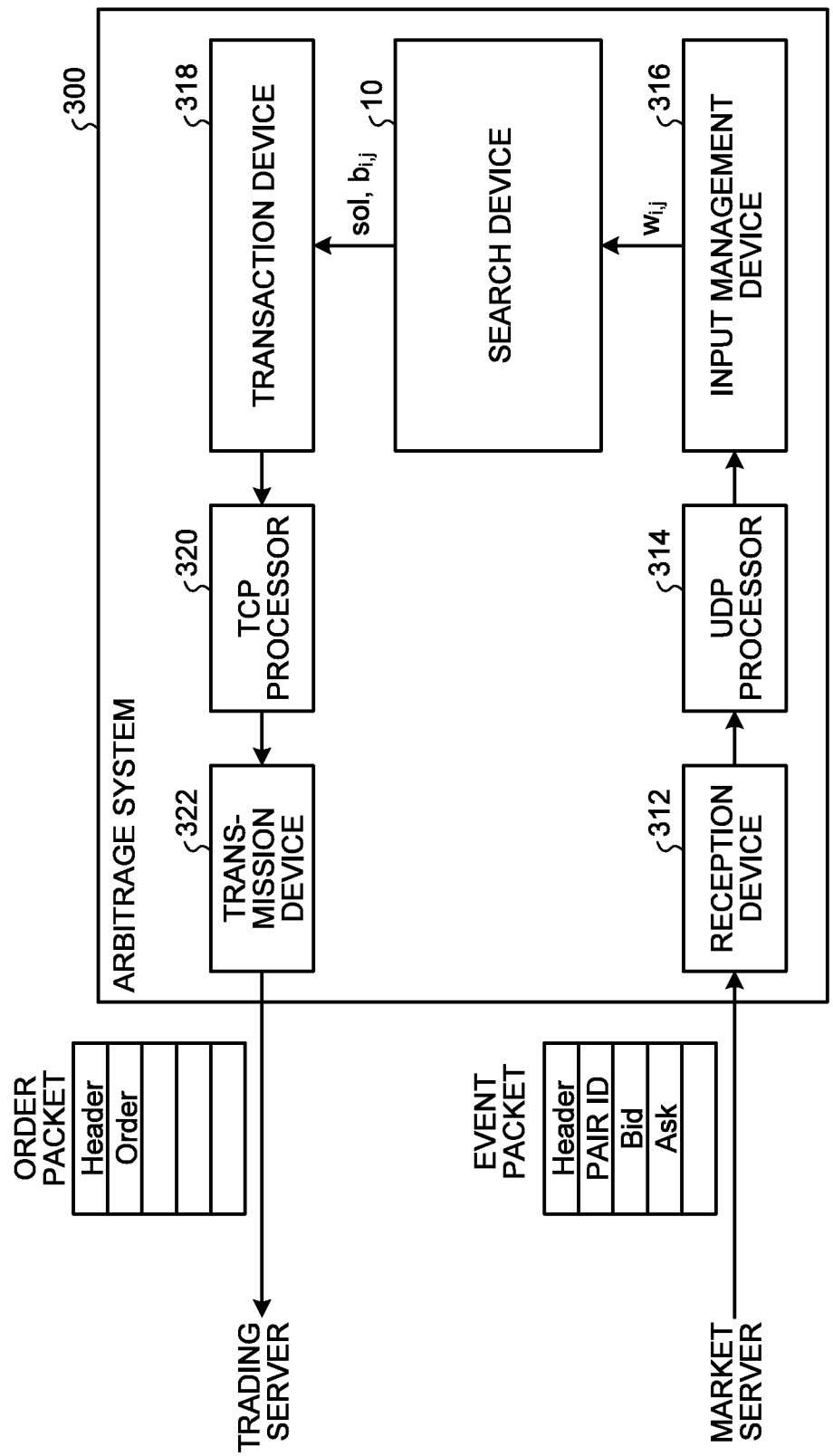
FIG. 32 is a diagram illustrating a configuration of an arbitrage system.

FIG. 32 is a diagram illustrating a configuration of an arbitrage system 300.

The arbitrage system 300 is an example of a search system including the search device 10 according to the second embodiment described with reference to FIG. 7 to FIG. 31. In the present embodiment, the arbitrage system 300 performs exchange transactions. However, the arbitrage system 300 may be applied not only to exchange but also to arbitrage for any target.

The arbitrage system 300 includes a search device 10, a reception device 312, a UDP processor 314, an input management device 316, a transaction device 318, a TCP processor 320, and a transmission device 322.

The search device 10 is the device described with reference to FIG. 7 to FIG. 31. For example, the search device 10 is a semiconductor device mounted as a dedicated circuit on an FPGA, a gate array, or an application specific integrated circuit.

Each of a plurality of nodes in a directed graph to be searched by the search device 10 corresponds to a transaction target in arbitrage. In the present example, each of a plurality of nodes corresponds to a currency.

Each of a plurality of directed edges corresponds to an exchange from a transaction target corresponding to the start node to a transaction target corresponding to the end node. In the present example, each of a plurality of directed edges corresponds to an exchange from a currency corresponding to the start node to a currency corresponding to the end node.

Each of a plurality of weight values denotes a logarithmic value of an exchange rate obtained when an exchange corresponding to a directed edge to which the weight value is allocated is performed. In the present example, letting $r_{i,j}$ be the exchange rate obtained when an exchange from currency (i) corresponding to the start node to currency (j) corresponding to the end node is performed, the weight value $w_{i,j}$ is $-\log(r_{i,j})$.

The search device 10 detects, as an optimal path, a cycle in which the cumulative added value of two or more weight values allocated to the path is smallest. When the weight value $w_{i,j}$ denotes $+\log(r_{i,j})$, the search device 10 may detect, as an optimal path, a cycle in which the cumulative added value of two or more weight values allocated to the path is largest.

The search device 10 outputs a plurality of bits ($b_{i,j}$) corresponding to each of a plurality of directed edges as the optimal path search result. A plurality of bits ($b_{i,j}$) indicate 1 when the corresponding directed edge is included in the optimal path, and indicates 0 when the corresponding directed edge is not included in the optimal path.

Further, the search device 10 calculates a total rate (sol) obtained when two or more exchanges corresponding to two or more directed edges included in the detected optimal path are performed. The total rate (sol) is given by sol=$\Pi(r_{i,j}^{bi,j})$. The total rate (sol) may be given by sol=$\exp\{\Sigma(w_{i,j} \times b_{i,j})\}$.

The search device 10 finds and outputs an optimal path every certain period of time. For example, the search device 10 may output an optimal path for each entire process time (for example, $N_{STEP} \times \{2(N \times N) + \lambda_{TE} + \lambda_{GC} + \lambda_{MX}\}$ clock cycles). The search device 10 may be triggered by reception of an event packet to find and output an optimal path.

The reception device 312 receives an event packet from a market server through a network. The event packet includes information indicating a weight value allocated to at least one directed edge of a plurality of directed edges. For example, the event packet includes an exchange rate corresponding to any one directed edge.

In the present example, the event packet includes header information, a pair ID, a bid price (Bid), and an ask price (Ask). The pair ID is identification information for identifying a pair of currency (i) and currency (j). Currency (i) is a currency corresponding to the $i^{th}$ node in the directed graph. Currency (j) is a currency corresponding to the $j^{th}$ node in the directed graph.

The bid price (Bid) denotes an exchange rate ($r_{i,j}$) from currency (i) to currency (j). The relation of the ask price (Ask) with the exchange rate ($r_{j,i}$) from currency (j) to currency (i) is $r_{j,i}=1/$ Ask. The bid price (Bid) and the ask price (Ask) usually do not match.

The market server irregularly broadcasts event packets. The reception device 312 sequentially receives the event packets irregularly transmitted and applies the received packets to the UDP processor 314.

The UDP processor 314 performs information processing in accordance with a communication protocol on the event packet applied from the reception device 312 and extracts information specifying the directed edge and information representing a weight value (for example, exchange rate) that are included in the event packet.

In the present example, the event packet is a packet compliant with the User Datagram Protocol (UDP) protocol. In the present example, therefore, the UDP processor 314 performs a process in accordance with the UDP protocol and extracts pair ID, bid price (Bid), and ask price (Ask).

The input management device 316 stores a plurality of weight values corresponding to a plurality of directed edges in the inside. Every time an event packet is received, the input management device 316 acquires information indicating a weight value allocated to at least one directed edge included in the event packet from the UDP processor 314. The input management device 316 generates a weight value based on the information included in the acquired event packet and rewrites any one of a plurality of stored weight values.

In the present example, every time an event packet is received, the input management device 316 acquires pair ID, bid price (Bid), and ask price (Ask) from the UDP processor 314. Every time an event packet is received, the input management device 316 performs a negative logarithm operation for the bid price (Bid) to generate a weight value ($w_{i,j}$) corresponding to a directed edge representing an exchange from currency (i) to currency (j) and rewrites the corresponding weight value stored in the inside. Every time an event packet is received, the input management device 316 performs a positive logarithm operation for the ask price (Ask) to generate a weight value ($w_{j,i}$) corresponding to a directed edge representing an exchange from currency (j) to currency (i) and rewrites the corresponding weight value stored in the inside.

The input management device 316 rewrites a plurality of weight values stored in the memory 21 in the search device 10 every certain period of time. For example, assume that the search device 10 repeatedly performs a search process at certain time intervals (for example, every $N_{STEP} \times \{2(N \times N) + \lambda_{TE} + \lambda_{GC} + \lambda_{MX}\}$ clock cycles). In this case, the input management device 316 rewrites a plurality of weight values stored in the memory 21 at certain time intervals (for example, every $N_{STEP} \times \{2(N \times N) + \lambda_{TE} \lambda_{GC} + \lambda_{MX}\}$ clock cycles). When there is no change in a plurality of weight values ($w_{i,j}$), the input management device 316 may skip a rewrite process.

The input management device 316 rewrites all the weight values stored in the search device 10 in a batch. For example, when the search device 10 stores N×N weight values, the input management device 316 rewrites all of N×N weight values. For example, the input management device 316 and the search device 10 may be connected through N×N×Wdata wires. Here, Wdata is the number of bits necessary for representing one weight value. The input management device 316 may rewrite N×N weight values stored in the search device 10 in one clock cycle in a batch. Thus, the input management device 316 can rewrite a plurality of weight values stored in the search device 10 for a short time.

The transaction device 318 acquires a plurality of bits ($b_{i,j}$) and the total rate (sol) that are the optimal path search result from the search device 10, every certain period of time. The transaction device 318 determines whether to perform exchanges corresponding to two or more directed edges included in the optimal path, based on a plurality of bits ($b_{i,j}$) and the total rate (sol). For example, the transaction device 318 determines to perform arbitrage when the total rate (sol) is greater than a predetermined threshold.

When it is determined to perform arbitrage, the transaction device 318 generates an order packet to give an instruction to perform exchanges corresponding to two or more directed edges selected as an optimal path. For two or more exchanges corresponding to two or more directed edges selected as an optimal path, the transaction device 318 may confirm terms for any one directed edge and thereafter generate an order packet for the following directed edge.

The TCP processor 320 performs information processing in accordance with a communication protocol for the order packet generated by the transaction device 318. In the present example, the order packet is a packet compliant with the Transmission Control Protocol (TCP). Therefore, the TCP processor 320 includes the order packet in a packet compliant with the TCP protocol.

The transmission device 322 transmits an order packet output from the TCP processor 320 to a trading server that executes a transaction of a target through a network.

Figure 33:
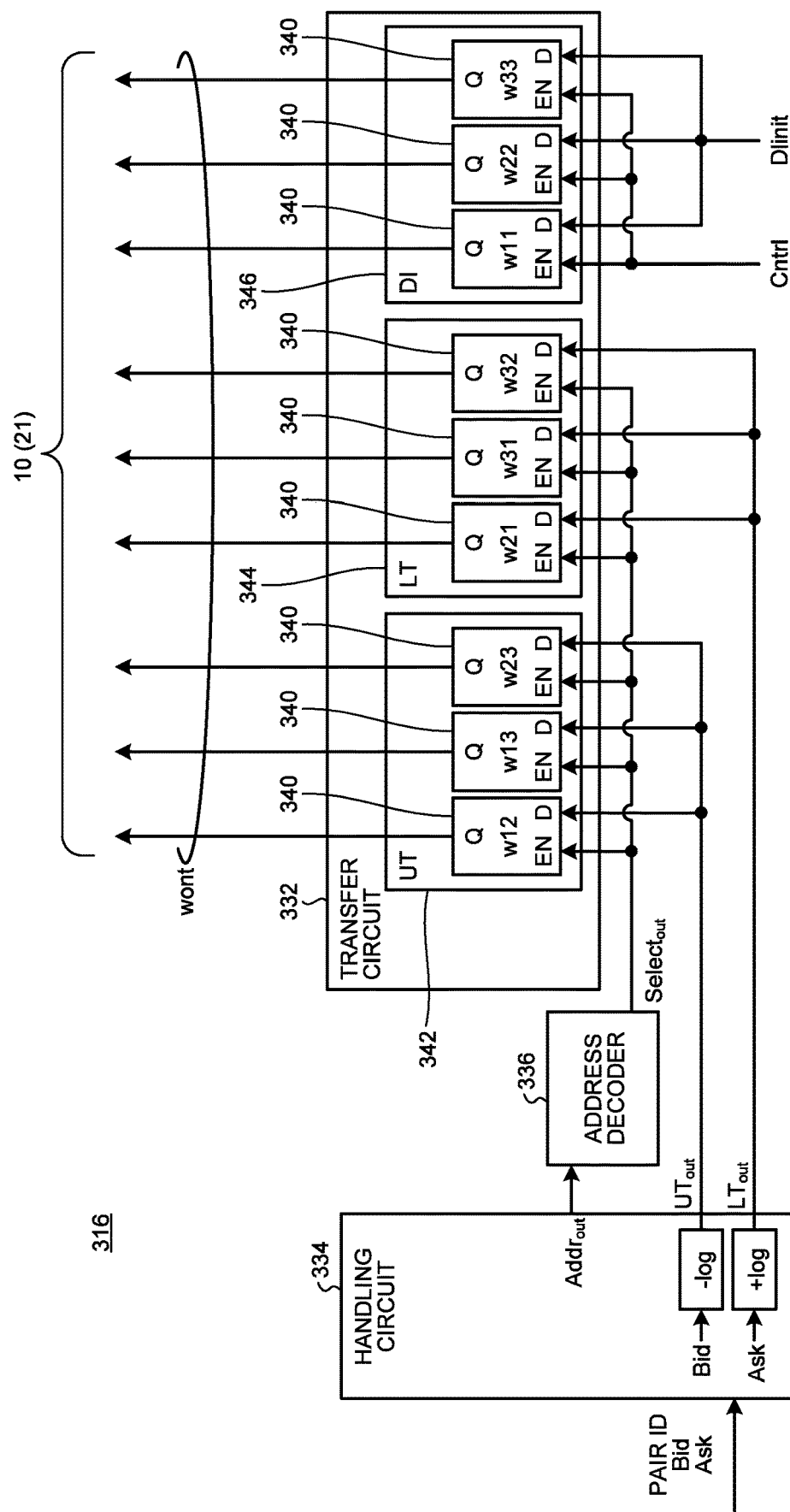
FIG. 33 is a diagram illustrating a configuration of an input management device.

FIG. 33 is a diagram illustrating a configuration of the input management device 316.

The input management device 316 includes a transfer circuit 332, a handling circuit 334, and an address decoder 336.

The transfer circuit 332 includes a plurality of buffer memories 340 respectively corresponding to a plurality of directed edges included in a directed graph. Each of a plurality of buffer memories 340 stores a weight value allocated to the corresponding directed edge.

In the present example, the transfer circuit 332 includes N×N buffer memories 340. N×N buffer memories 340 are divided into a UT unit 342, an LT unit 344, and a DI unit 346.

The UT unit 342 stores weight values belonging to upper triangular entries (UT) in a matrix. That is, the UT unit 342 stores a weight value corresponding to a directed edge representing an exchange from a currency corresponding to the $i^{th}$ node to a currency corresponding to the $j^{th}$ node, where i<j. The UT unit 342 includes N×(N−1)/2 buffer memories 340.

The LT unit 344 stores weight values belonging to lower triangular entries (LT) in a matrix. That is, the LT unit 344 stores a weight value corresponding to a directed edge representing an exchange from a currency corresponding to the $j^{th}$ node to a currency corresponding to the $i^{th}$ node, where i<j. The LT unit 344 includes N×(N−1)/2 buffer memories 340.

The DI unit 346 stores weight values belonging to diagonal entries in a matrix. The DI unit 346 includes N buffer memories 340.

In the present example, each of N×N buffer memories 340 is a D flip-flop capable of storing multilevel data. In this case, the buffer memory 340 includes an input terminal D, an enable terminal EN, and an output terminal Q.

The handling circuit 334 acquires pair ID, bid price (Bid), and ask price (Ask) every time an event packet is received.

Every time an event packet is received, the handling circuit 334 performs a negative logarithm operation (−log (Bid)) for the bid price (Bid) to calculate a weight value $(w_{i,j})$ corresponding to a directed edge representing an exchange from currency (i) corresponding to the $i^{th}$ node to currency corresponding to the $j^{th}$ node. The handling circuit 334 may include a dedicated circuit for performing a negative logarithm operation (−log(Bid)). The handling circuit 334 applies the calculated weight value $(w_{i,j})$, in parallel, to all the input terminals D of N×(N−1)/2 buffer memories 340 included in the UT unit 342.

Every time an event packet is received, the handling circuit 334 performs a positive logarithm operation (+log (Ask)) for the ask price (Ask) to calculate a weight value $(w_{j,i})$ corresponding to a directed edge representing an exchange from currency (j) corresponding to the $j^{th}$ node to currency (i) corresponding to the $i^{th}$ node. The handling circuit 334 may include a dedicated circuit for performing a positive logarithm operation (+log(Bid)). The handling circuit 334 applies the calculated weight value $(w_{j,i})$, in parallel, to all the input terminals D of N×(N−1)/2 buffer memories 340 included in the LT unit 344.

The handling circuit 334 simultaneously outputs the weight value $(w_{i,j})$ corresponding to an exchange from currency (i) to currency (j) and the weight value $(w_{j,i})$ corresponding to an exchange from currency (j) to currency (i).

The handling circuit 334 specifies a currency pair (a pair of currency (i) and currency (j)) based on the pair ID, every time an event packet is received. The handling circuit 334 applies an address representing the specified currency pair to the address decoder 336.

The address decoder 336 selects one corresponding buffer memory 340 from among N×(N−1)/2 buffer memories 340 included in the UT unit 342, based on the address representing the currency pair. The address decoder 336 also selects one corresponding buffer memory 340 from among N×(N−1)/2 buffer memories 340 included in the LT unit 344, based on the address representing the currency pair.

The address decoder 336 applies a select signal (Select$_{out}$) to the enable terminal EN of the selected one buffer memory 340 included in the UT unit 342 and the enable terminal EN of the selected one buffer memory 340 included in the LT unit 344.

When a select signal (Select$_{out}$) is applied to the enable terminal EN, each of N×(N−1)/2 buffer memories 340 included in the UT unit 342 captures the weight value provided from the input terminal D. Therefore, the buffer memory 340 corresponding to an exchange from currency (i) to currency (j) included in the UT unit 342 can capture the weight value $(w_{i,j})$ corresponding to an exchange from currency (i) to currency (j) output from the handling circuit 334 and store the weight value in the inside.

When a select signal (Select$_{out}$) is applied to the enable terminal EN, each of N×(N−1)/2 buffer memories 340 included in the LT unit 344 also captures the weight value provided from the input terminal D. Therefore, the buffer memory 340 corresponding to an exchange from currency (j) to currency (i) included in the LT unit 344 can capture the weight value $(w_{j,i})$ corresponding to an exchange from currency (j) to currency (i) output from the handling circuit 334 and store the weight value in the inside.

In N buffer memories 340 included in the DI unit 346, a control signal (Cntrol) is applied to the enable terminal EN, and an initial value (Clinit) of weight value is applied to the input terminal D, in system start-up. The initial value (Clinit) of weight value is a value that does not influence the sum of weight values, for example, 0.

The transfer circuit 332 then writes N×N weight values stored in N×N buffer memories 340 into the memory 21 in the search device 10 in a batch. For example, the transfer circuit 332 rewrites N×N weight values stored in the memory 21 in a batch, at certain time intervals (for example, every $N_{STEP} \times \{2(N \times N) + \lambda_{TE} + \lambda_{GC} + \lambda_{MX}\}$ clock cycles).

Such an input management device 316 performs logarithm operations on the bid price (Bid) and the ask price (Ask) every time an event packet is received in the handling circuit 334 preceding the transfer circuit 332. The transfer circuit 332 has two weight values rewritten every time an event packet is received. The transfer circuit 332 outputs N×N weight values in a batch to the search device 10, in asynchronous with reception of event packets. The input management device 316 has to perform N×N logarithm operations concurrently if logarithm operations are performed in a stage subsequent to the transfer circuit 332. By comparison, the input management device 316 in the present embodiment performs a logarithm operation in the handling circuit 334 preceding the transfer circuit 332. The input management device 316 in the present embodiment therefore can perform a logarithm operation with a fewer circuits configuration.

The transfer circuit 332 transmits N×N weight values to the search device 10, for example, in one clock cycle to update N×N weight values stored in the memory 21 of the search device 10. The transfer circuit 332 therefore can update N×N weight values stored in the memory 21 of the search device 10 for a short time. Thus, the search device 10 can detect an optimal path at high speed in response to change in exchange.

The transfer circuit 332 may store N×N exchange rates in addition to N×N weight values. In this case, the handling circuit 334 additionally transmits the exchange rate (bid price (Bid) and a reciprocal of ask price (1/Ask)) included in an event packet to the transfer circuit 332 for storage into the corresponding buffer memory 340. The transfer circuit 332 then transmits N×N exchange rates in addition to N×N weight values to the memory 21 of the search device 10. Thus, the search device 10 can easily perform a normalization operation of N×N weight values, using N×N exchange rates.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A calculation system, comprising:
a calculation device configured to solve a quadratic unconstrained binary optimization (QUBO) problem of minimizing a quadratic function including N binary variables, N being an integer equal to or greater than 2;
a reception device configured to receive a packet including information indicative of a partial coefficient of A coefficients in A terms constituting the quadratic function, A being an integer equal to or greater than 2; and
a transfer circuit including a buffer memory that stores therein at least partial and a plurality of coefficients among the A coefficients,
wherein
the calculation device includes a memory that stores therein the A coefficients and calculates a solution to the QUBO problem based on the A coefficients stored in the memory; and
the transfer circuit
rewrites, when the reception device receives the packet, the partial coefficient indicated by information included in the received packet among the plurality of coefficients stored in the buffer memory, in accordance with the information included in the received packet, and
writes all the plurality of coefficients stored in the buffer memory into the memory of the calculation device, in a batch at a predefined timing.

2. The calculation system according to claim 1, wherein the calculation device
updates N position variables representing positions of N virtual particles and N momentum variables representing momentums of the N particles for each unit time from an initial time to an end time, and
determines each value of the N binary variables among the N position variables at the end time based on a position variable of a corresponding particle; and
the N particles correspond to the N binary variables in the QUBO problem.

3. The calculation system according to claim 2, wherein the calculation device, for the each unit time,
calculates the N position variables at a target time based on the N momentum variables; and
calculates the N momentum variables at the target time based on the N position variables and the A coefficients stored in the memory.

4. The calculation system according to claim 1, further comprising:
an output device configured to generate an instruction to be given to an external device based on the solution to the QUBO problem and output an output packet including the instruction generated.

5. The calculation system according to claim 1, wherein the reception device sequentially receives a plurality of packets; and
every time the reception device receives the packet, the transfer circuit rewrites the partial coefficient indicated by the information included in the received packet among the plurality of coefficients stored in the buffer memory, in accordance with the information included in the received packet.

6. The calculation system according to claim 5, wherein the reception device sequentially receives the plurality of packets irregularly transmitted.

7. The calculation system according to claim 6, wherein the calculation device performs, by being triggered by reception of the packet by the reception device, processing of calculating the solution to the QUBO problem.

8. The calculation system according to claim 5, wherein the calculation device repeatedly performs processing of calculating the solution to the QUBO problem at certain time intervals.

9. The calculation system according to claim 8, wherein the transfer circuit writes, at the certain time intervals, all the plurality of coefficients stored in the buffer memory into the memory of the calculation device in a batch.

10. The calculation system according to claim 9, wherein when there is no change in any of the plurality of coefficients stored in the buffer memory, writing of the coefficients into the memory is skipped.

11. The calculation system according to claim 5, wherein the transfer circuit writes all the plurality of coefficients stored in the buffer memory into the memory of the calculation device in a batch, in asynchronous with reception of the packet by the reception device.

12. The calculation system according to claim 1, wherein the buffer memory includes a plurality of memory circuits corresponding to the plurality of coefficients in a one-to-one manner;
each of the plurality of memory circuits stores therein a corresponding coefficient among the plurality of coefficients; and
the transfer circuit, every time the reception device receives the packet,
writes a coefficient into a memory circuit selected by using the information included in the received packet among the plurality of coefficients, and writes, for each predefined time, all the plurality of coefficients stored in the plurality of memory circuits into the memory of the calculation device, in a batch.

* * * * *